United States Patent
Wu et al.

(10) Patent No.: US 10,846,060 B2
(45) Date of Patent: Nov. 24, 2020

(54) SINGLE-PAGE WEB APPLICATION BUILDER SYSTEM AND METHOD BASED ON A FINITE-STATE MACHINE

(71) Applicant: Q2 Software, Inc., San Mateo, CA (US)

(72) Inventors: Min Wu, San Mateo, CA (US); Darpan Saini, San Mateo, CA (US); Sneha Periwal, San Mateo, CA (US)

(73) Assignee: Q2 Software, Inc., Austin, TX (US)

( * ) Notice: Subject to any disclaimer, the term of this patent is extended or adjusted under 35 U.S.C. 154(b) by 0 days.

(21) Appl. No.: 15/882,780

(22) Filed: Jan. 29, 2018

(65) Prior Publication Data
US 2019/0235843 A1     Aug. 1, 2019

(51) Int. Cl.
*G06F 8/34*     (2018.01)
*G06F 8/38*     (2018.01)
*G06F 3/0482*     (2013.01)
*G06F 8/35*     (2018.01)
*G06F 16/23*     (2019.01)

(52) U.S. Cl.
CPC .............. *G06F 8/34* (2013.01); *G06F 3/0482* (2013.01); *G06F 8/35* (2013.01); *G06F 8/38* (2013.01); *G06F 16/2365* (2019.01)

(58) Field of Classification Search
CPC .......... G06F 8/38; G06F 17/3089; G06F 8/34; G06F 17/212; G06F 17/2235; G06F 17/30899; G06F 3/048; G06F 3/04847; G06F 17/2247; G06F 17/211; G06F 17/30905; G06F 3/0482; G06F 16/2365; G06F 8/35
See application file for complete search history.

(56) References Cited

U.S. PATENT DOCUMENTS

| | | | | |
|---|---|---|---|---|
| 6,222,537 B1* | 4/2001 | Smith | ....................... | G06F 8/38 715/762 |
| 9,244,660 B2* | 1/2016 | Chauhan | ................... | G06F 8/38 |
| 9,697,105 B2* | 7/2017 | Totale | ................. | G06F 11/3664 |
| 2008/0109410 A1* | 5/2008 | Berry | ........................ | G06F 8/38 |
| 2014/0281891 A1* | 9/2014 | Sulcer | ................... | G06F 3/0484 715/234 |
| 2015/0052498 A1* | 2/2015 | Chauhan | ................... | G06F 8/38 717/109 |

(Continued)

OTHER PUBLICATIONS

Renien John Joseph; Single Page Application and Canvas Drawing; JJWesT; pp. 29-37; retrieved on Sep. 16, 2020. (Year: 2015).*

(Continued)

*Primary Examiner* — S. Sough
*Assistant Examiner* — Cuong V Luu
(74) *Attorney, Agent, or Firm* — Nasr Patent Law LLC; Faisal K. Abou-Nasr

(57) ABSTRACT

The declarative Single Page Web Application (SPA) builder system and method can be used to build complex, fully functional SPA without undue coding. The SPA builder contains a set of rules that facilitate the building of a SPA. The set of rules in the SPA builder may include a set of user interface elements and a finite state machine model with a set of data dependency rules, a set of user interface rendering rules, and a set of action execution data flow rules. The SPA builder may also utilize mock data that allows the user to build and verify the user interaction flows of the SPA at design time.

14 Claims, 45 Drawing Sheets

(56) References Cited

U.S. PATENT DOCUMENTS

2016/0321166 A1* 11/2016 Totale ................. G06F 11/3664

OTHER PUBLICATIONS

V. Solovei et al.; The Difference Between Developing Single Pageapplication and Traditional Web Application Based on Mechatronics Robot Laboratory on AFT Application; Odessa National Academy of Food Technologies; pp. 4-8; retrieved on Sep. 16, 2020 (Year: 2018).*

* cited by examiner

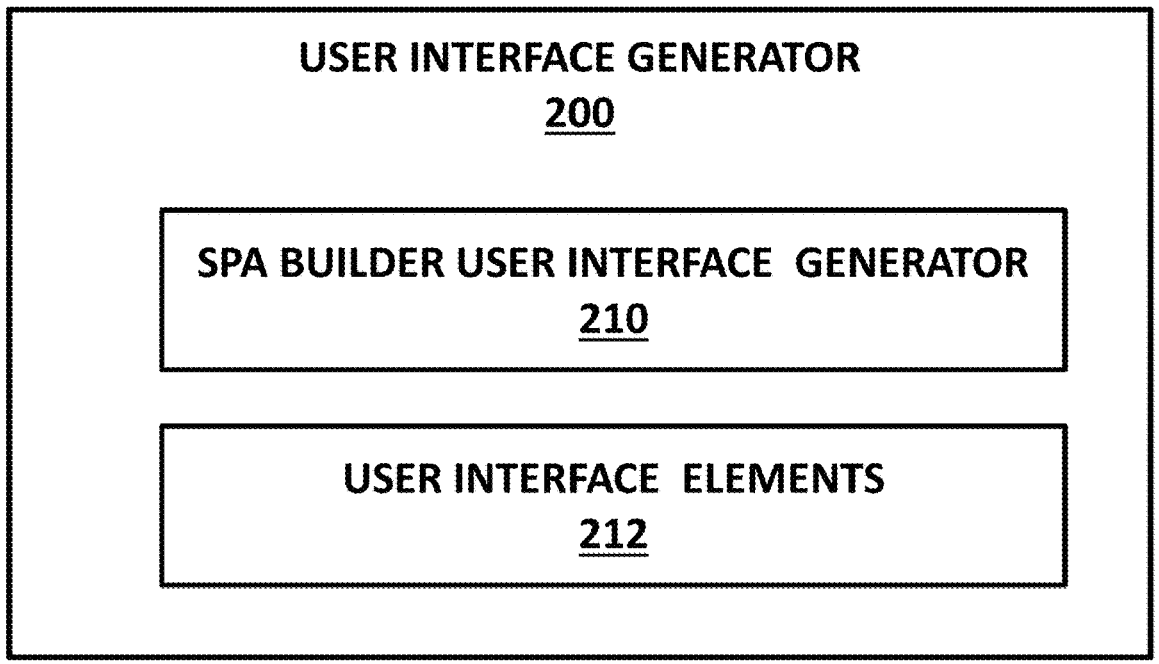

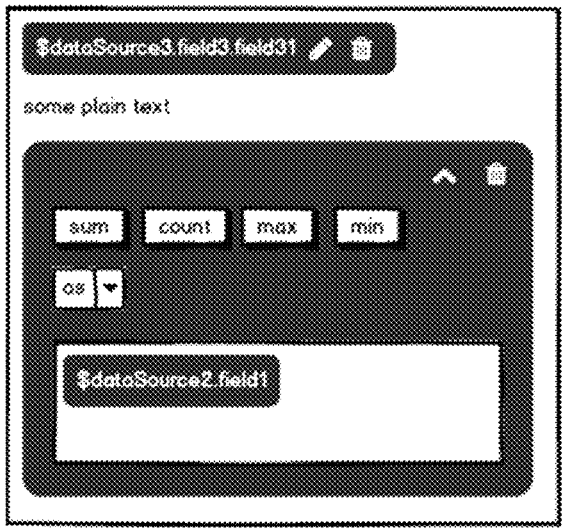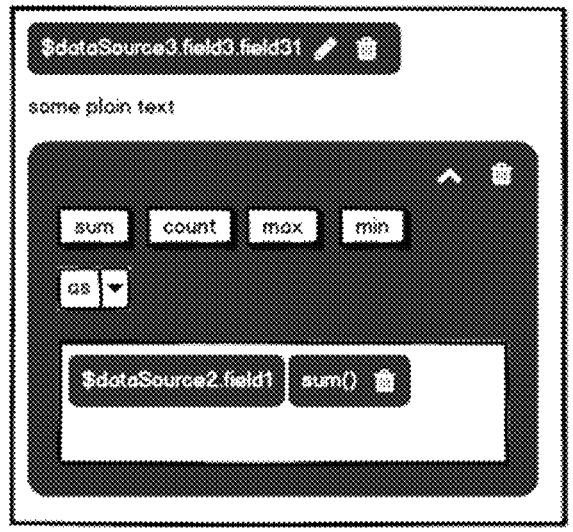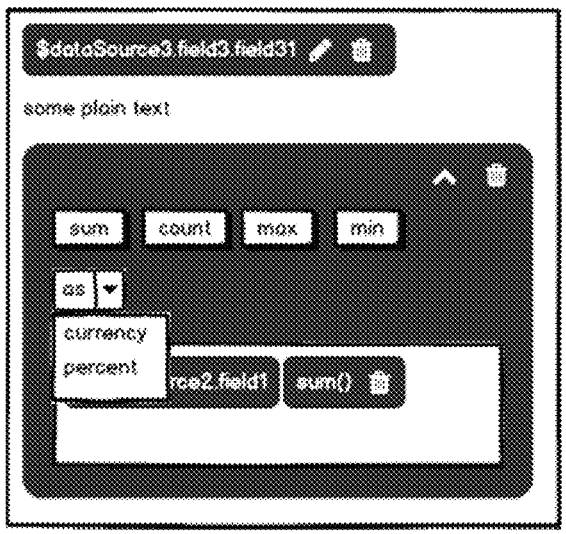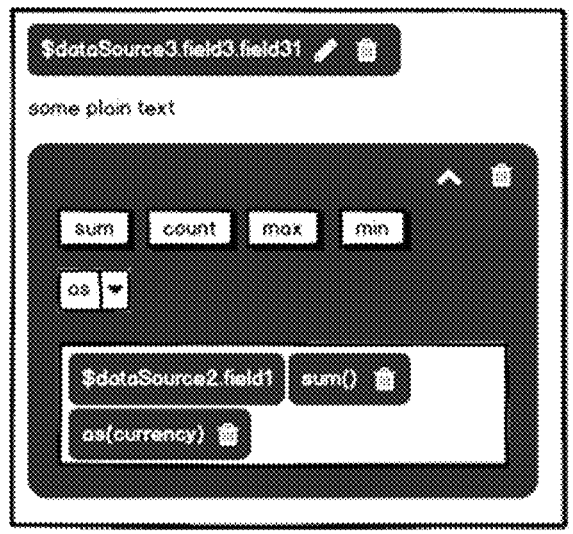
FIGURE 17

State prerequisite variable
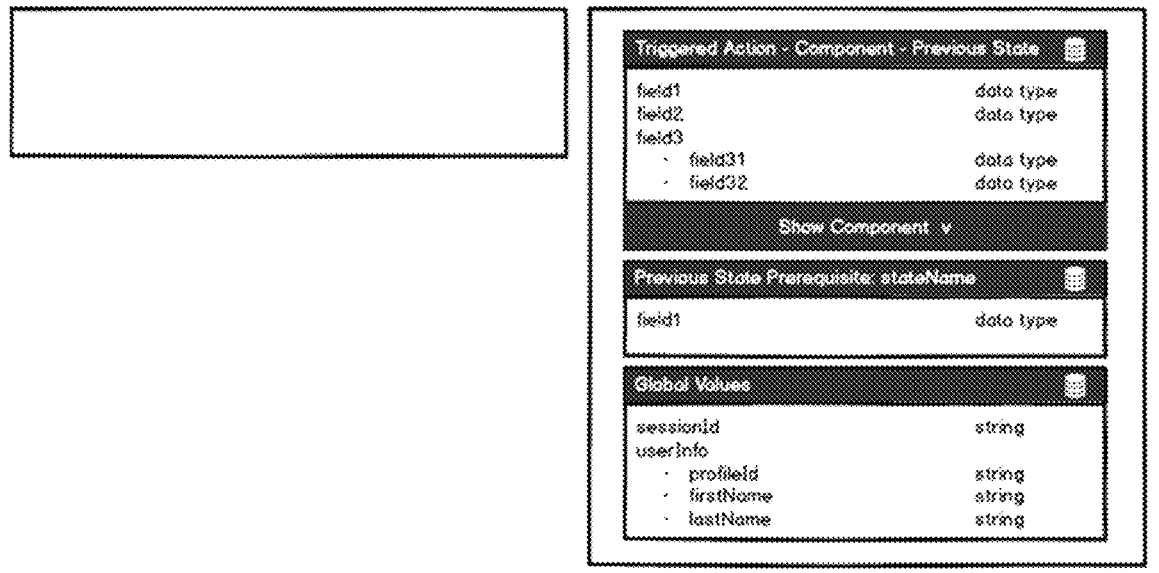
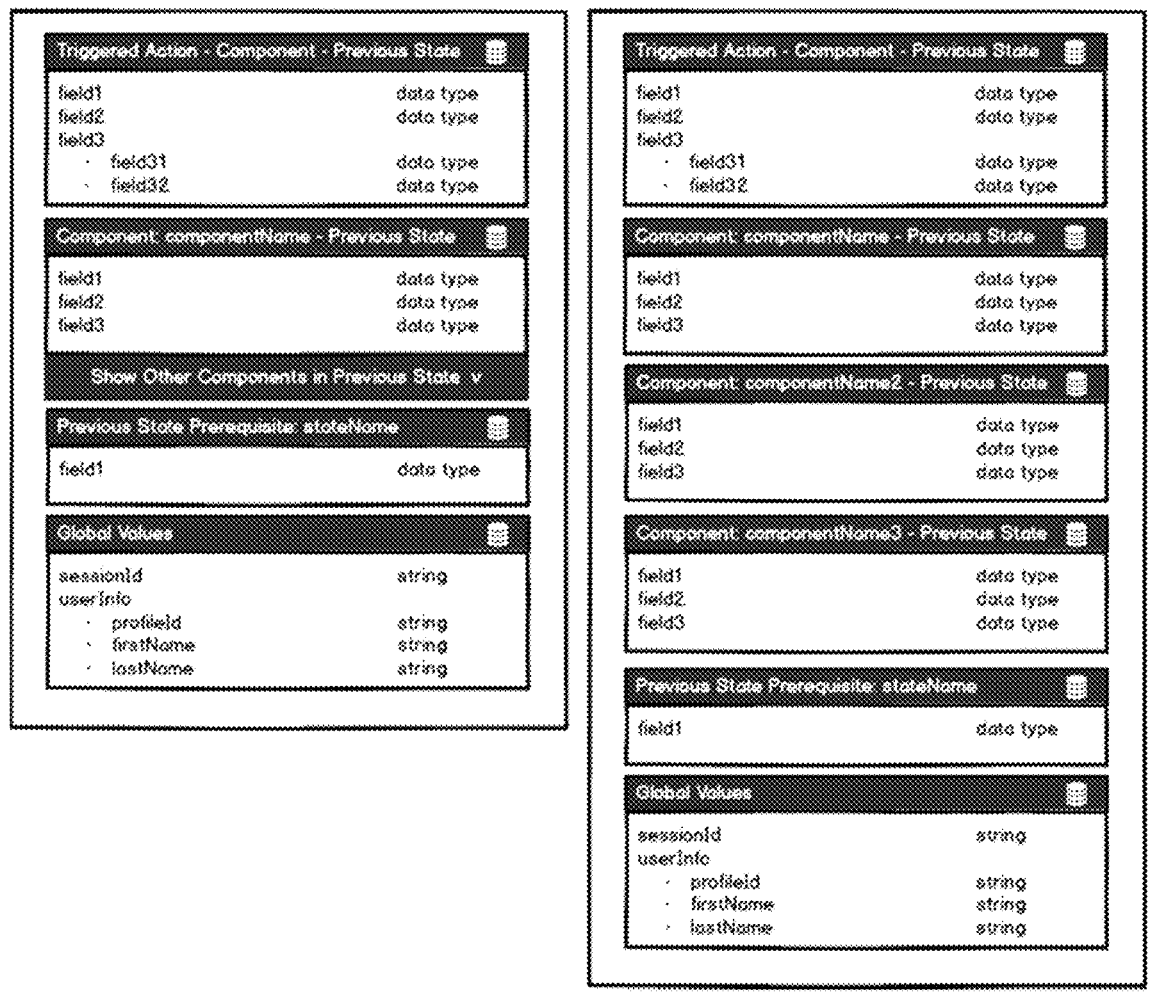
FIGURE 22

| field_name | string |
|---|---|
| Random Id | |
| String length | 16 |

| field_name | date |
|---|---|
| Random past date | |
| From date | / / |
| To date | / / |

| field_name | integer |
|---|---|
| Random number | |
| Minimum number | |
| Maximum number | |

| Product_Name__c | string |
|---|---|
| Random loan name | |

| field_name | date |
|---|---|
| Random future date | |
| From date | / / |
| To date | / / |

| field_name | double |
|---|---|
| Random number | |
| Minimum number | |
| Maximum number | |

| field_name | string |
|---|---|
| Random person name | |
| person name | |
| first name | |
| last name | |
| loan name | |
| company name | |
| street name | |
| city name | |
| state name | |
| country name | |
| email address | |
| website Url | |
| phone number | |
| postal code | |
| string | |

| field_name | boolean |
|---|---|
| Random boolean value | |

| field_name | currency |
|---|---|
| Random amount | |
| Minimum amount | |
| Maximum amount | |

| field_name | percent |
|---|---|
| Random percent | |
| Minimum percent | % |
| Maximum percent | % |

| field_name | string |
|---|---|
| Random numeric string | |
| Minimum number | |
| Maximum number | |
| Unit | month |

FIGURE 39

SINGLE-PAGE WEB APPLICATION BUILDER SYSTEM AND METHOD BASED ON A FINITE-STATE MACHINE

APPENDICES

Appendix A (14 pages) contains code for an application-.json file.

Appendix B (3 pages) contains code for a borrower_view.json file that is called by the Application.json file.

Appendix C (4 pages) contains code for a financial_details.json file that is called by the Application.json file.

Appendix D (3 pages) contains code for a guarantor_card_view.json file that is called by the Application.json file.

Appendix E (2 pages) contains code for an offer_details.json file that is called by the Application.json file.

Appendix F (14 pages) contains code for a profile_details.json file that is called by the Application.json file.

Each of these appendices form part of the specification and are incorporated herein by reference.

FIELD

The disclosure relates generally to a system and method for building a single page web application.

BACKGROUND

For a long time, people have used desktop applications running on a computer system, such as a personal computer, laptop computer, etc. to interact with the computer system and other connected computer systems. However, web applications are increasingly replacing traditional desktop applications. There are two main types of web applications including a single-page asynchronous JavaScript and XML (AJAX) application (SPA) and multi-page traditional web applications (MPAs). If the desired web application is not content centric, the SPA has advantages over the MPA since the SPA has, for example: 1) faster response times because there is no page reload and only necessary data is transmitted back and forth between the client side computer system and the server side computer system; and 2) is more user-friendly for the user interacting with since the SPA supports user interaction styles other than just typing and clicking.

Presently, when building a web application, existing main-stream declarative web development tools (that require little or no programming) are still page based. An administrator designs and develops the web application one page at a time and therefore the tools are generating MPAs and not SPAs. In order to develop an SPA, developers need to get involved to write JavaScript code and administrators cannot generate an SPA by themselves. Thus, a first technical problem with building SPAs is that the process requires writing code and thus cannot be easily done by a person without those skills even though the SPA is superior to MPAs in various circumstances.

Tools and systems exist that attempt to help with the building of MPAs. These systems and tools include a tool provided by Wix, Wordpress, and Google Sites. All of these existing tools are page centric. With the existing tools, an administrator can include AJAX components inside of each page. The AJAX components can interact with a server in an asynchronous way. However, this communication is limited to single component and there is no inter-component communication. Thus, these tools have limited capabilities and limit the types of web applications that can be built. Another existing tool is offered by Skuid who provides an SPA graphical user interface (GUI) builder. The Skuid SPA GUI builder tool provides built-in user interface (UI) components and data can be communicated between components. However, Skuid has a separate design-mode UI. Thus, once a user finishes an update in the design-mode UI, in order to verify the update, the user has to switch to the web application and reload it. Therefore, if the UI update is in a state of the application that can that requires a series of user interaction and server communication, the user has to follow the same flow to reach the particular state in order to verify the update. Such a verification flow required with the Skuid builder is very inefficient during the building process.

Avoka Transact Manager is a form builder, focusing on capturing information from users. The Avoka Transact Manager however cannot be used to build an SPA for any application.

It is also known that a finite state machine may be used in connection with a GUI of an application for testing purposes. However, none of the known systems are a GUI builder for non-technical persons to build server-side data-driven complicated interactive SPAs. Thus, there are technical problems of being unable to more efficiently build an SPA and it is desirable to provide a system and method for more efficiently building an SPA using a finite state machine and it is to this end that the disclosure is directed.

BRIEF DESCRIPTION OF THE DRAWINGS

FIG. 2B illustrates more details of the user interface generator that is part of the single page web application builder;

FIGS. 2B1 and 2B2 illustrate examples of a list view user interface element and a detail user interface element that are part of the set of user interface elements;

FIGS. 13-19 illustrate further details of the dynamic data picker;

FIG. 22 illustrates the dynamic data picker being used to select data sources;

FIGS. 28A-28F illustrate the process for defining an action in a component;

FIG. 34 illustrates an example of a card view of the component data shown by the application monitor user interface;

FIG. 39 illustrates a mockup of domain-specific data types and their own type-specific conditions;

DETAILED DESCRIPTION OF ONE OR MORE EMBODIMENTS

The disclosure is particularly applicable to a single page web application builder system for generating a single page web application for the lending industry as disclosed and shown in the examples below and it is in this context that the disclosure will be described. It will be appreciated, however, that the SPA builder system and method has greater utility since the system and method may be used to generate SPAs for other industries and in fact the disclosure is not limited to building SPAs for any particular industry, the system and method may build the SPAs using other methodologies rather than the disclosed finite state machine and the system and method may be implemented using different architectures that are also within the scope of the disclosure.

Figure 1:
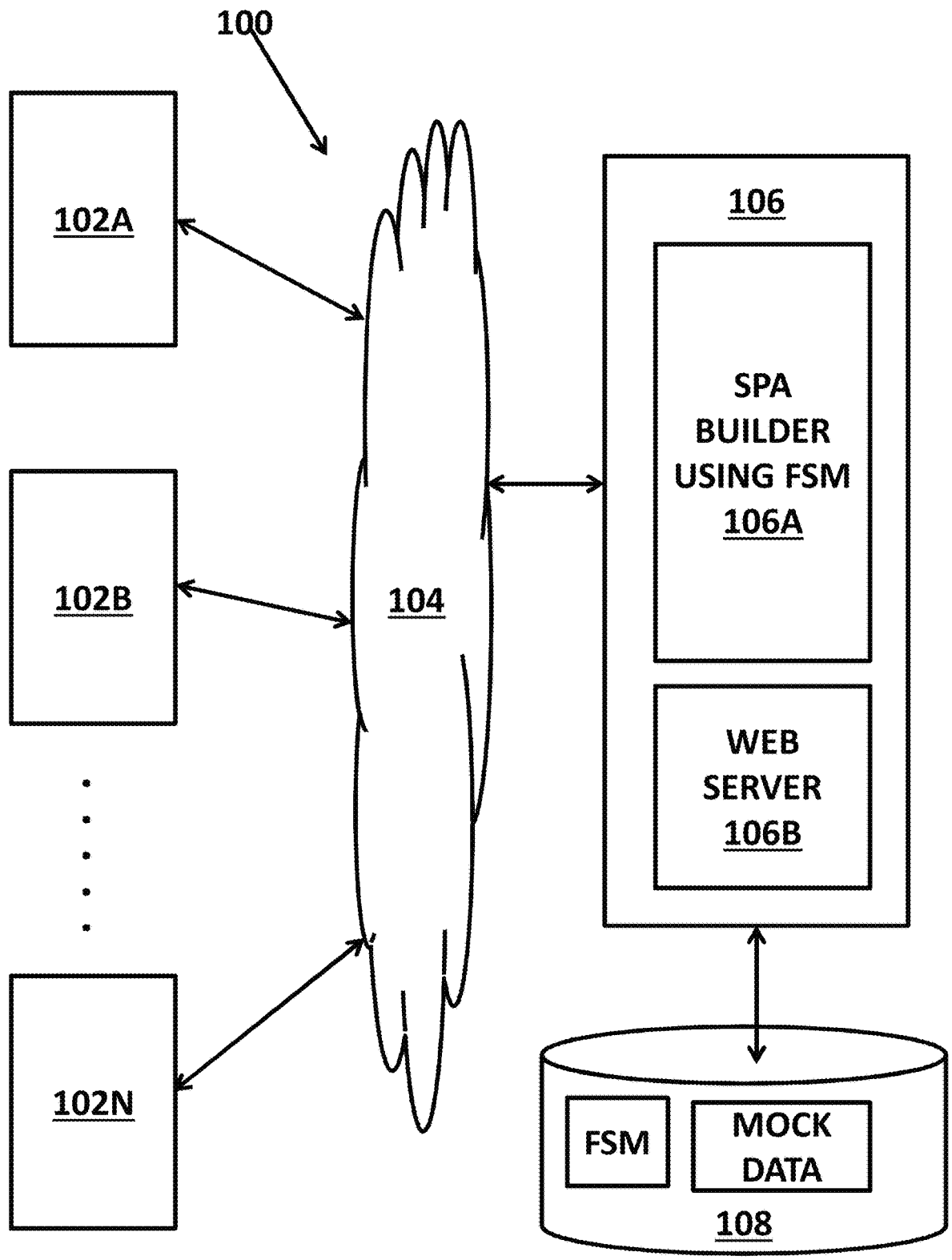
FIG. 1 illustrates an example of an implementation of a single page web application builder system using a finite state machine on a client server or cloud based architecture.

FIG. 1 illustrates an example of an implementation of a single page web application builder system 100 using a finite state machine on a client server or cloud based architecture. However, it will be understand that the system 100 may be implemented using other computer architectures that are within the scope of this disclosure. For example, the system 100 may be implemented as a stand-alone computer system or in software as a service architecture. As shown in FIG. 1, the system 100 may comprise one or more computing devices 102, such 102A, 102B, . . . , 102N, that may each be connected and coupled over a communication path 104 to a backend system 106. Each computing device 102 connects to and interacts with the backend 106 in order to build a single page web application (SPA) using a new methodology as described below in which a person who is not a computer programmer/web page designer is able to generate and build the SPA. In one embodiment, each user may interface with a web browser executed by the computing device to build the SPA and also verify the SPA that he/she has built so far in real time without reloading the SPA which are the technical solutions to the above described technical problems.

Each computing device 102 may have a processor and memory, a display for displaying the web browser user interface (UI) or SPA builder UI to the user, user input devices for the user to enter information, such as a keyboard, mouse, etc., and communications circuits so that the computing device may, in a wired connection or wireless connection, connect to and communicate with the backend 106. For example, each computing device 102 may be a smartphone device, such as an Apple iPhone or Android operating system based device, a personal computer, a laptop computer, a tablet computer and the like. In some embodiments, each computing device 102 may execute a browser application, a mobile application or other application in order to allow the user to interface with the backend 106 and build the SPA as described below.

The communication path 104 may include one or more of a wired connection, such as the Ethernet and a wireless connection, such as a cellular digital data network, a computer network, a WiFi network and the like, and allow each computing device 102 and the backend 106 to connect to and communicate with each other. The communication path 104 may use various known communication and data protocols. For example, in one embodiment, the communication path may be TCP/IP and HTTPS or HTTP. Furthermore, the communication path 104 may also transfer data having other formats, such as JSON data.

The backend 106 may be implemented using one or more computing resources, such as a server computers, blade computers, cloud computing resources or a standalone computer. The back end 106 may further comprise a single page web application (SPA) builder using FSM 106A that may interface with each user and allow each user to generate the SPA as described below. The SPA builder using FSM 106A may be implemented in hardware or software or combination of hardware and software. For example, if the SPA builder 106A is implemented in hardware, it may be an integrated circuit, FPGA, ASIC or other hardware device that implements the operations and function of the SPA builder as described below. Alternatively, the hardware device may be programmed to perform the operations and function of the SPA builder as described below. In both implementations, the hardware is thus configured to perform the operations and function of the SPA builder as described below. For example, if the SPA builder 106A is implemented in software, the SPA builder 106A may be a plurality of lines of computer code with instructions that may be executed by a processor of a computer system in order to perform the operations and function of the SPA builder as described below. When implemented in software, the processor that is executing the instructions becomes configured to perform the operations and function of the SPA builder as described below. In the example implementation shown in FIG. 1, the backend 106 may include a web server 106B that manages the exchange of data/web pages.HTML code between each computing device and the backend.

The system 100 may also have storage 108 that is connected to the backend 106 and the storage may store various types of data of the system including the completed SPAs for users, user data and the like. For example, the storage 108 may include the SPA specification (to implement the SPA once built), the SPA tools and SPA builder software/code/scripts, the mock data used to build the complete SPA as described below, the configuration history data, and real industry data on which the SPA operates. The storage 108 may further store finite state machine data and model that is used by the SPA builder (and stored in the browser being used to build the SPA) and global data that is also used by the SPA building as described below. The system 100 may also have interfaces or APIs that may be used to retrieve real data for the SPA from third party data sources.

Figure 2A:
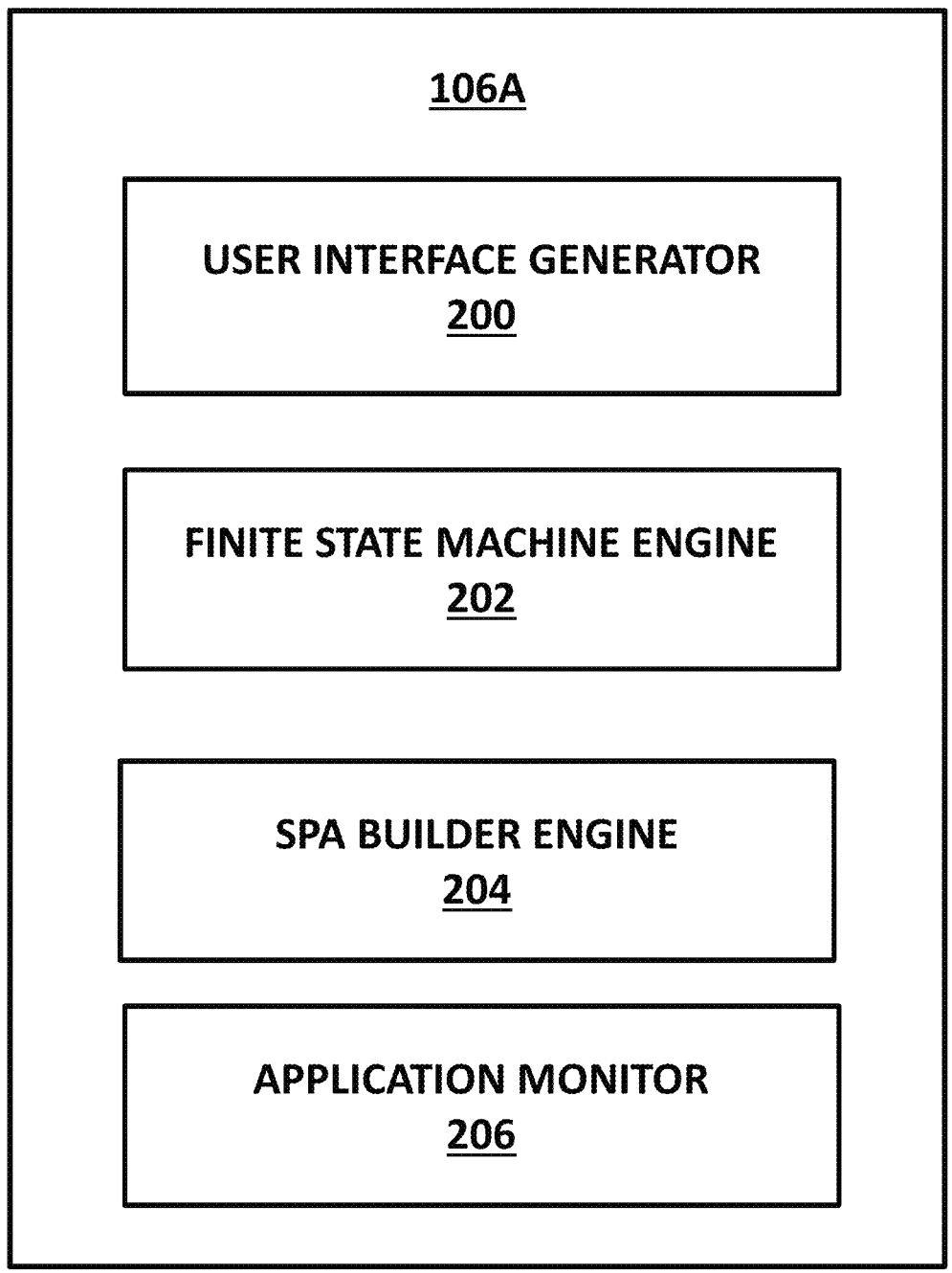
FIG. 2A illustrates more details of the single page web application builder.
Figure 2C:
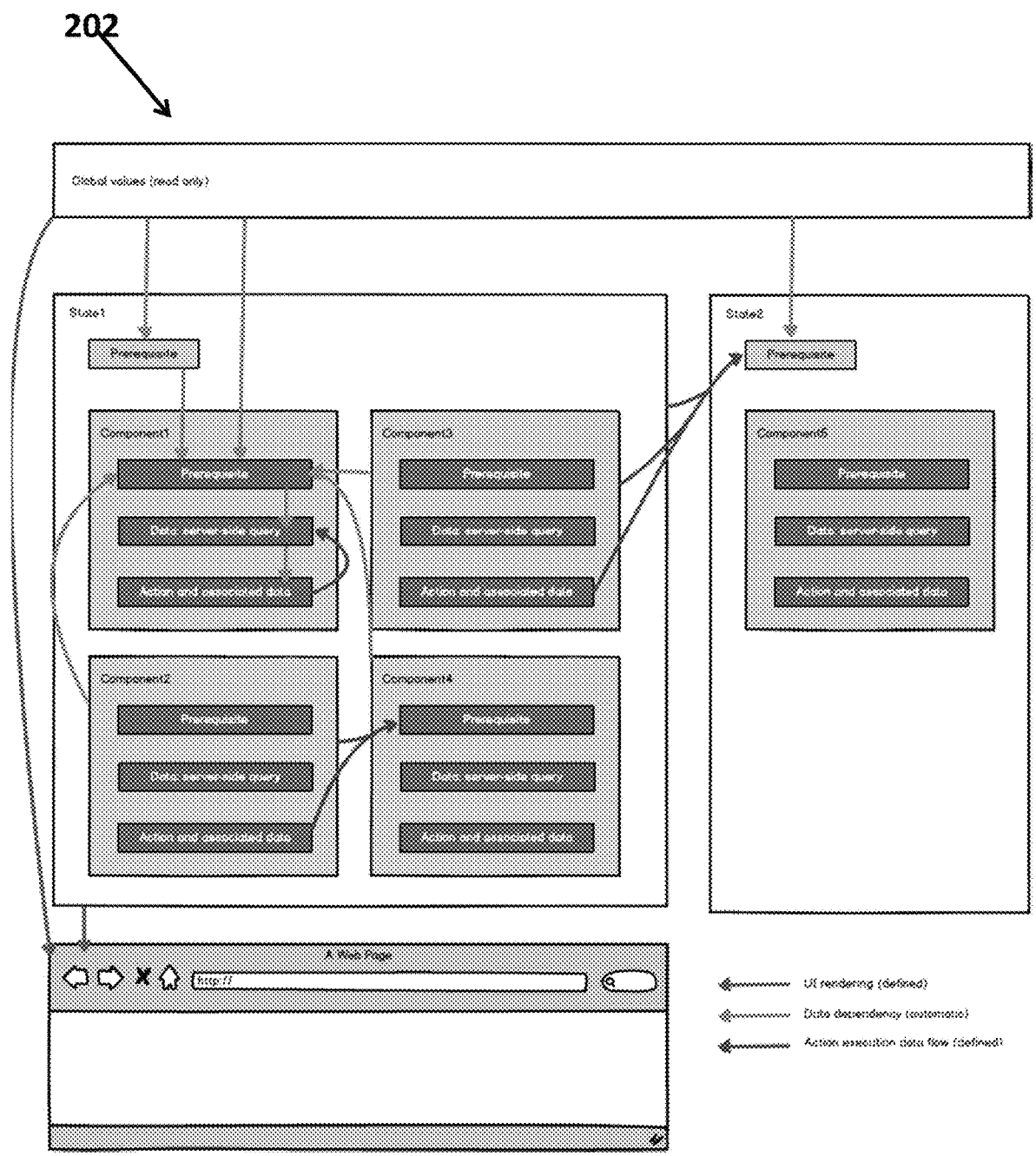
FIG. 2C illustrates more details of the finite state model that is part of the single page web application builder.

FIG. 2A illustrates more details of the single page web application builder 106A that may include a user interface generator 200 that generates the user interface specified by the builder 106A in order for each user to build their SPA. The builder 106A may further include a finite state machine engine 202 (implemented as the builder.json file described below) that stores the finite machine state model and set of rules so that the user can generate the SPA using the finite state machine model. The user interface generator 200 may include a plurality of user interface elements that may be used in the building of the SPA wherein each user interface element is a set of user interface rules that facilitate the development of the SPA without the typical manual writing and debugging of the code that is typically required to build the SPA. Further details of the user interface generator 200 is shown in FIG. 2B and discussed below. The finite state machine engine 202 may contain the finite state machine model that is a set of data dependency, user interface rendering and action execution data flow rules that facilitate the development of the SPA without the typical manual writing and debugging of the code that is typically required to build the SPA. Further details of the finite state machine engine 202 is shown in FIG. 2C and discussed below.

The user interface generator user interface elements and the set of data dependency, user interface rendering and action execution data flow rules of the FSM model together are a set of rules implemented in the SPA builder system and method. This set of rules may be stored in the storage 108 as shown in FIG. 1 and enforced by the SPA builder GUI that is specified in the builder.json file. This set of rules allow the SPA builder to facilitate the building of an SPA without the typical coding required when an SPA is built by a manual process.

The builder 106A may further include a SPA builder engine 204 that contains the logic and set of rules that guide the building of the SPA by a user. For example, the SPA builder engine 204 uses a set of user interface elements of the user interface generator 200 and a set of data dependency, user interface rendering and action execution data flow rules and provides the flow so that the user can build the single page web application without the typical coding required. The builder 106A may also include an application monitor 206 that may be used to enhance the SPA building process (in some embodiments using mock data) and use the configuration history data to complete different user interaction flows of the SPA.

FIG. 2B illustrates more details of the user interface generator 200 that is part of the single page web application builder. In addition to generating the user interface of the SPA builder using the generator 210 (examples of which are provided below), the user interface generator 200 may also include a plurality of user interface elements 212 that may be used when the SPA is being built. The plurality of user interface elements provided below is not exhaustive since additional user interface elements may be added, etc. For example, the user interface elements may include a list view (an example of which is shown in FIG. 2B1), a detail view (an example of which is shown in FIG. 2B2), a card view, a queue view, a tabs view, a document upload view, an overlay view, a steps view, a header view, a map view, a chart view and a report view. Any one or more of the user interface elements may be used when the SPA is being built as shown in some of the examples below.

The list view displays rows of a database table and each row in the table may be clicked on to show more details of the row. The list view may also show data from multiple tables. The list view may have configurable elements (configurable by the user when the user is building the SPA using the SPA builder) including the columns that may be added or removed, sorting so that each column can be enabled for sorting and header labels that can be changed.

The detail view shows the field level details of a record in the database. The detail view may have configurable elements (configurable by the user when the user is building the SPA using the SPA builder) that include the fields so that the data shown in a field can be added or removed, a layout to change the number of columns in the detail view and field labels that can be changed from the default database table labels.

Figure 24:
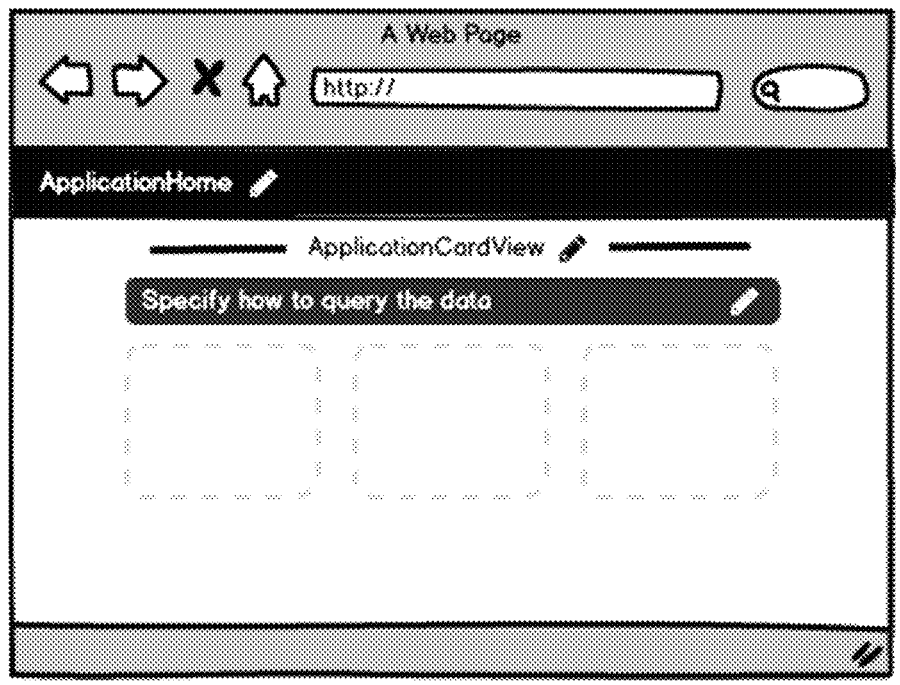
FIG. 24 illustrates an example of a card view component and of preparing the component data.

The card view (an example of which is shown in FIG. 24) that allows an end user to click on any of the cards for additional information about the subject of the card. The card view may have configurable elements (configurable by the user when the user is building the SPA using the SPA builder) that include the fields so that the data shown in a field can be added or removed, sorting so that the cards displayed can be sorted and field labels that can be changed from the default database table labels.

The queue view shows details of a record in the database. The queue view may have configurable elements (configurable by the user when the user is building the SPA using the SPA builder) that include the fields so that the data shown in a field can be added or removed, sorting so that the data shown in the queue view can be sorted using one or more fields and field labels that can be changed from the default database table labels.

Each of the above user interface elements may include buttons that have a pre-defined action such as "Save" to save records in the backend database. The buttons may also have custom actions that call custom APIs from the backend. For example, if a loan application must be priced, an pricing API can be called.

Each of the above user interface elements also may include disclosures and the disclosure can save the selected user option in the disclosure (e.g., I agree to by subject to the following terms and conditions"). In the disclosure, there may be a cancel button and a submit button where the submit button is disabled until the user has accepted the terms. The disclosure may have configurable elements (configurable by the user when the user is building the SPA using the SPA builder) that include a text field in which the text of the disclosure is customizable and options in which disclosure options ("I agree" or "Accept") can be configured.

The tabs view allows the user to add tabs to a user interface. The tabs view may have configurable elements (configurable by the user when the user is building the SPA using the SPA builder) that include tabs that may be added or removed, a layout inside of the tabs can be configured and the orientation of the tabs may be horizontal or vertical.

The document upload view allows a user to upload, view and/or replace, and e-sign a document. For example, in a lending SPA, the document upload may be for a tax return or an income statement. The document upload view may have configurable elements (configurable by the user when the user is building the SPA using the SPA builder) that include the fields so that the data shown in a field can be added or removed, sorting so that the data can be sorted, and a field labels that can be changed from the default database table labels.

The other user interface provide other functionality to the SPA. For example, the overlay user interface may provide a popup/modal that has its own layout and components inside. The steps user interface permits the SPA to implement and display a series of steps for an online applications, etc. The header user interface may display a company logo and the identification information of the currently authenticated user. The map user interface may display points of interest on a map within the SPA. The chart user interface may query the database and generate and display a chart based on the data being used by the SPA. The report user interface may query the database and generate and display a report based on the data being used by the SPA.

FIG. 2C illustrates more details of the finite state model 202 that is part of the single page web application builder. The finite state model 202 leverages various different types of data that are part of the SPA including a state that contains a group of UI components and a state transition means that the SPA displays a different group of UI components while a user interacts with the SPA. The state also specifies a set of variable as prerequisite. A prerequisite (for a state or a component) is a set of variables and, in order to make a component or state fully functional, the variables need to be assigned with proper values, although a prerequisite set can be empty. A UI component is a user interface element of the SPA that may be interacted with by a user. A global value is a variable value that is global to the SPA and all of the elements of the SPA (including the states and the components.) A button in a component is a user interface element that allows the user to interact with the UI component. A query is a data query to the backend that can be performed by the SPA. Action and action data (of a component) are an action that may be performed by a component of the SPA and the data resulting from the action occurring.

The finite state model 202 include a set of data dependency rules, user interface rendering rules and action execution data flow rules that govern the operation of the SPA being built by the user that reduces/eliminates errors or problems that may otherwise occur in the SPA. The data dependency rules (described below in more detail) may include: 1) that each state prerequisite is dependent on global values (that are read only); 2) that component prerequisites may be dependent on the global values, that the prerequisite for a component (Component1 in the example in FIG. 2C) may be dependent on data from another component (Component2 or Component3 or Component4 in the example) such as that a button in the component may not be active until an action/data is present in the other component; 3) that the query may be dependent on the prerequisite in a component; and 4) that action and action data of a component may be dependent of the query data.

The user interface rendering set of rules may include the rendering of a user interface based on the global values and/or the rendering of the user interface based on the data and the like from a state (such as State1 in the example.)

The action execution data flow rules may include: 1) the action and associated data in a component flow to the query portion of the component; 2) that action and associated data and/or component data in a component (Component2 in this example) may flow to a prerequisite of another component (Component4 in this example); 3) that the action and associated data and/or component data in a component (Component3 in this example) may flow to a prerequisite of another state (State2 in this example); and 4) that the data in a first state (State1 in this example) may flow to the prerequisite of another state (State2 in this example).

The set of user interface elements described above and the set of rules in the FSM (including the data dependency rules, the user interface rendering rules and the action execution flow rules) together are a set of rules integrated into the SPA builder that provide the technical solution to the above technical problems and form part of the inventive concepts of the disclosed SPA builder system and method.

Example SPA Builder Implementation

In one implementation, the SPA builder 106A has been modelled as a finite state machine (FSM) in popular JavaScript framework, such as ReactJS+Redux. In this implementation, the user interface that may be rendered inside an application, such as a browser application, is completely dependent on the data in the state machine and the user interface is updated indirectly through the state transition as described below in more detail. Thus, the SPA builder 106A provides UI rendering dependent on the state data in the state machine, and the update of the state data and/or the state transition through user interaction and asynchronous responses from the backend.

Figure 3:
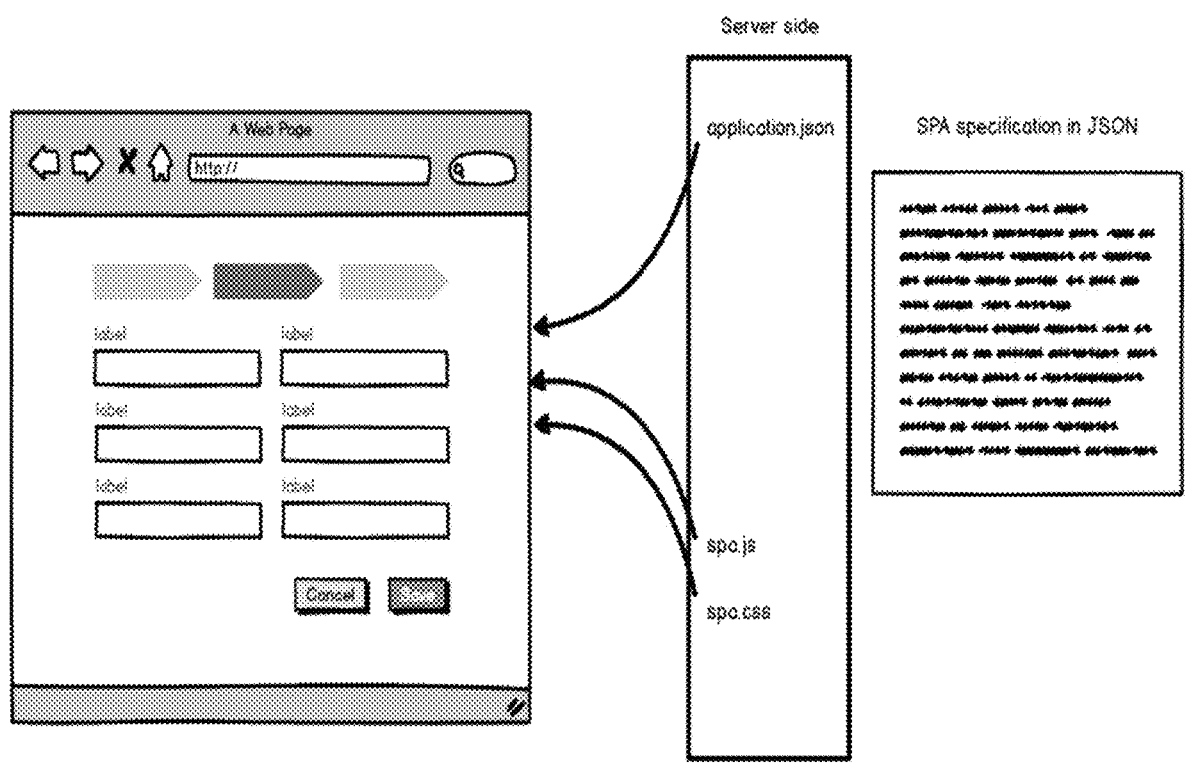
FIG. 3 illustrates a method for building an SPA using SPA specification in JSON.

FIG. 3 illustrates an example of an SPA that was built using the SPA builder. The SPA may include an SPA specification (application.json) that describes the look and feel and behavior of the SPA and may be written using an SPA description language in JSON and stored at the backend 106 side. An example of an SPA may be found in Appendices A-F that contain an application.json file and other files called by the application.json file and Appendices A-F are incorporated herein by reference. When a user opens the SPA in a browser as shown in FIG. 3, the browser loads the SPA specification JSON file, plus SPA libraries (spa.js and spa.css) and renders the interactive SPA in it.

In the SPA mock-up shown in FIG. 3, the SPA builder uses a finite state machine (FSM) model in web application development. The FSM decouples the UI rendering from UI interaction, and thus make the development easier using the set of rules described above. The SPA builder disclosed is especially suited for users, such as system administrators, who may not have strong technical background. By using the real-time state information and a comprehensive list of built-in UI components (described above), the user can build the final web application without writing JavaScript code.

Figure 4:
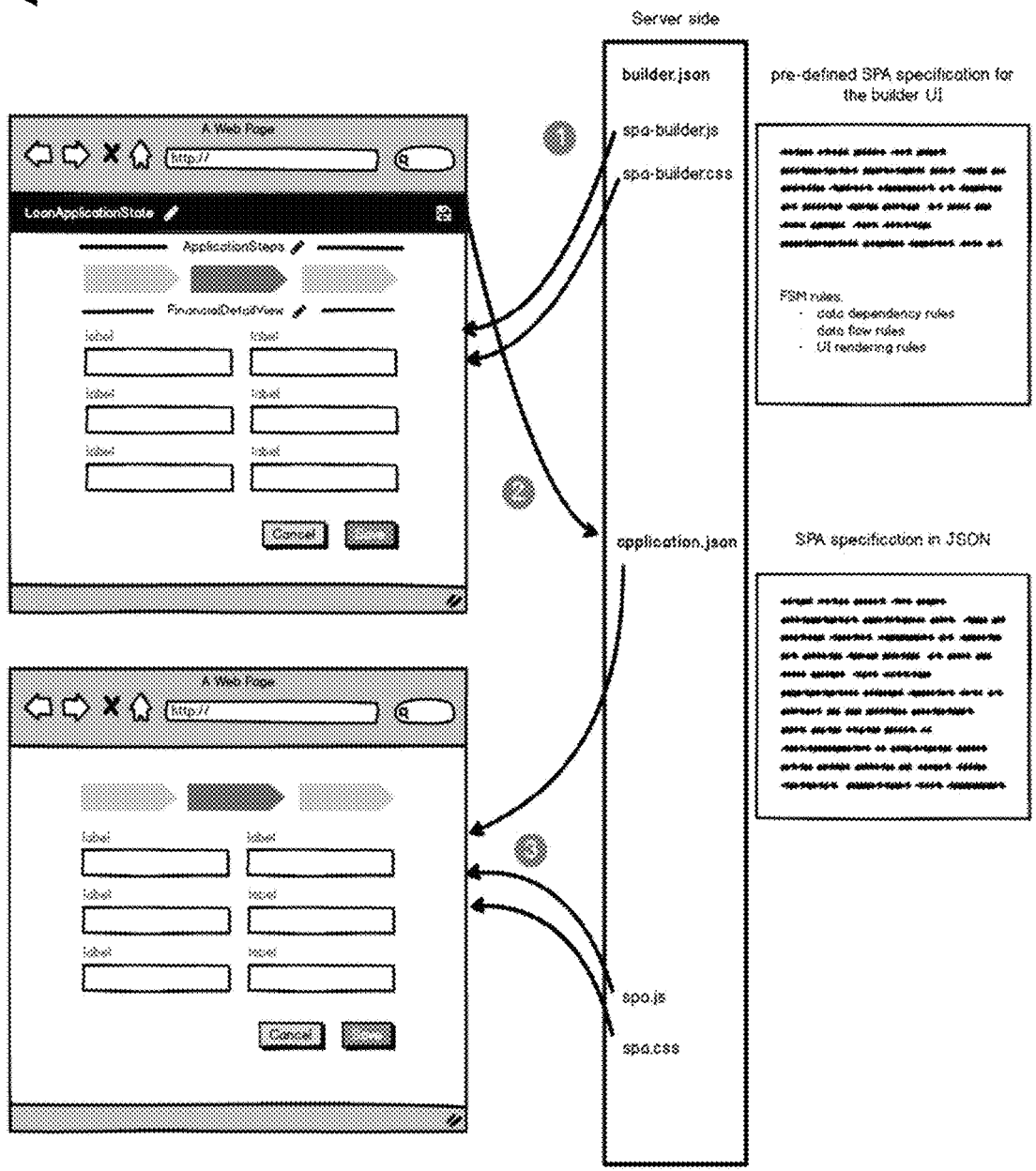
FIG. 4 illustrates a method for building an SPA using the SPA builder.

FIG. 4 illustrates a method 400 for building a SPA using the SPA builder. The SPA builder helps a user, such as a system admin, to generate the SPA specification in an intuitive graphical user interface. In a first step, a user loads the SPA builder libraries (spa-builder.js and spa-finite) from the backend into the browser of the user's computing device and builds the SPA UI as shown in the top browser window mock up in FIG. 4. For example, these libraries may include the above described set of pre-configured user interface elements and the various set of rules of the FSM as described above. In a second step, the user saves what he/she has built to the backend (the storage 108 for example as shown in FIG. 1) as the SPA specification JSON file (application.json) that may be used to generate/implement the SPA. In a third step, the user can interact with the final SPA using application.json, spa.js and spa.css in the browser window as shown in a bottom browser window mock up in FIG. 4. The building process of the SPA using the SPA builder 106A can be categorized into processes to determine: how UI interaction (including user directly interaction and asynchronous responses from the backend) affects the state data; and how the UI is rendered from the state data.

Finite State Machine Model Elements

The FSM model of the SPA builder may include various UI components and a UI component is the basic unit.

FSM UI Component

A UI component specifies a set of variables as a prerequisite. In order to make a component fully functional, the variables listed as the component prerequisite need to be assigned with proper values. The prerequisite set can be empty. Therefore, configuring a UI component may specify:
1. How to query data from the backend database,
2. How to render itself in a browser,
3. How a user can interact with it through its actions, and
4. What happens when a user interacts with it.

As described above, the configuring of the user interface element is partially done by the built in user interface elements and partially by a user when the user builds the SPA as described above. Certain UI component does not require each feature. For example, a panel UI component does not need to query data from the backend database.

A UI component is self-contained. Feature 1-3 should be limited to the component itself. That is, feature 1-3 should not be dependent on any data outside of the component. Feature 4 describes the inter-component interaction and/or state transition through actions and may involve other components in the current state or another state.

In a simple example, inside of an SPA, a list of contacts from a specific account is displayed.
1. The UI component is a list view.
2. Assuming the backend database has an Account table and a Contact table and accountId as a primary key in the Account table is a foreign key in the Contact table.
3. When the UI component queries data from the backend Contact table, a specific accountedId should be provided in the query where clause.
4. As a result, accountedId is a prerequisite variable of this list view. Once accountId is assigned to a value, querying data can be done by passing accountId to the where clause.
5. However, how does accountId get assigned is a different story with inter-component interaction or state transition in Feature 4. Feature 1-3 can assume the component prerequisite has been satisfied already.

Figure 5:
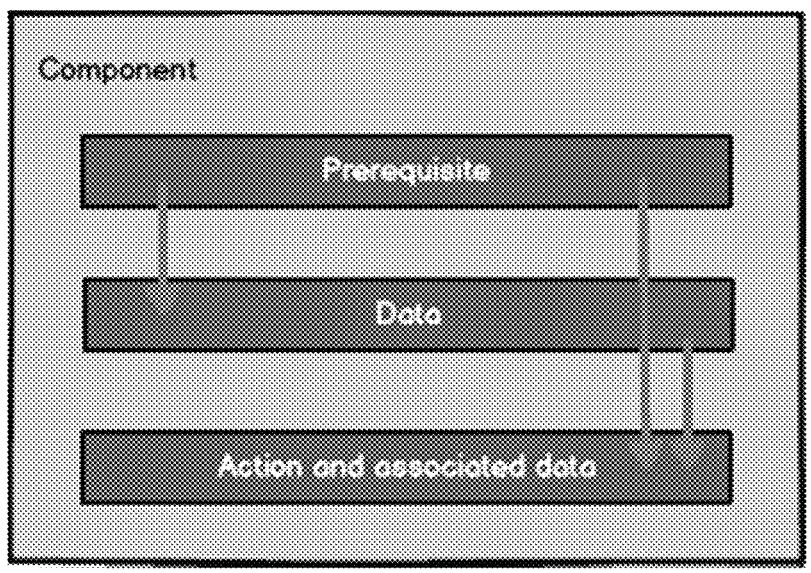
FIG. 5 illustrates the data dependencies within a user interface component.

FIG. 5 illustrates the data dependencies within a user interface component wherein the data dependencies are shown by the arrows inside a component. As shown, the component data depends on its prerequisite and the component data can be the queried data from the backend or the user's input data. Furthermore, the action data depends on the component prerequisite and the component data.

FSM State

A state contains a group of UI components. A state transition means that the SPA displays a different group of UI components while a user interacts with the SPA. Like the UI component above, a state also specifies a set of variable as prerequisite. In order to enter a state, the variables listed as the state prerequisite need to be assigned with proper values, but the prerequisite set can be empty.

Figure 6:
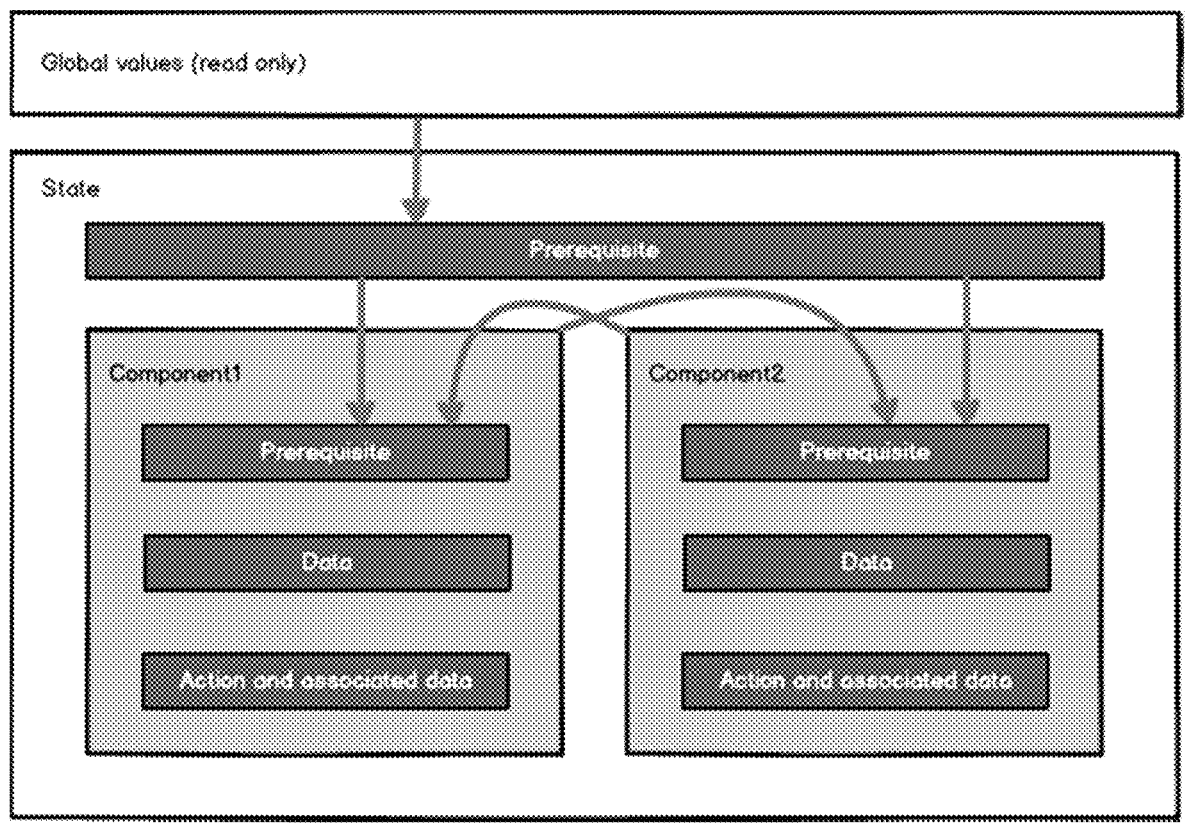
FIG. 6 illustrates an example of a state and its data dependencies.

FIG. 6 illustrates an example of a state and its data dependencies. In the example shown in FIG. 6, the state contains two UI components (component1 and component2) in which one UI component displays the detailed information, such as for a specific loan application in one example of an SPA, and the other UI component displays a queue view of the required documents, such as for the same loan application in one example of the SPA built using the SPA builder.

In the example SPA for a loan application, since this state is about a specific loan application, loanId is a state prerequisite variable. In order to enter this state, loanId needs to be assigned to some proper value. Inside this state, both the detail view and the queue view can have the same loanId as its component prerequisite variable.

The state is self-contained. Thus, inside a state, a component prerequisite is completely dependent on the state prerequisite and the components (their prerequisite, data, and action associated data) in the state. The state prerequisite is dependent on the global values that may be read only (as shown in FIG. 6) and rarely used. For example, two main global values may be a session Id (a randomly generated unique identifier to group the data related to the current session at the backend) and authenticated user information. The global values may be accessible by all states and components of the SPA. State prerequisite can be updated by actions during state transition. As shown in FIG. 6, the data dependencies of the state prerequisite with the global values and the component prerequisites with the state prerequisite are shown. FIG. 6 also shows that the data and actions of a component (Component 1 in this example) may affect the prerequisite of a different component (Component2 in this example) as described above.

FSM Action

One or more actions belong to an individual component as shown in FIGS. 5-6. An action can be triggered when a user interacts with the SPA. Moreover, a component can have automatic actions (described below), which can be automatically triggered when the component is loaded. The configuring of an action specifies its definition, appearance, and behavior.

Figure 7:
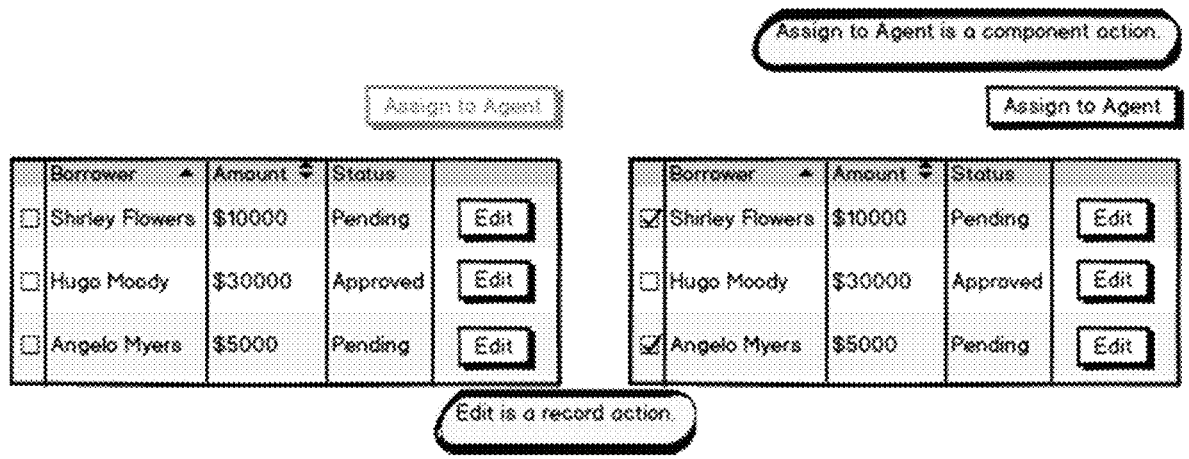
FIG. 7 illustrates an example of a record action and a component action.

Action definition includes whether an action is associated with individual records in a component (a record action) or not (a component action). As an example, a component can query a collection of records from the backend 106 or storage 108. FIG. 7 shows an example of a record action and a component action in the context of a list view of loan contracts. The Edit button in FIG. 7 in each row is a record action since clicking the edit button shows a detailed view to be able to edit the specific contract. Thus, the edit button is an action taken with respect to a particular record, which is also the action's associated data. The Assign to Agent button is associated with multiple selected contracts in the list view (as shown in a right-hand side of FIG. 7) and thus is a component action since the action affects the component and not just a record.

Action definition also includes whether an action is a remote action that, once triggered, will launch asynchronous communication with the backend, for example, saving the user's input data to the backend database or calling a remote API.

The action behavior describes how an action, once triggered, updates the components in the current state or transition the SPA to another state. A remote action has two types of behavior, one for the success response from the backend and the other for the failure response.

Certain actions may have their own associated data. For example, when a user clicks a record, the record data is associated with the click-record action. As another example, when a remote action receives a success response from the backend, the backend response is associated with the remote action.

When a remote API is designed, the returned backend response should include the complete input data set so that the API input is associated with the remote action and thus can be easily used in the action behavior.

Action Behavior Details

Figure 8:
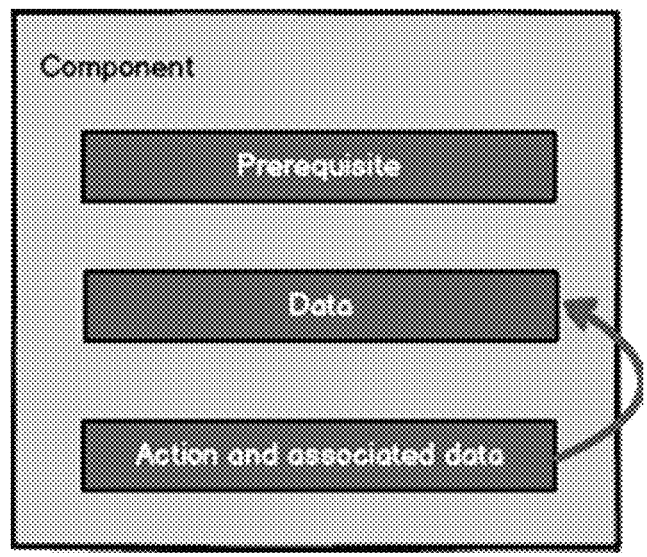
FIG. 8 illustrates an example of an action updating its component data.

Each action behavior may be used to perform different tasks. For example, an action behavior may be to update the component data in the current component, an example of which is shown in the example in FIG. 8 in which the data update is shown by the arrow showing the action updating the data of the component.

Figure 9:
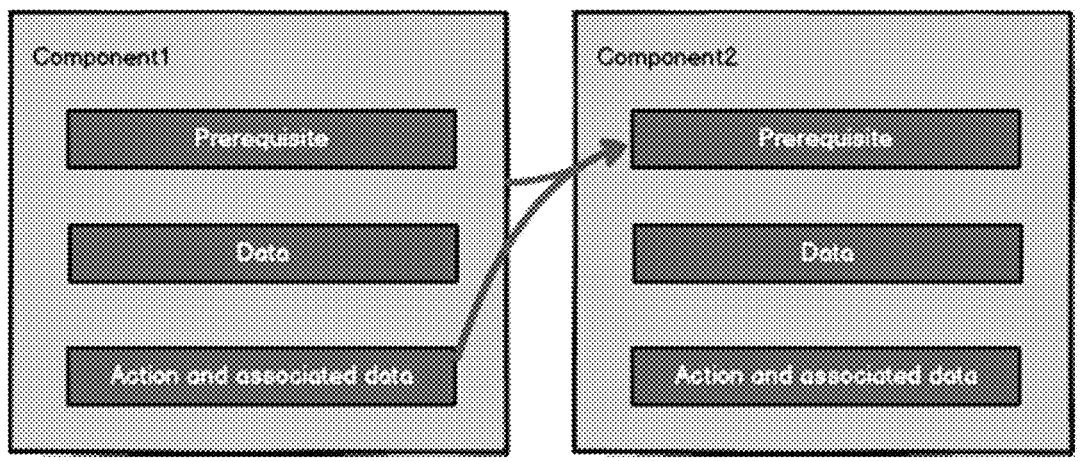
FIG. 9 illustrates an example of an action updating other components in the current state.

An action behavior also may be used to update other components in the current state as shown in the example in FIG. 9 in which two components in the same state are shown. Inside a state, between-component data passing can only be done through actions. But only the component prerequisite can be updated. Action behavior cannot directly update the data in other components as shown in FIG. 9. Furthermore, only the data associated with the action and in the source component (where the action is triggered) can be used to update the prerequisite of other components.

Figure 10:
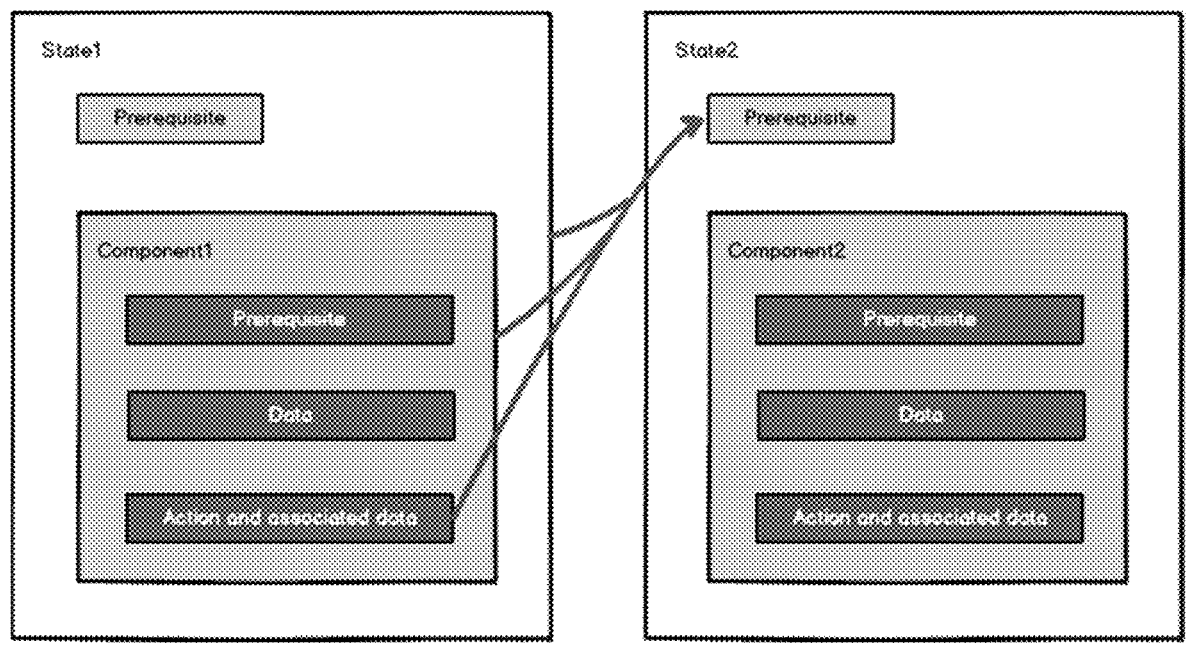
FIG. 10 illustrates an example of an action doing a state transition.

An action behavior also may be used to do a state transition as shown in the example in FIG. 10. During the state transition, only the prerequisite variables of the next state can be updated. Action behavior cannot directly update the components inside the next state. The data associated with the action, in the source component, as well as in the current state can be used to update the prerequisite of the next state. In most cases, the data associated with the action and in the source component is used to update the next state's prerequisite and the data from other components in the current state as a broader and enclosing scope should be rarely used. Therefore, when a user is defining an action behavior, he/she can be incrementally disclosed different data sources, from the specific and most relevant ones to more generic ones, as discussed below.

The action behavior also may include opening or closing a modal dialog, as well as marking components in the current state as need-to-be-refreshed because the SPA builder uses a lazy loading mechanism to update the component data in order to avoid unnecessary queries at the backend.

UI Rendering

Figures 11, 12:
FIG. 11 illustrates an example of user interface rendering.
FIG. 12 illustrates an example of an implementation of the dynamic data picker.

UI rendering is about how to display a component based on its prerequisite and data as shown in the example shown in FIG. 11. In this example, an editable detail view has a dropdown list of Identification Document Types. Depending on the selected value of the document type (in component data), in real time, either dl-section (left portion of FIG. 11) or passport-section (right portion of FIG. 11) is rendered. The arrows in FIG. 11 indicate the conditional rendering (of the driver's license UI or the passport UI) based on the component data.

UI Design Patterns Related To State Data

State data (including the state prerequisite, the component prerequisite, the component data, the action associated data, as well as the global values) is the main piece in our SPA builder. State data can be used (read only) to render the UI and initialize the prerequisite of state and component. Actions can update certain state data using other state data.

Figure 13:
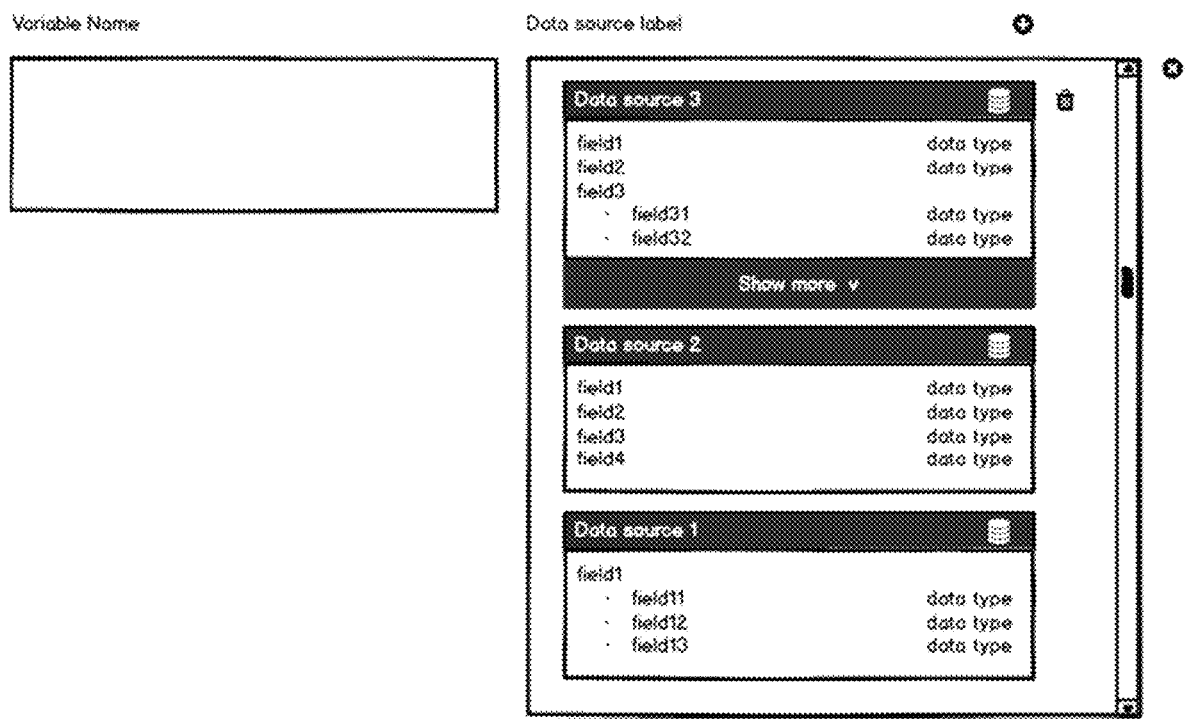
Figure 14:
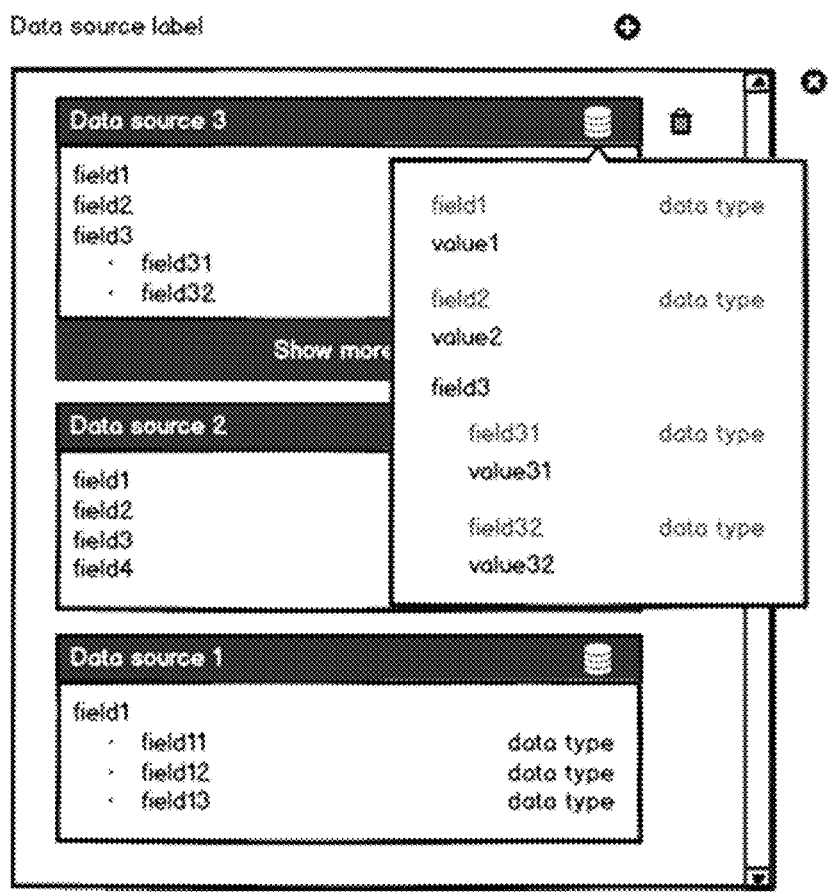
Figure 15:
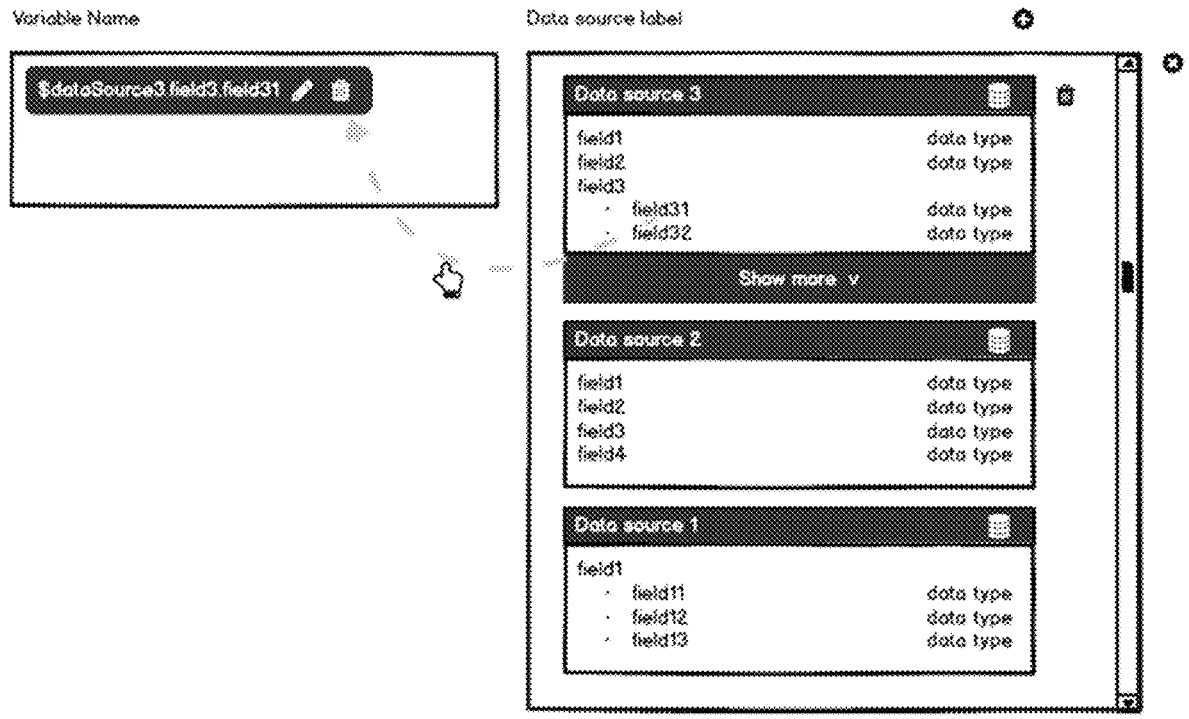

Data selection and assignment are the basic data-related user interaction. The SPA builder may have two UI patterns (dynamic data picker and a data object known as a data lozenge) to accomplish these interactions. For example, a user wants to assign a variable in the UI to certain value using the state data. The variable can be a prerequisite variable of a component or a state, a built-in variable to control the conditional UI rendering, or a data variable that an action is going to update. FIG. 12 illustrates an example of a dynamic data picker and, by default, the user sees the variable name and an plain-text input field as shown. The dynamic data picker is not displayed by default and can be open on-demand. When a user clicks the magnifying glass icon in FIG. 12, the dynamic data picker may be opened as shown in FIG. 13. The dynamic data picker displays a list of data sources at the right-hand side. In certain situations, the user can add and delete certain data sources. Data sources can be global values, the state or component prerequisite, component data, and action associated data. The user can click the close icon right to the dynamic data picker to close it. The UI then goes back to the UI shown in FIG. 12. In each data source, only the metadata (the field name and its data type) is displayed. The user can click the database icon at the top-right corner of each data source, as shown in FIG. 14, to check the data values. As shown in FIG. 15, the user can then drag and drop a field in the data source to the left-hand text area. The field dropped in the left-hand text area forms a data object that may be known as a data lozenge. The user can click the trash icon in the data lozenge to remove the selected field. The SPA builder may include some syntax in the data lozenge. Specifically, once the user learns the syntax, the user can directly type in the syntax in the input field in the UI in FIG. 12 without opening the dynamic data picker to improve efficiency.

Figure 16:
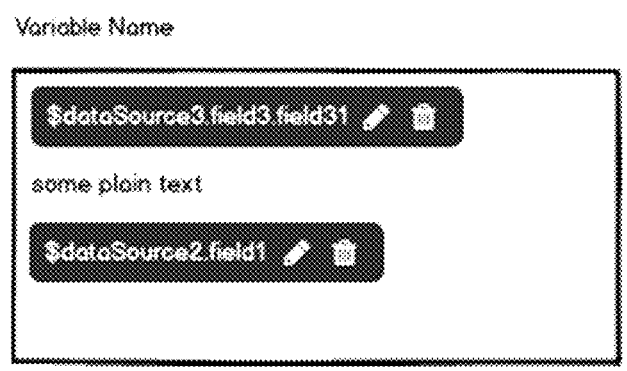
Figure 18:
Figure 19:

The user can drag and drop multiple fields into the left-hand text area. Moreover, multiple fields can be concatenated as plain text and with other pieces of plain text as shown in the example in FIG. 16. Once a field is selected, the user can do extra manipulation by clicking the edit icon. For example, the user can sum up the value of the selected field from all the records in a component and then specify the value to be displayed as certain format, as shown in the examples in FIGS. 17 and 18. Then the user can close the dynamic data picker to go back to the original UI (in FIG. 12), but the input field displays the final syntax as shown in FIG. 19.

Method for Building an SPA

Figure 20A:
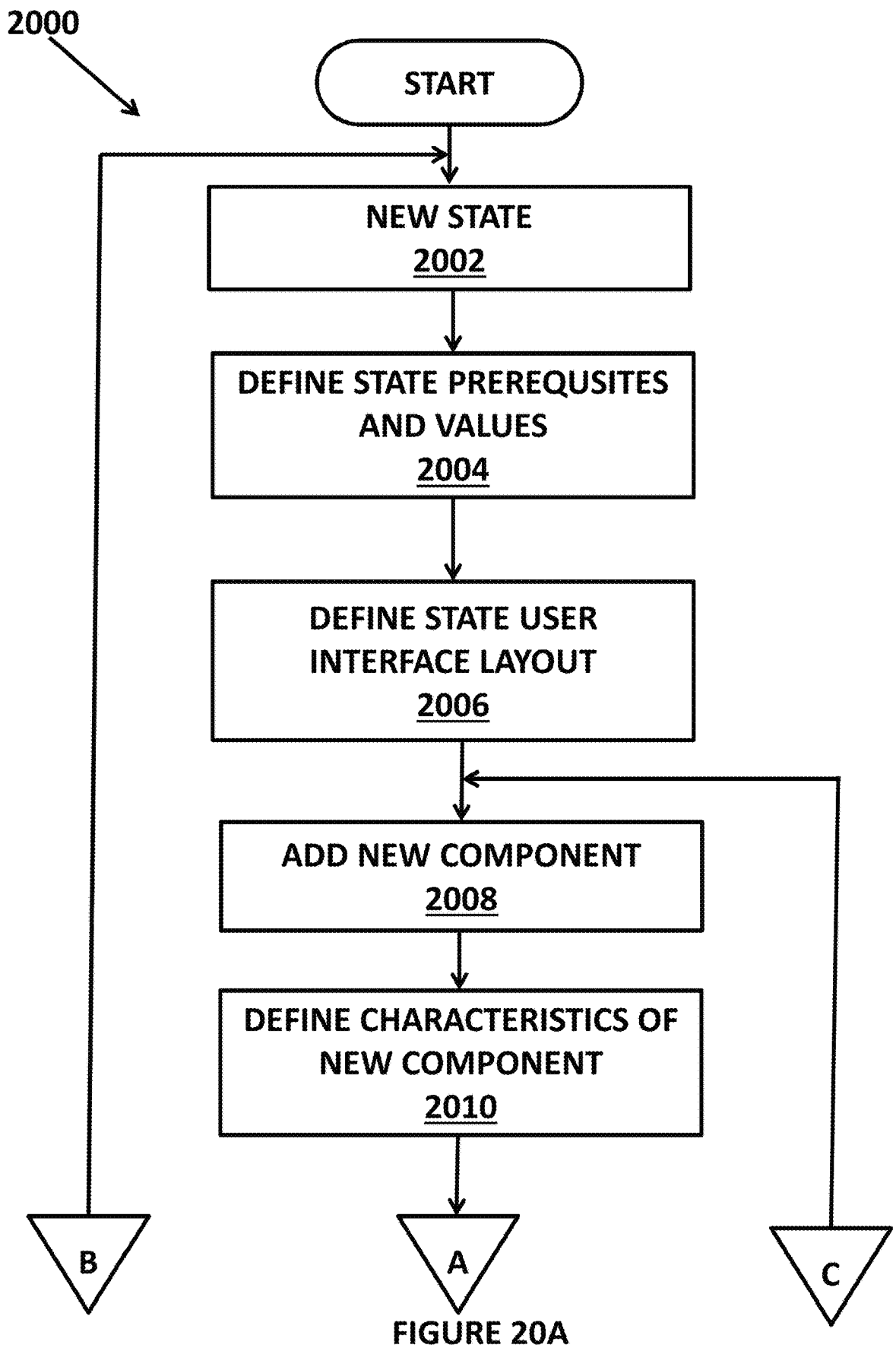
FIGS. 20A and 20B illustrate a method for building an SPA.
Figure 20B:
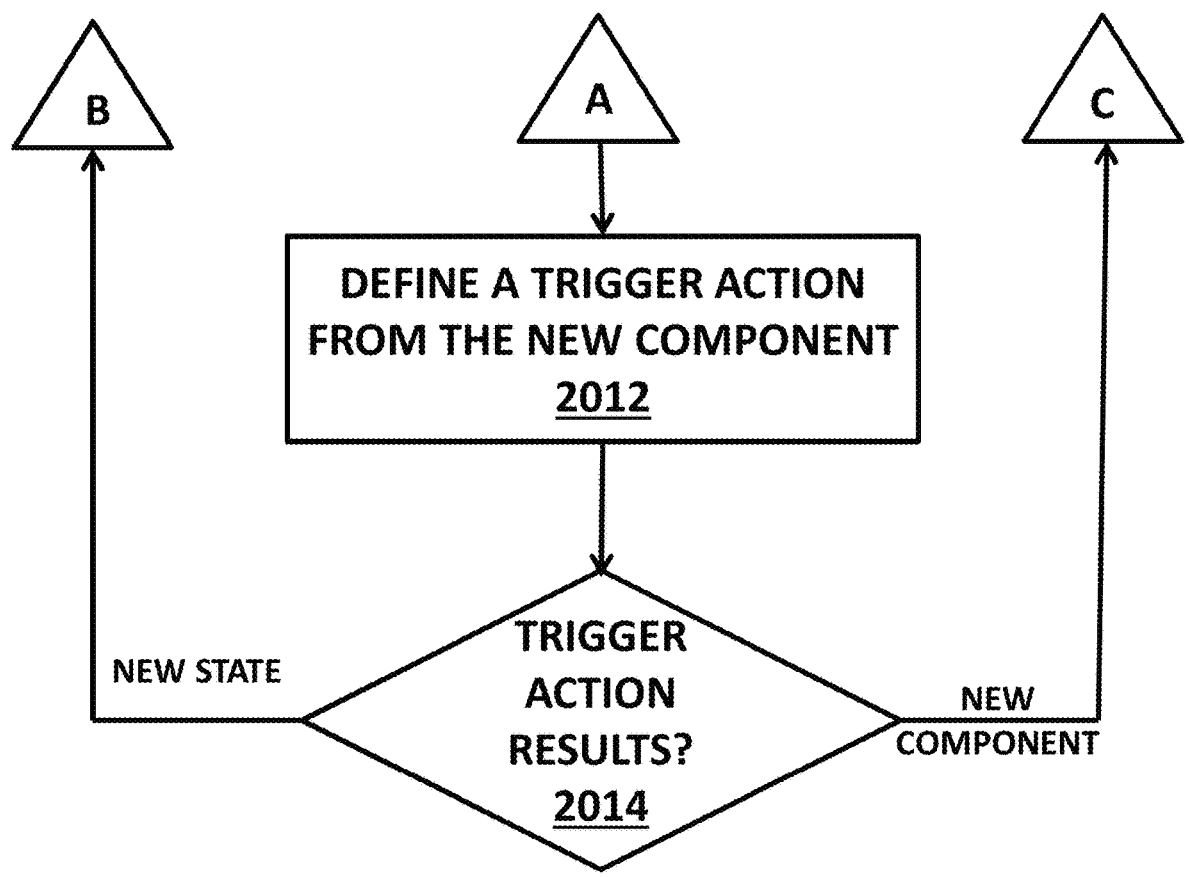
Figure 21:
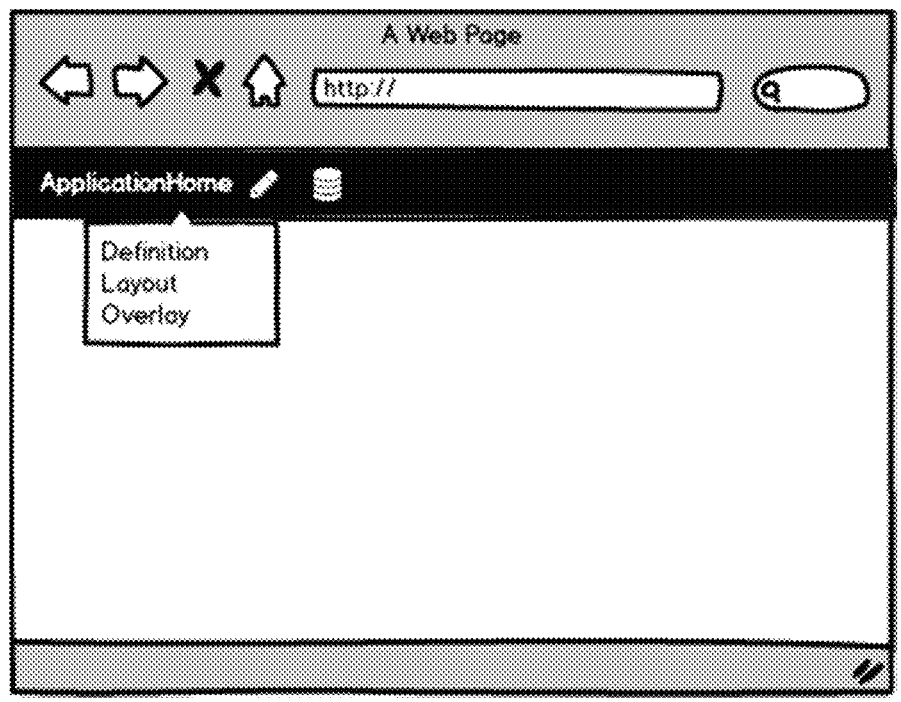
FIG. 21 illustrates an example of a new state being entered in the method.

FIGS. 20A and 20B illustrate a method 2000 for building an SPA. In one implementation, the SPA builder in FIGS. 1-2 may be used to build an SPA. However, the method set forth in FIGS. 20A-20B may also be practiced using other techniques, hardware, etc. that would be within the scope of the disclosure. In the method, a SPA may be built by starting with a new state in the builder (2002), an example of which is shown in FIG. 21. The prerequisites of the state and its values may be defined (2004) based on the data dependency and action execution data flow rules in the FSM. The state prerequisite and values may be defined based on the global values and the triggered action that leads to this state such as shown in FIG. 22. The data sources from the triggered action includes the action-associated data, the prerequisite and data from the source component, and the complete data set from the previous state, including the state prerequisite and the prerequisite and data from all the components in that state. The user can use the dynamic data picker to incrementally disclose those data sources, as shown in FIG. 22.

Figure 23:
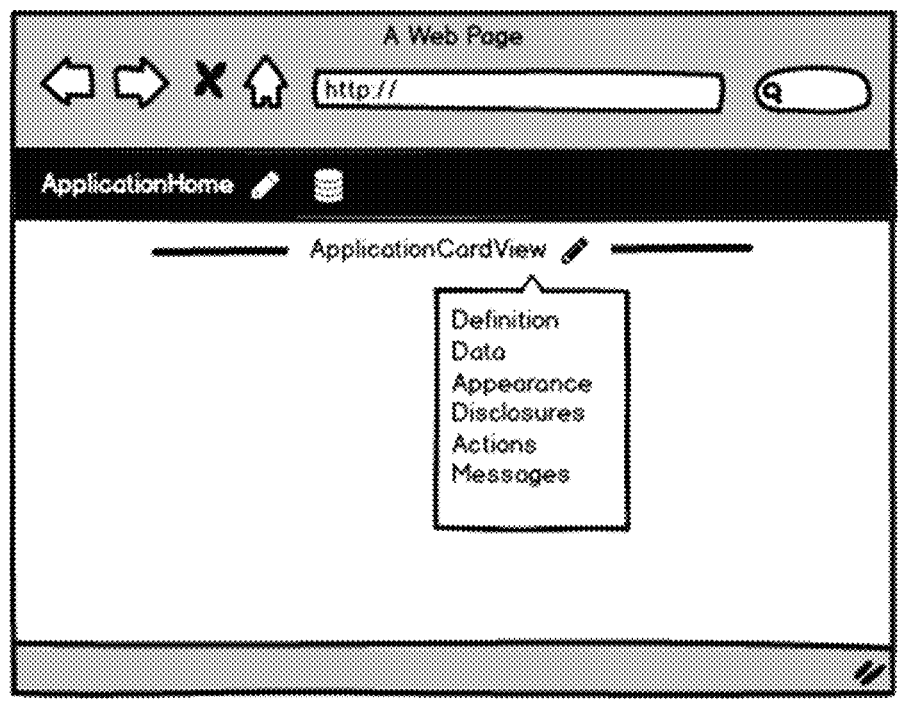
FIG. 23 illustrates an example of a new component being defined.
Figure 27:
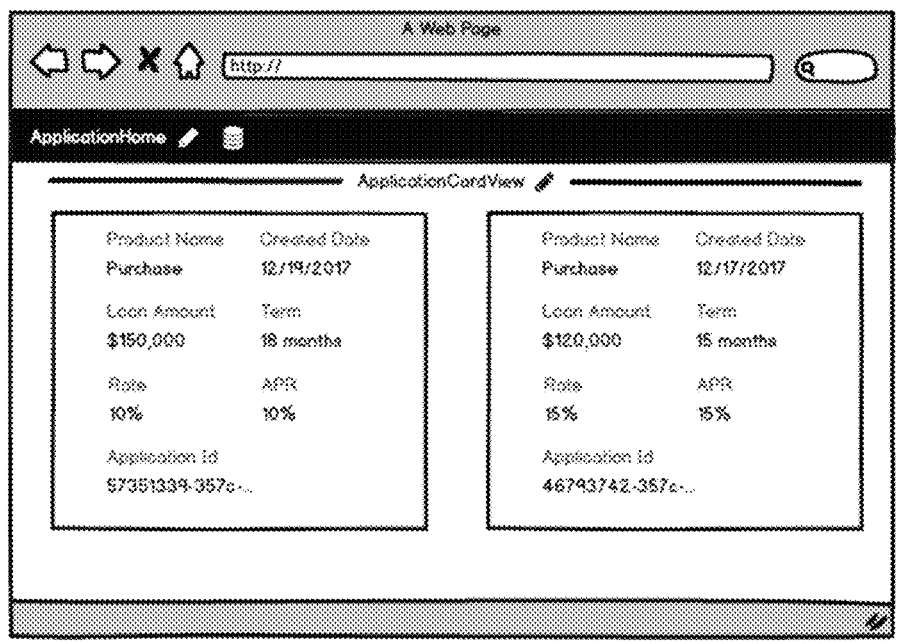
FIG. 27 illustrates an example of querying real time data from the backend while building the SPA.
Figure 25:
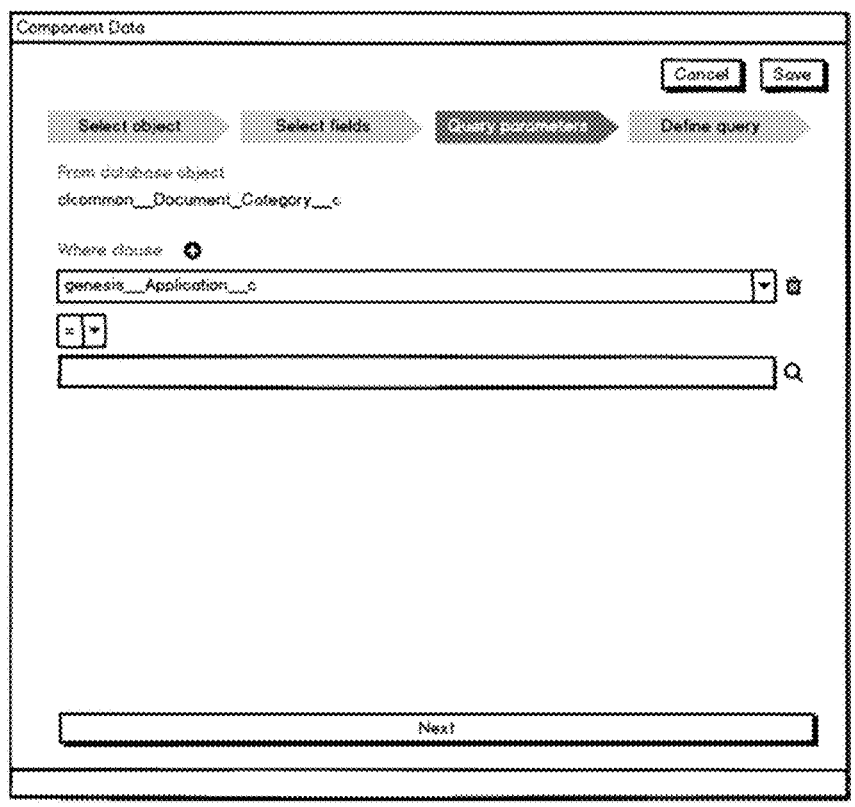
FIGS. 25 and 26 illustrate a process for defining the component data.
Figure 26:
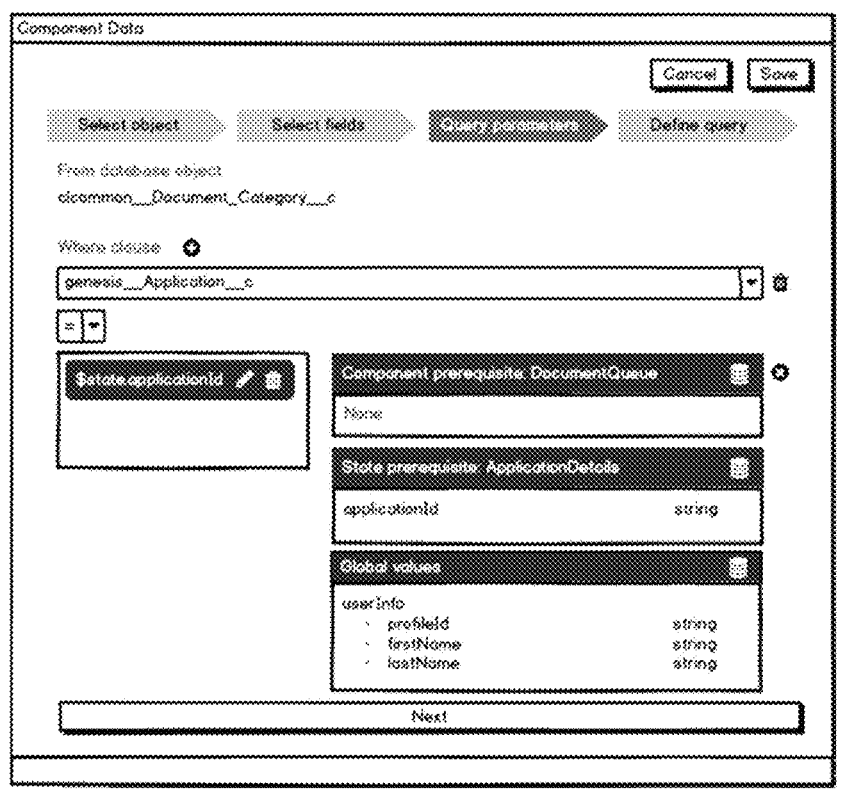

Once the state prerequisites and values are defined, the method may define the state user interface layout (2006). In one embodiment, a user may select the state UI layout from the UI of the SPA builder. A new component may be added to the state (2008), an example of which is shown in FIG. 23. In one embodiment, the user may select a component element from the UI of the SPA builder and place the component into the state UI layout. The various characteristics for the new component may then be defined (2010), an example of which is shown in FIG. 24 that shows the component being defined as a card view. In one embodiment, the user may select/define the characteristics from the UI of the SPA builder. Thus, for the new component, a component prerequisite is defined and assigned one or more values to the component prerequisite from the global values, the prerequisite of the current state, and/or the prerequisite and data from other components in the current state. Data sources also can be incrementally disclosed in the same style shown in FIG. 22 but with different types of data sources enforced by our FSM data-flow rules. For the new component, a component type and the component data may be defined. In particular, a query structure and query parameters may be specified (FIG. 25) if component needs to query data from the backend. As shown in FIG. 26, the query parameters can be assigned from global values, the current state prerequisite, and the current component prerequisite using the dynamic data picker base on the data dependency and action execution data flow rules. In the method, real data stored at the backend may be queried so that the user can immediately see the card view in the final SPA as shown in the example in FIG. 27.

The UI rendering from the component prerequisite and data may then be defined a part of the characteristics of the new component based on the FSM UI-rendering rules. One or more actions of the new component may also be defined.

Returning to FIG. 20B, an action may be triggered from the new component (2012) and the trigger action results are determined (2014). If the triggered action result is a new state, then the method loops back and a next new state is entered (2002) and the next new state prerequisites, UI, components (as described above) are defined. If the triggered action result is a new component, then the method loops back and a next new component is added (2008) and the characteristics of the next new component are defined as described above. Once the user finished specifying an action's behavior, he/she can define other actions in the components.

In this manner, the method systematically defines each element of the SPA (starting with each state and then defining each component and action) in top down manner to build the SPA. In one embodiment, the SPA builder and its UI examples act as a decorated UI managing the UI the user is building. As a result, the SPA builder can access and manage the state data used by the final application. As a result, once a user makes a change through the SPA builder, the user can observe and verify the UI update immediately without reloading the web application.

Figure 29:
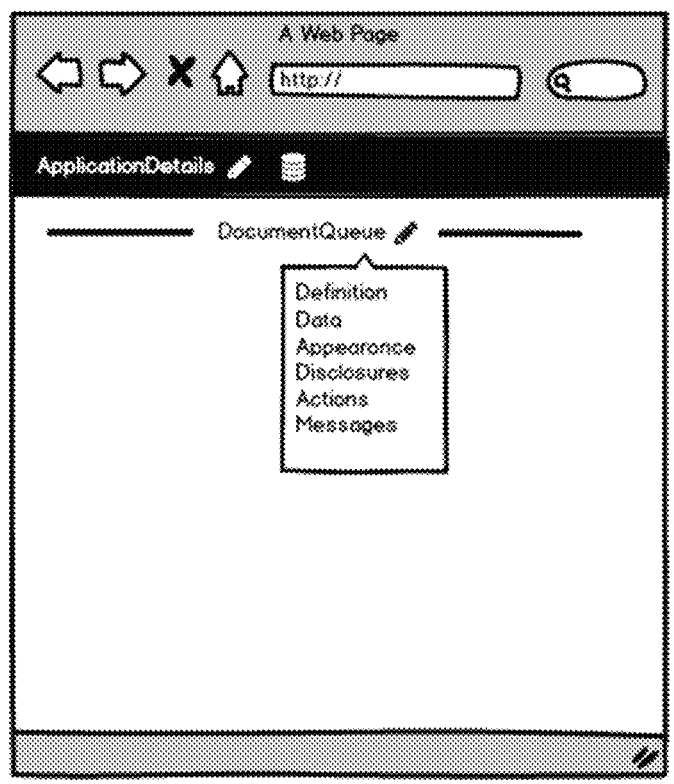
FIG. 29 illustrates an example of a next state and component to list required documents for a loan application.
Figure 30:
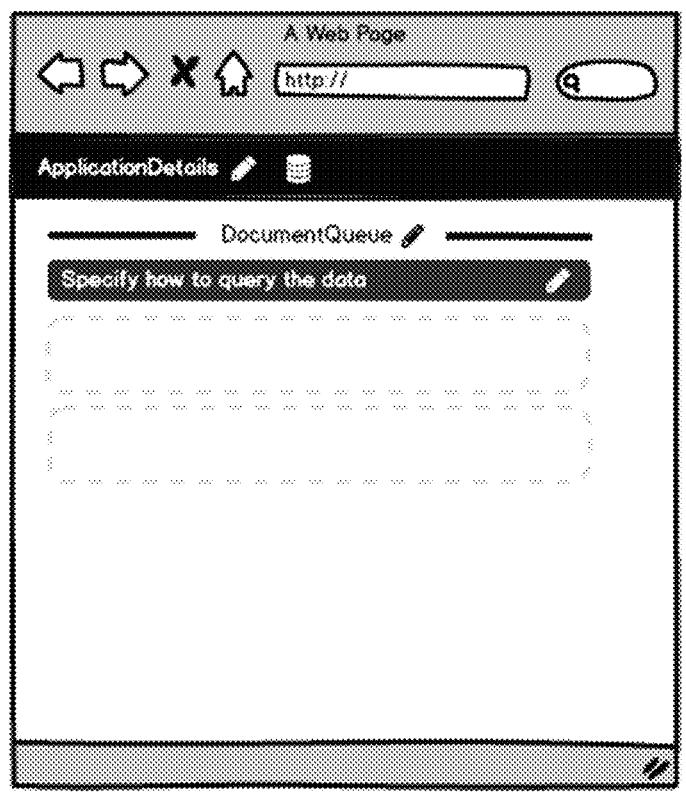
FIG. 30 illustrates an example of specifying the queue view of the component to list required documents for a loan application.
Figure 31:
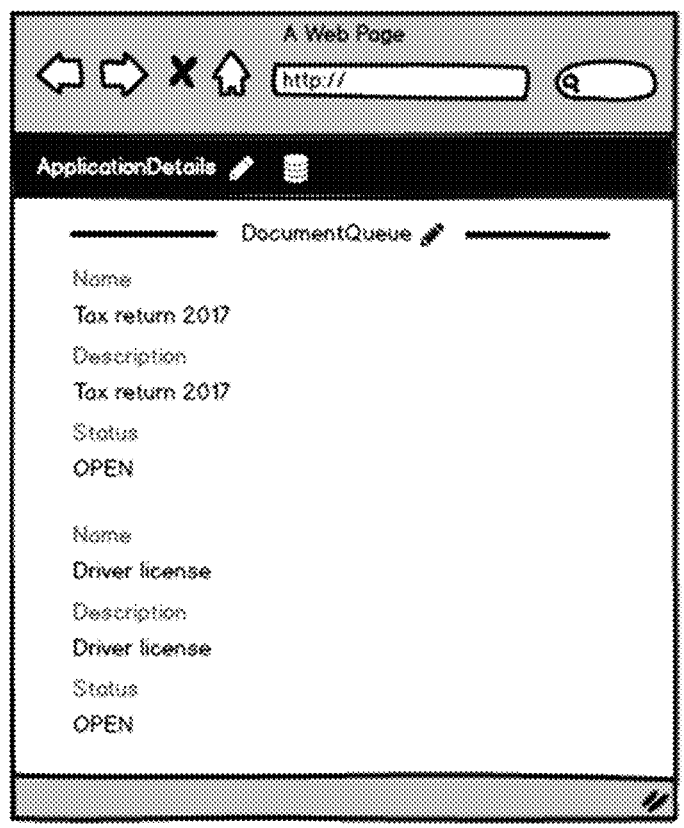
FIG. 31 illustrates an example of immediately querying the backend and seeing the final queue view.
Figure 32:
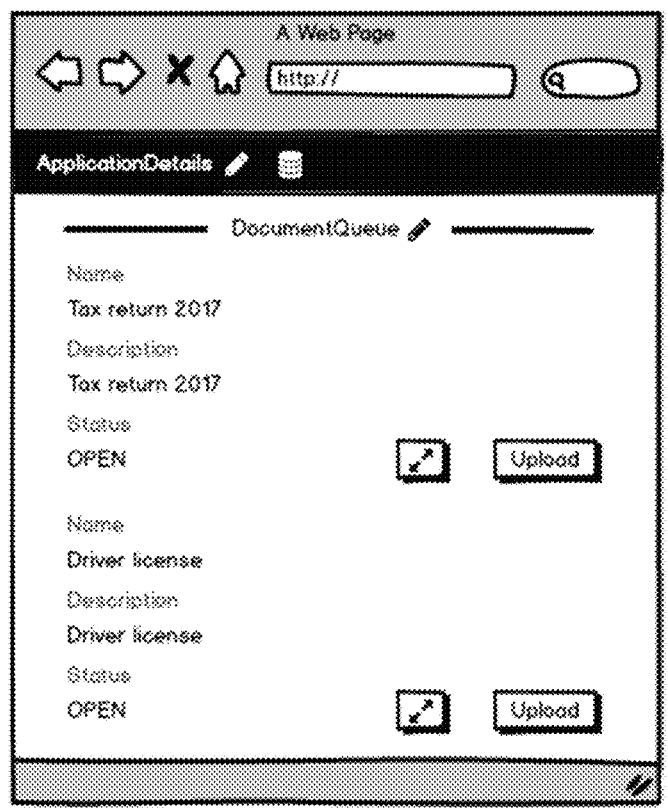
FIG. 32 illustrates an example of a user customizing the queue view of the SPA for a loan application.

In the example for the loan application described above, a next state and a component to list required documents in a loan application may be defined as shown in FIG. 29. Then, a queue view may be added as shown in the example in FIG. 30. Then, the real data stored in the backend may be queried, as shown in the example in FIG. 31, for the queue view so that the user can immediately see the queue view as it looks in the final built SPA. As shown in the example in FIG. 32, the user may then add further to customize the SPA such as an upload button and the preview button to each record in the document queue view. The user can then upload documents to the backend and preview the uploaded document in the same style as he/she will interact with the final SPA.

Figure 28A:
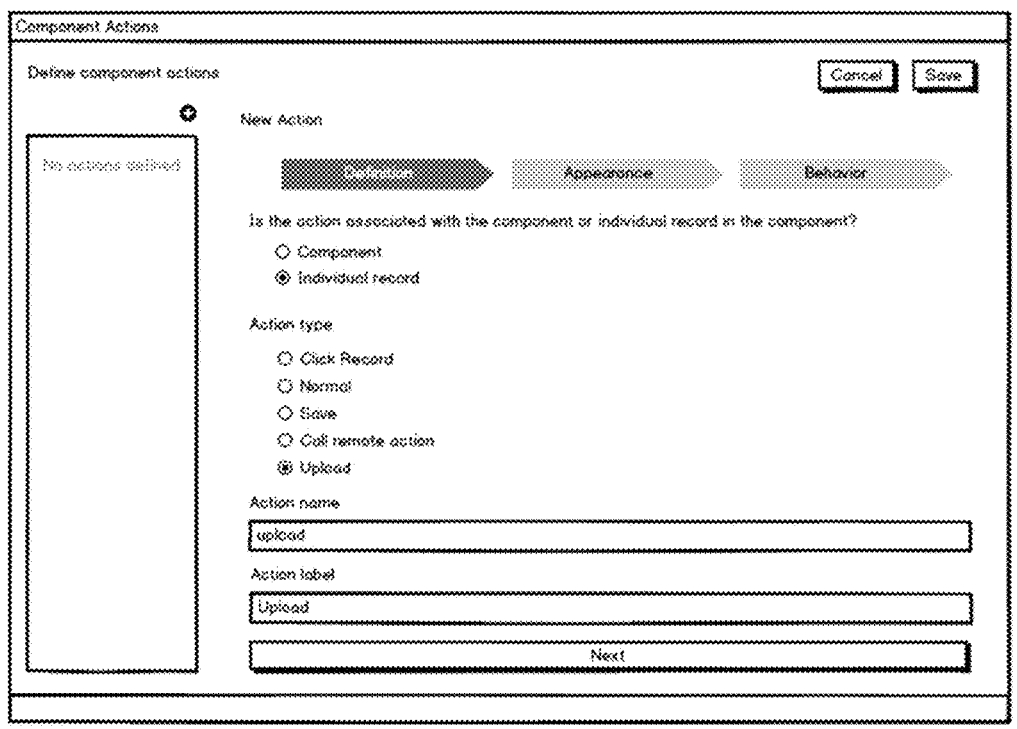
Figure 28B:
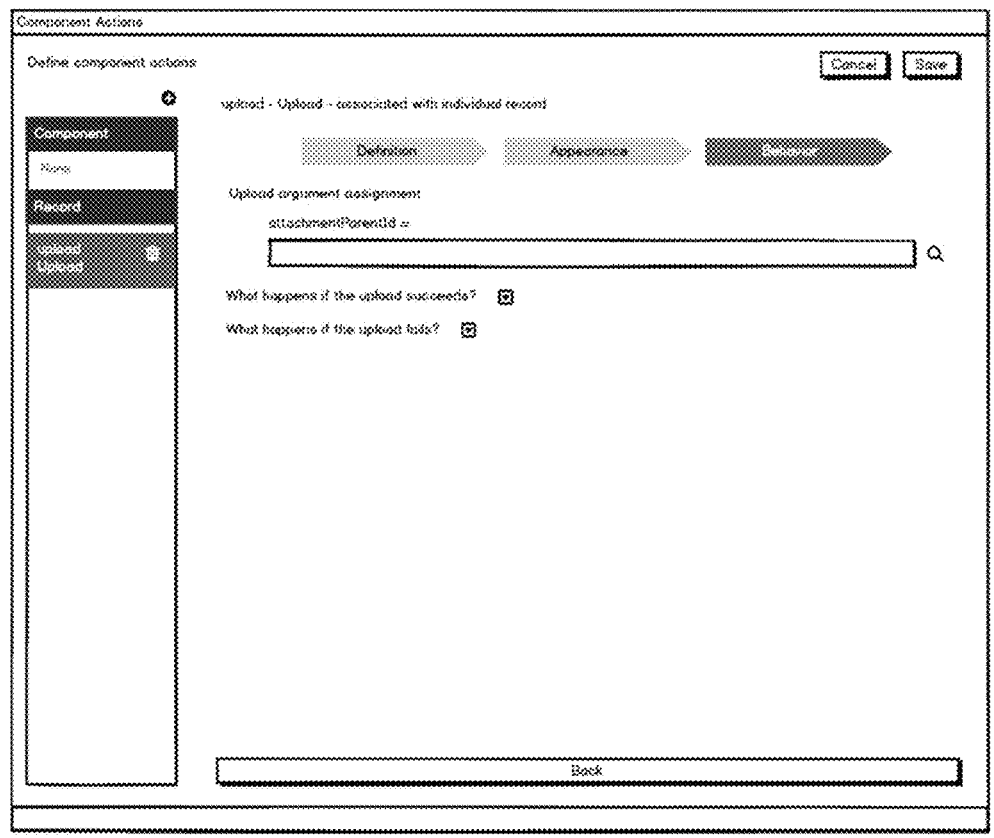
Figure 28C:
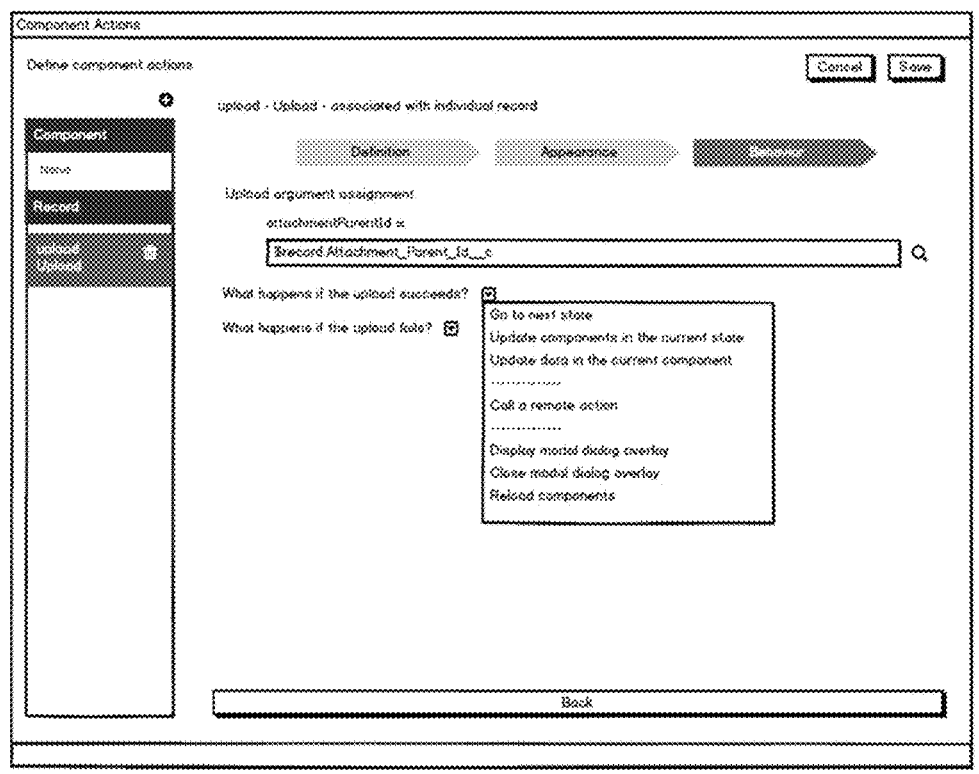
Figure 28D:
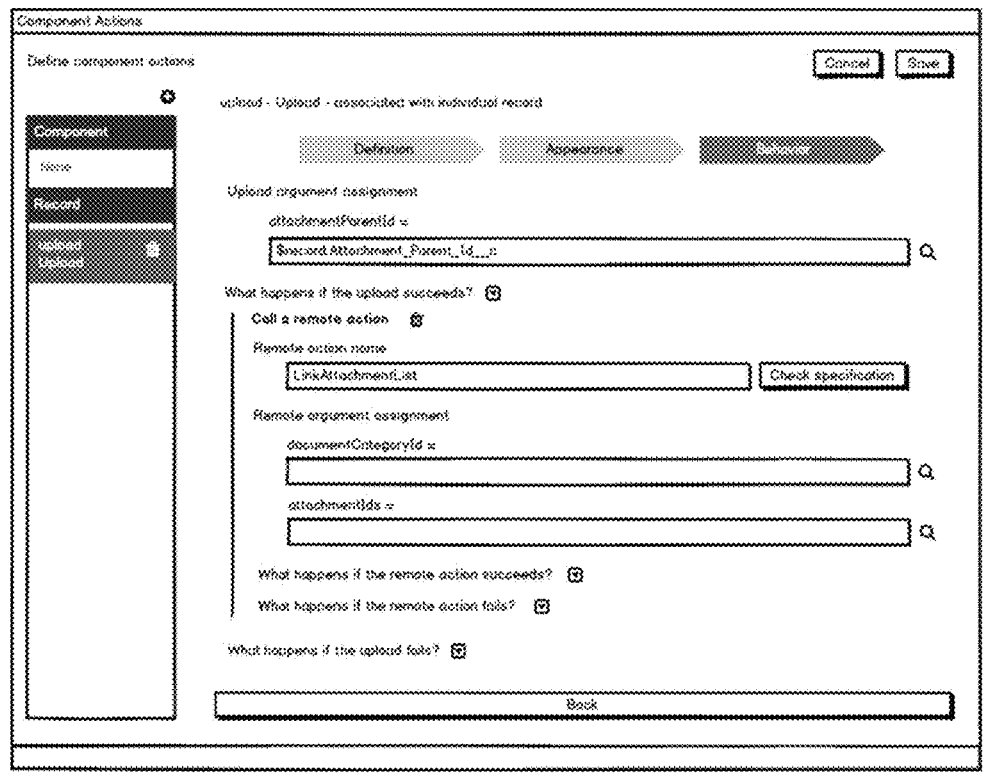
Figures 28E, 28F:
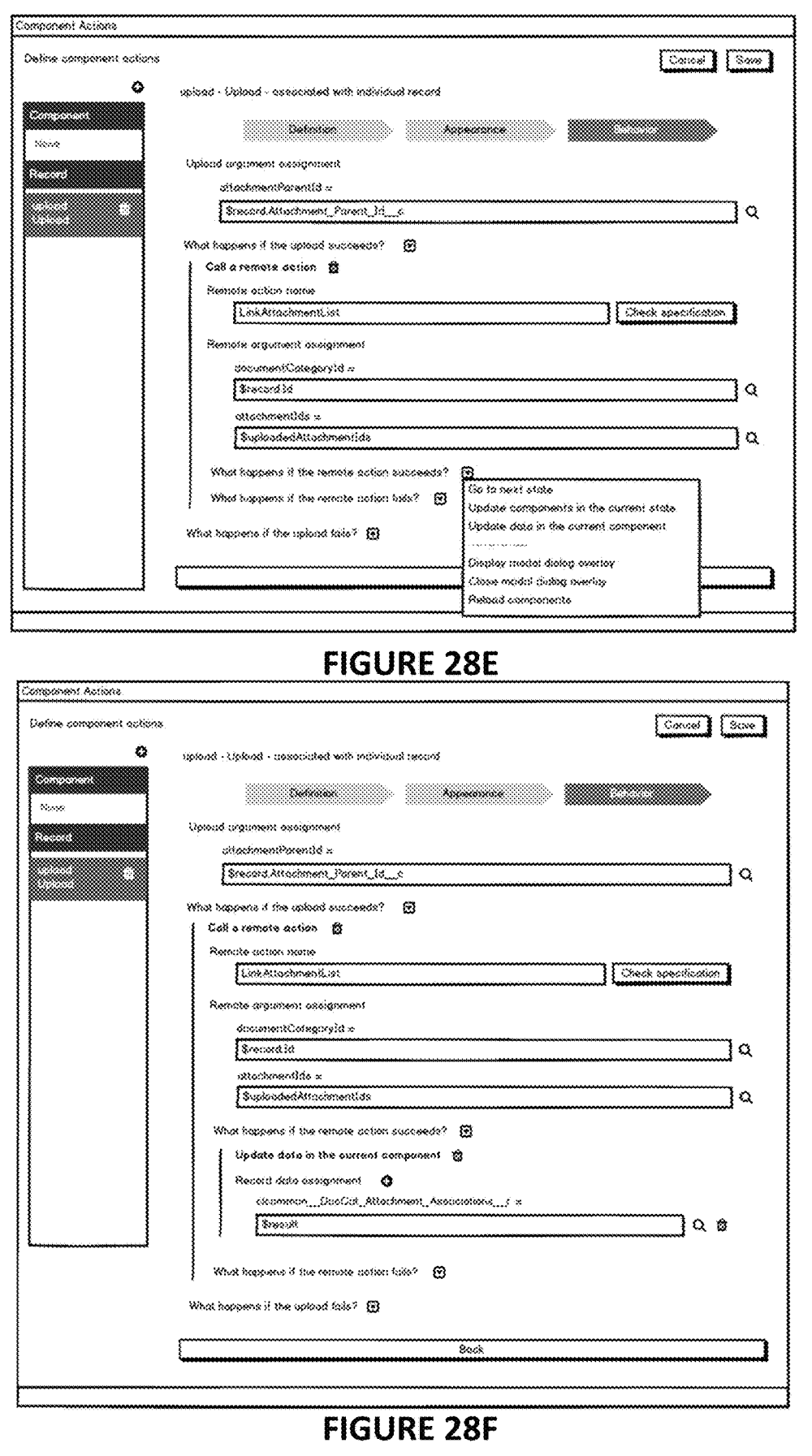

In FIG. 28A, an upload action is defined and associated with each record in a view. As shown in FIG. 28B, the action behavior is specified. For example, once a user chooses and uploads a file from his/her local machine, the file is saved as an attachment. Since an attachment needs a "parent" record to attach to, the user can specify the Id of the parent record. FIG. 28C illustrates what happens (the behavior) if the uploaded file is successfully attached to the given record. FIG. 28D shows a call a remote API to associate the attachment Id with a specific document category. That is, the attachment (e.g., a picture of a user's driver license) should belong to certain document category (personal identification). FIG. 28E shows what happens (the behavior) if the remote API is successfully invoked. FIG. 28F shows how the remote API responds with the attachment list of the specific document category. Then, the SPA can use the response data to update the state data and in turn the UI. Note that the final step shown in FIG. 28F forms an intuitive user interface explaining exactly what happens when a user uploads a file, even though the behavior is very complicated and has to finish in multiple steps.

In summary, the SPA builder thus provides technical solution to the technical problem that occurs in typical SPA building in which complicated coding must be performed and that coding is fraught with errors made during the coding. The SPA builder provides a technical solution to this problem by providing a comprehensive set of built-in UI components and enforcing a set of FSM rules in term of state date usage and update that facilitate the more automatic (no manual coding by a programmer) building of the SPA. And the SPA can be built in an incremental style and what a user has built so far can be easily verified in real time.

SPA Builder Using Mock Data

In addition to the above described aspect of the SPA builder to facilitate the building of the SPA, the SPA builder may also provide a technical solution to another technical problem with typical SPA building. The technical problem with known SPA builders is that an SPA cannot be completely built if the backend database hasn't been properly seeded for all possible use cases and user interaction flows. Thus the SPA builder provides the technical solution that is the use of the mock data as described below.

The SPA builder provides a technical solution (as described below) to this technical problem since the SPA builder utilizes domain-specific mock data (described below) to fully build the user interface that completely covers all user interaction flows.

Application Monitor

Figure 33:
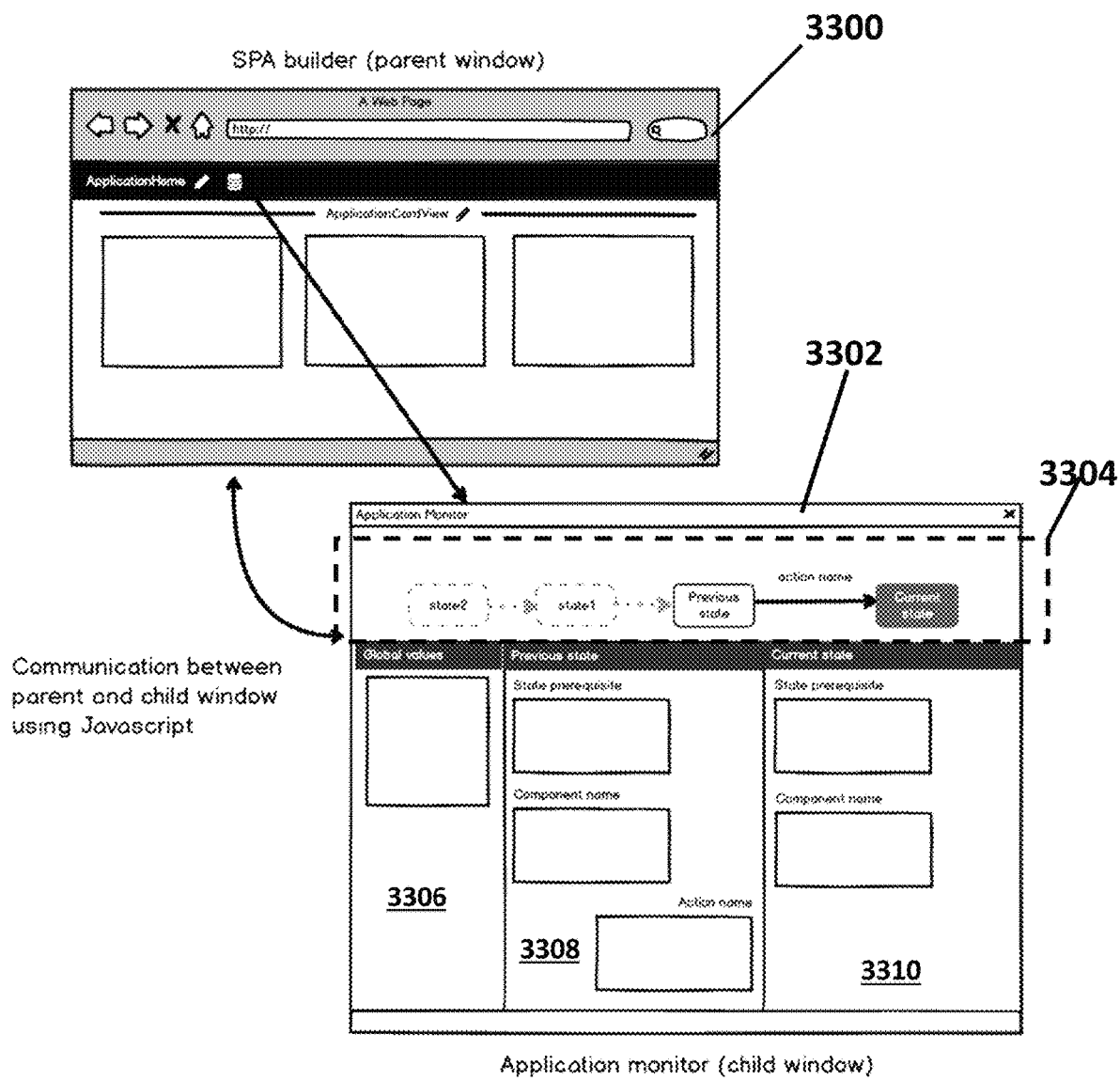
FIG. 33 illustrates an example of the SPA builder user interface and the application monitor user interface.

The SPA builder (as shown above in FIGS. 1 and 2A) may further include the application monitor 206 that may be implemented in hardware or software like the SPA builder and its components as described above. FIG. 33 illustrates an example of the SPA builder user interface 3300 and the application monitor user interface 3302. The application monitor displays the complete state data in the current state and the previous state, including both the metadata (the field name and its data type) and the data (the field value). When a user builds an SPA, he/she can refer to the data in the application monitor when he/she is doing data-related configuration, for example, prerequisite assignment, UI rendering using the state data, and action behavior specification for data update. The reason to display the data in the previous state is that during the state transition, the prerequisite in the current state (may be blank) is assigned using the data from the previous state.

The application monitor can be open as a child window by clicking the database icon in the state bar in the main SPA builder browser window as shown in FIG. 33. Since the SPA builder and the application monitor are from the same domain, their two-way communication can be implemented by JavaScript using the child window handler (parent window to child window) and window.opener reference (child window to parent window).

The application monitor UI 3302 may have four parts:
1. A top bar 3304 (outlined by the dashed line) displays the state transition diagram. In the example shown, only the last two states are active/highlighted because their data is displayed inside the application monitor. Rest of the states (state2 and state1 in the example) are grayed out to present the complete state transition flow. Between the last two states, the action name that triggers the state transition is shown in the top bar.
2. Below the top bar, there are three vertical columns in which:
3. A left column 3306 displays the global values.
4. A middle column 3308 displays the data in the previous state.
5. A right column 3310 displays the data in the current state. If there is only one state, the right column is empty.

Figure 34:
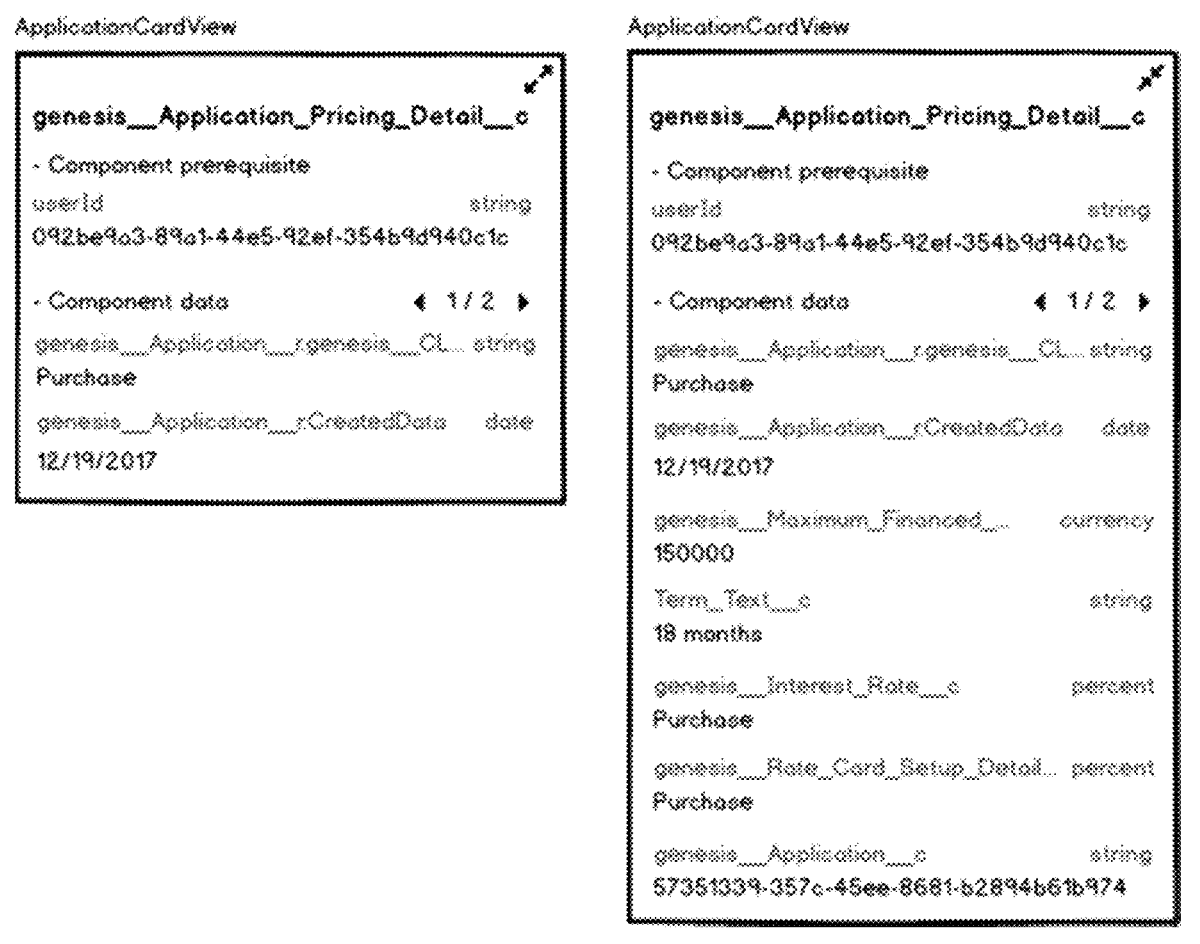

As shown in FIG. 33, each state column may include three types of cards (In this example, the metadata and data are presented as card view):
State prerequisite (this type of card is left-aligned and always displayed at the top of the column)
Component data (this type of card is also left-aligned)
Action-associated data (this type of card is right-aligned)
Each card may have the component name is displayed as a title. By default, each card has a default height. If the record data cannot be displayed completely with the default height, a user can toggle between the normal view and the expanded view (an example of each of which is shown in the example in FIG. 34.) A card of component data has three sections (from top to bottom)
The name of the database object
The component prerequisite, which is optional
The component data: if the component has more than one record, the component data section has a pagination widget for a user to go through all the records, one record at a time.
In the card view, each field entry includes the field name, data type, and the value.

Figure 35:
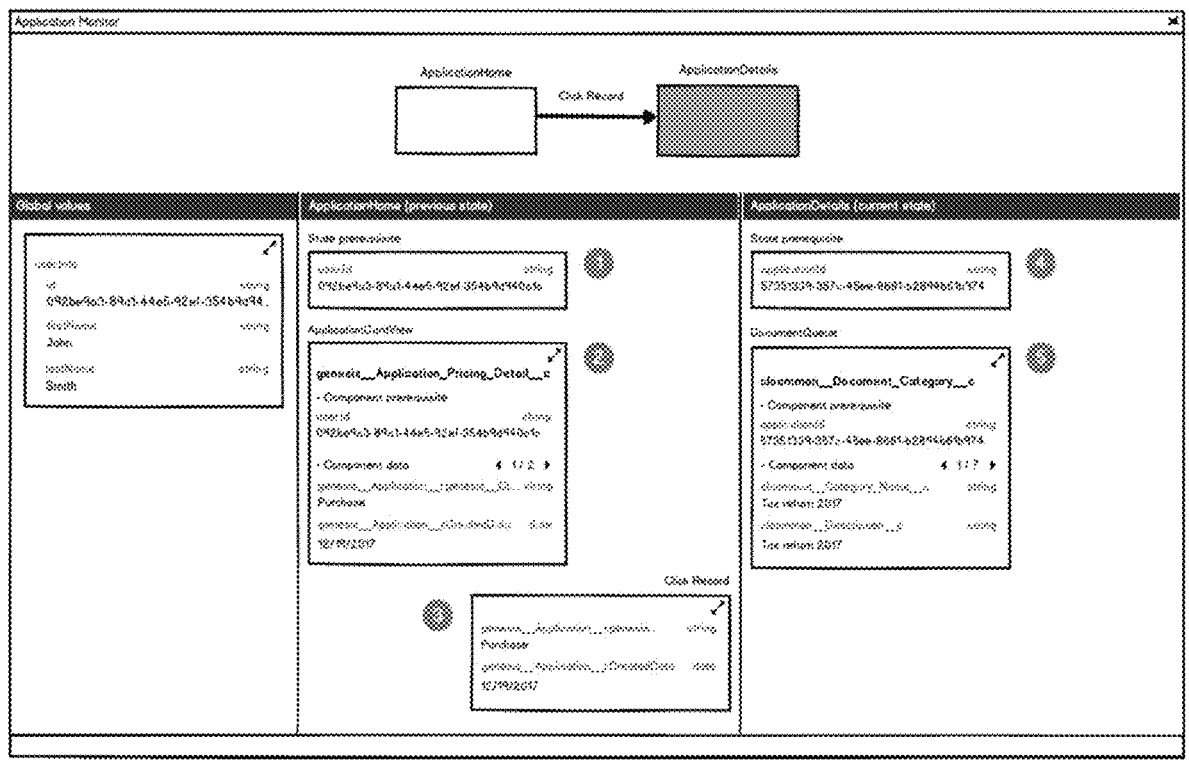
FIGS. 35 and 36 illustrate a mock-up of the application monitor being updated while the user is building a single page web application.
Figure 36:
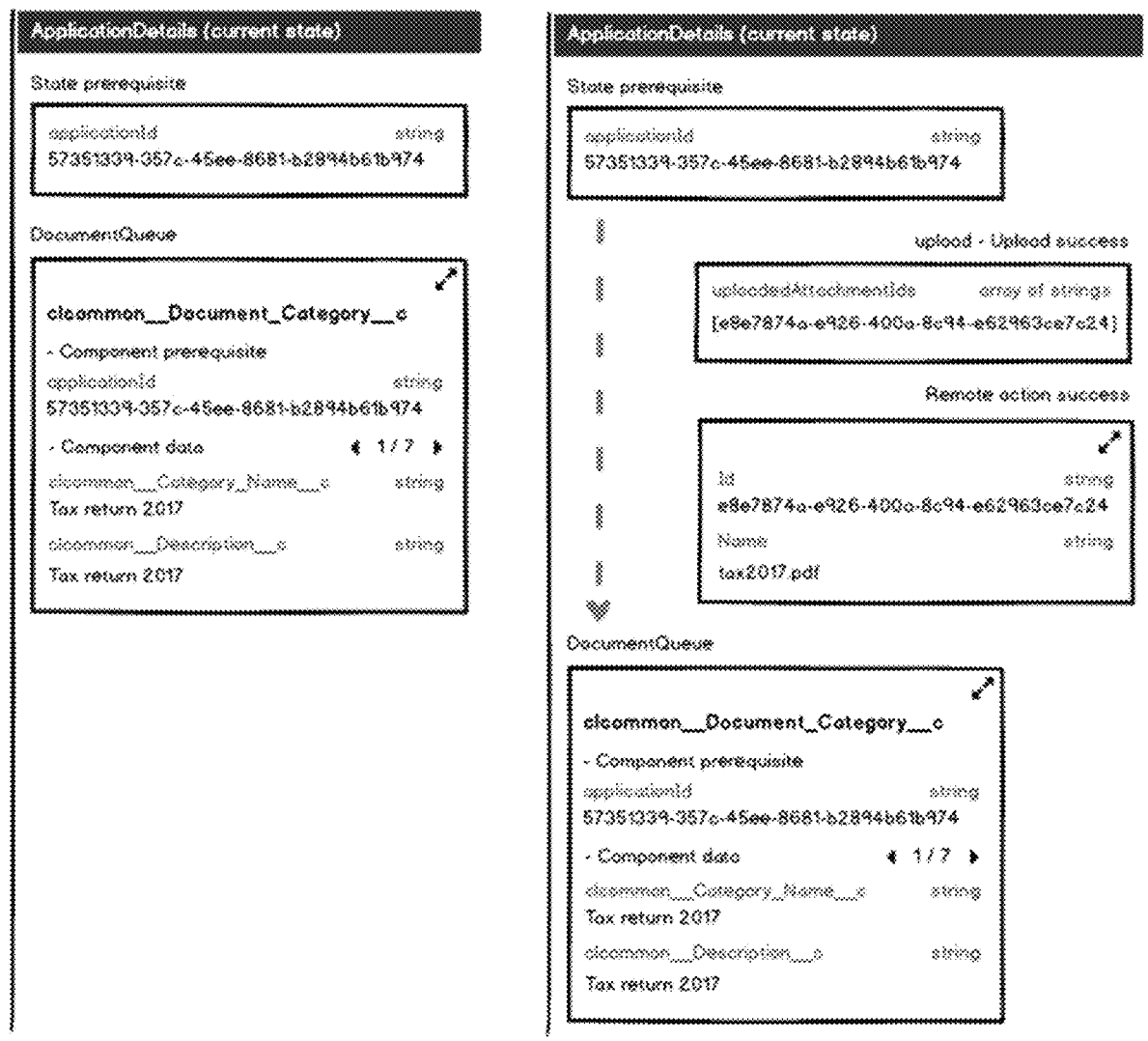

FIGS. 35 and 36 illustrate a mock-up of the application monitor being updated while the user is building an single page web application.

The mock-up shows:
1. The user initializes the state prerequisite of ApplicationHome.
2. The component ApplicationCardView in the state of ApplicationHome has loaded its data.
3. The user clicks a record in ApplicationCardView and goes to the next state of ApplicationDetails.
4. The user updates the state prerequisite of ApplicationDetails.
5. The component DocumentQueue in the state of ApplicationDetails has loaded its data.

Note that in each state column, the data cards are listed by timeline. Furthermore, in each state column, a component cannot be displayed twice when its data gets updated. As illustrated in FIG. 36, after the component DocumentQueue is loaded, if some action updates the data in DocumentQueue, the card of DocumentQueue is moved to the bottom with the updated data. As a result, the component only contains its latest data.

Domain-Specific Mock Data

The application monitor can intercept the backend communication and provide the mock backend response to the SPA builder in the parent window at the user's will. A user can use the mock responses to build a complete SPA with all possible user interaction flows and cover all the edge cases. We assume that the backend is available, the necessary database objects and remote APIs are ready to use, but the backend data is not properly seeded to support all user interaction flows. There are four types of communication between the SPA builder in browser and the backend:
Component queries data from the backend database.
Component saves date to the backend database.
Component calls a remote API at the backend.
Component uploads files to the backend.

Figure 37:
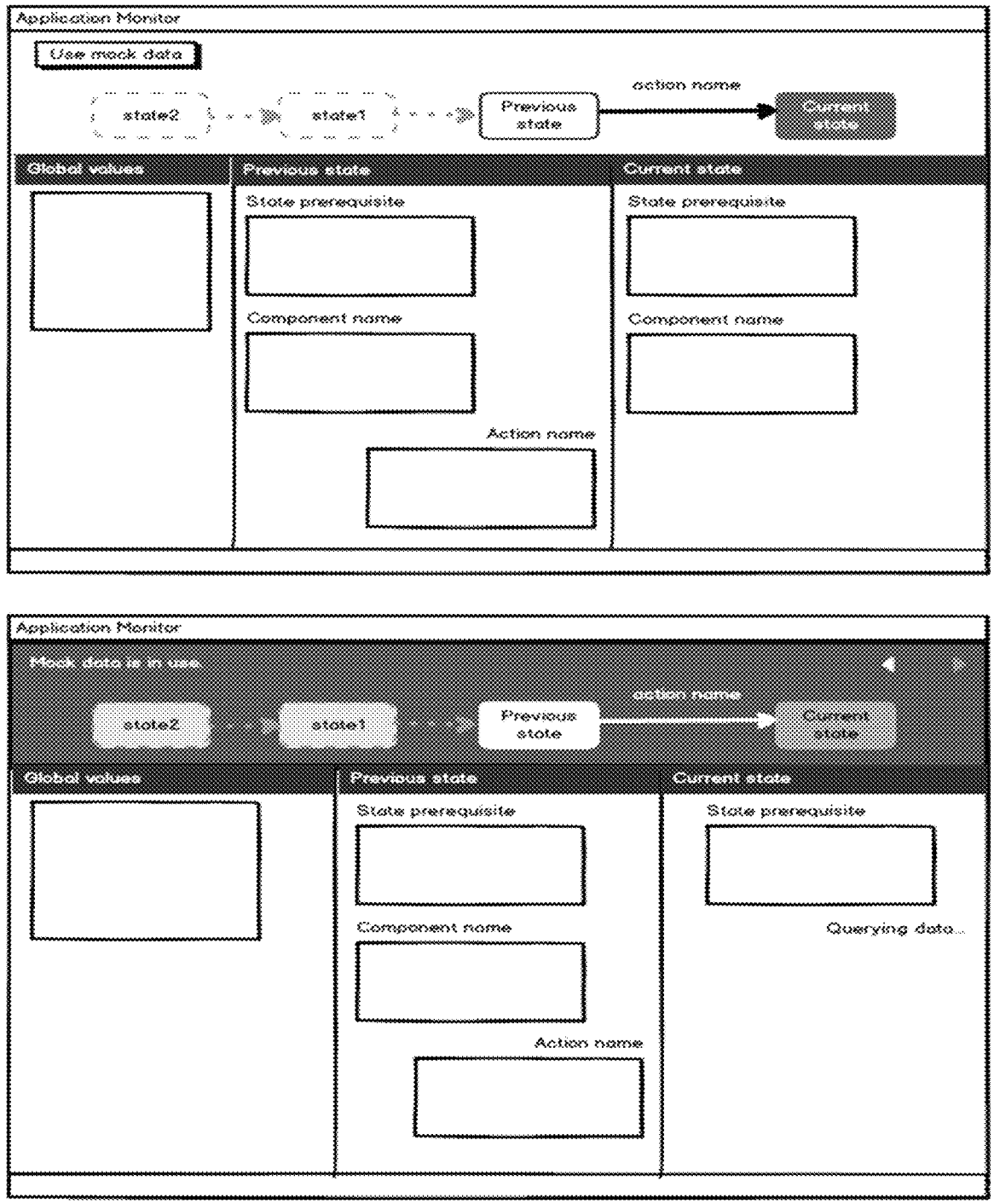
FIG. 37 illustrates an example of the application monitor when using mock data.

FIG. 37 illustrates an example of the application monitor when using mock data. In the example in FIG. 37, a user can click the button indicating that he/she wants to use mock data. After the user selects to use mock data, the background color of the application monitor changes as shown in FIG.

37, providing a strong visual cue that from now on, mock responses will be served to the SPA builder in the other parent window.

1. Query Data Operation

Figure 38:
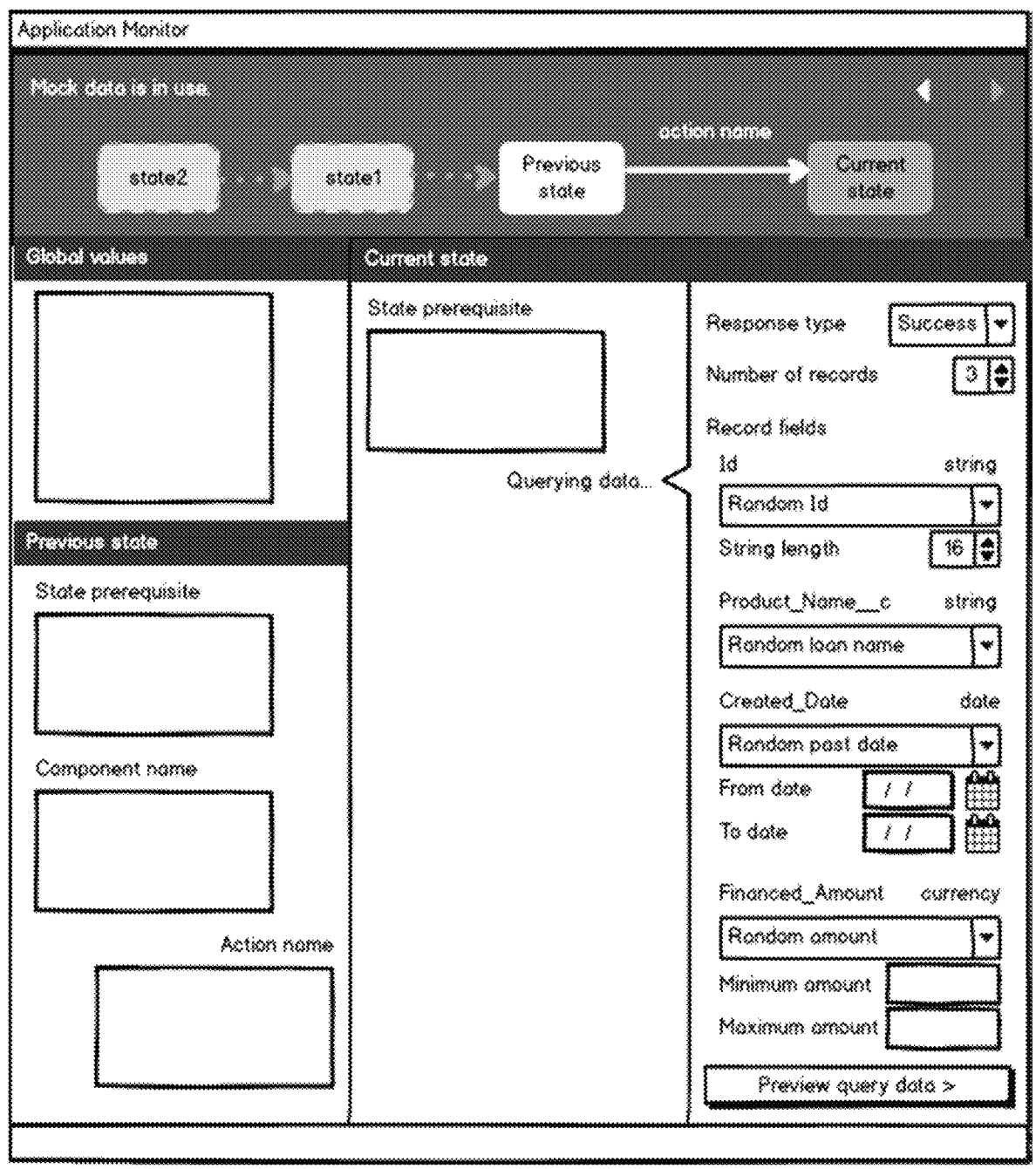
FIG. 38 illustrates the querying of data using mock data.

When the user adds a component through the SPA builder and the component is about to query data from the backend, the SPA builder no longer communicates with the backend directly. It communicates with the application monitor in the child window. In the application monitor, there is a querying data . . . entry at the bottom of the current state column as shown in FIG. 38. Then, the UI in the application monitor gets updated automatically as shown in FIG. 38. In the UI, the previous state is shifted from the middle column to the left column, below global values and the current state expands into two columns wherein the current state data is shifted to the middle column and the right column shows a form for a user to specify the mock data response.

In the right-column form, a user can specify:

The response type, either a success or failure response,

The number of the queried records in the success response, and

How to generate value for each field in a record. The application monitor can find the metadata (the field name and its data type) of the queried database object from the backend. For each field, the user can select a proper domain-specific data type and, if necessary, specify additional conditions.

Figure 40:
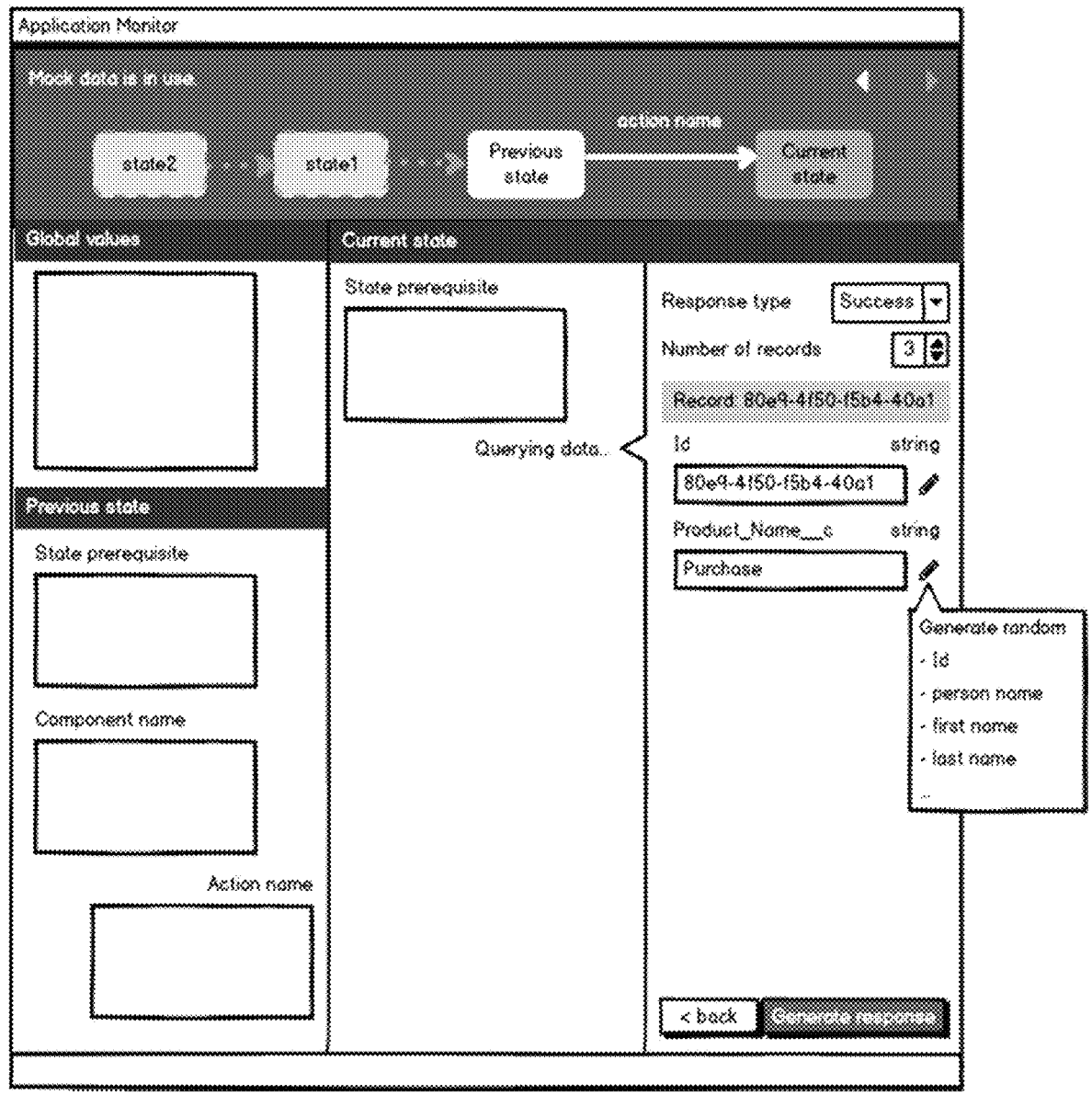
FIG. 40 is an example of a user interface so that the user can preview the generated data set.

FIG. 39 lists some typical domain-specific data types and their own type-specific conditions. The system may have a domain-specific data engine at the backend to generate the faithful data in the mock response. For example, if the SPA is used in the loan industry, the domain-specific data engine should be able to generate random loan names to be displayed in the UI. The random loan names are better than random strings in this case since the randomly generated loan names displayed in the UI should make more sense to the user. The user can preview the generated data set in order to tweak the responses as shown in FIG. 40. The user can edit the value in each input field directly or generate a new piece of random data for a specific value. When the user tweaks the values, he/she can refer to the state data in the middle (current state data) and the left (previous state data) columns.

Figure 41:
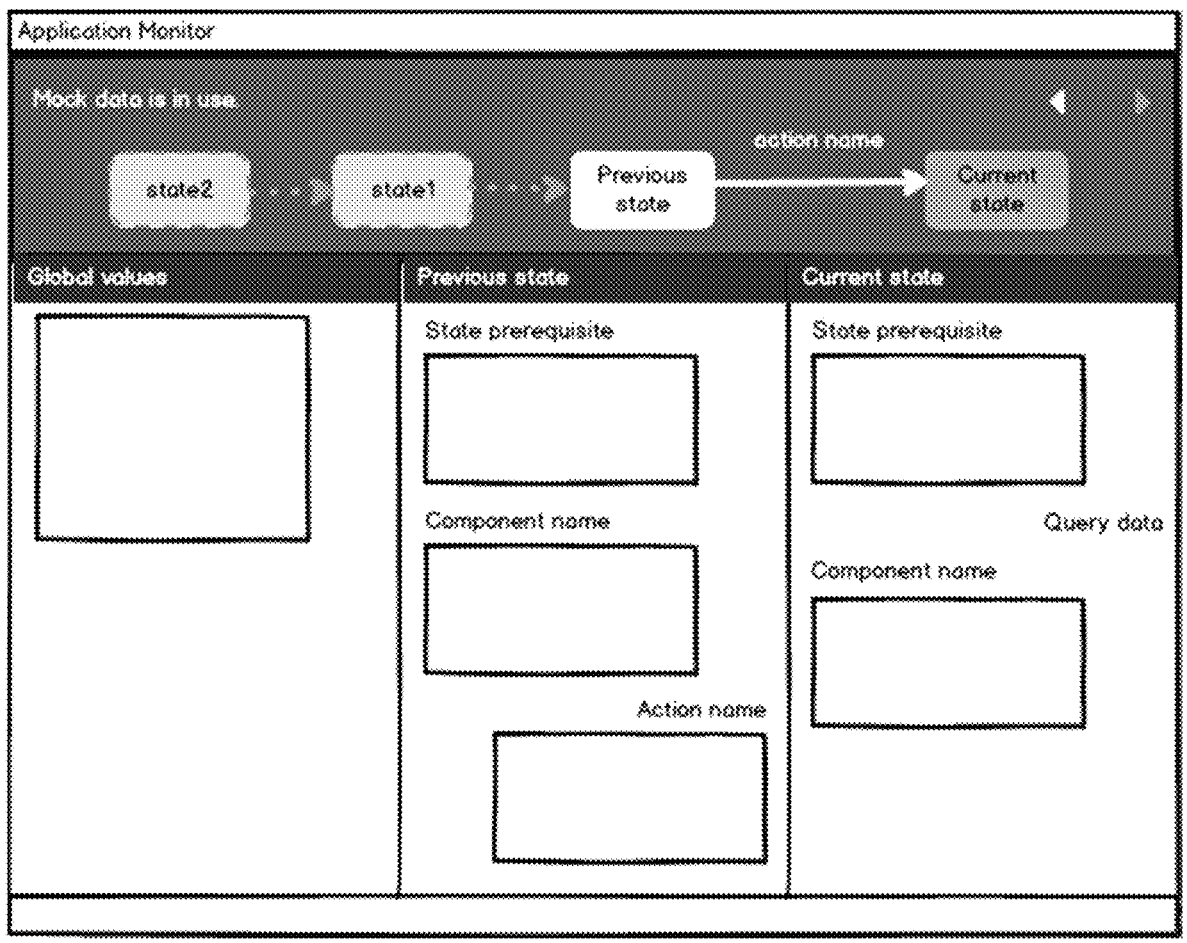
FIG. 41 illustrates the user interface of the application monitor in which the mock query data is listed in the current state column.

As shown in FIG. 41, after the user clicks on the Generate response button in FIG. 40, the mock query data is listed in the current state column. The same data is passed to the SPA builder in the parent window and gets rendered in the SPA UI in real time so that the mock data may be used during the building of the SPA.

Figure 42:
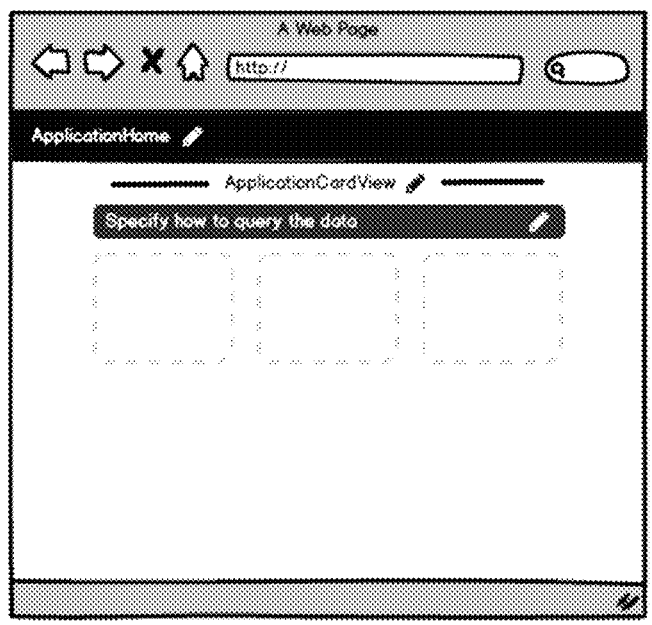
FIGS. 42-48 illustrate the interaction of between the SPA builder and the application monitor for a query data operation using mock data.
Figure 43:
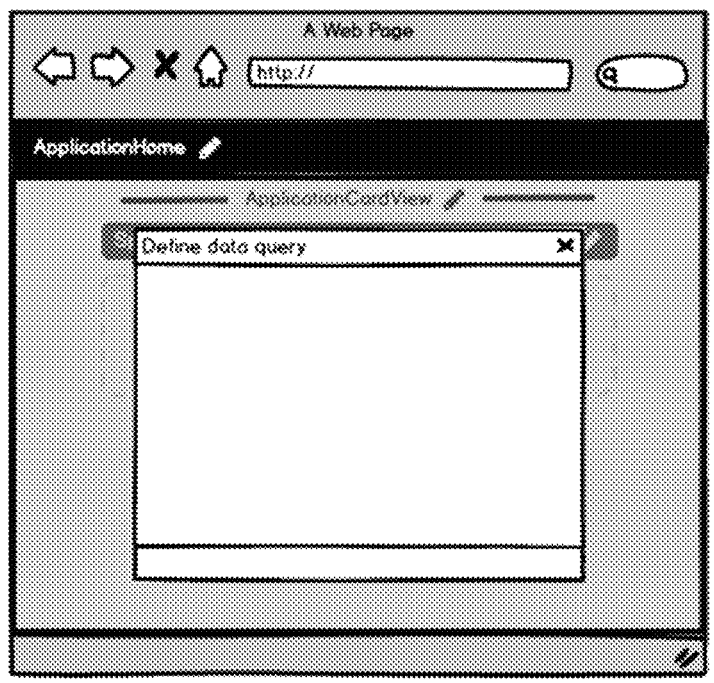
Figure 44:
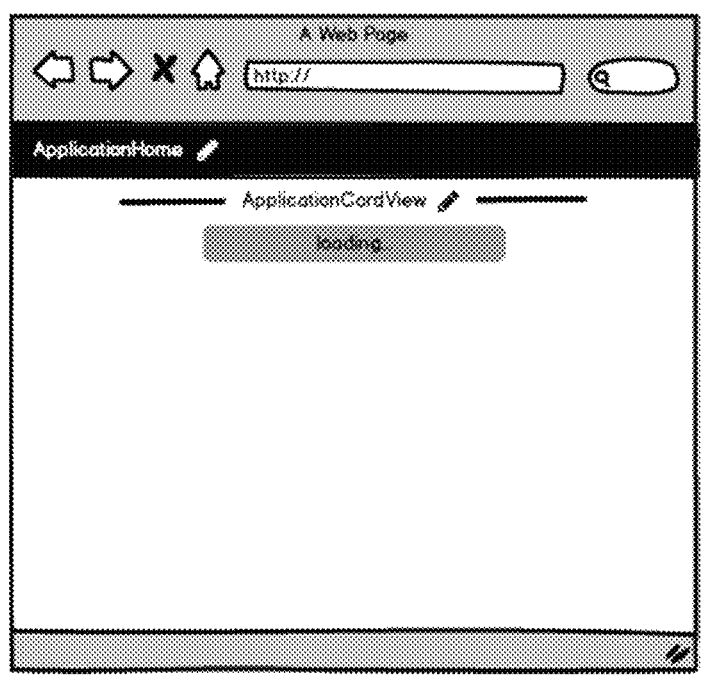
Figure 45:
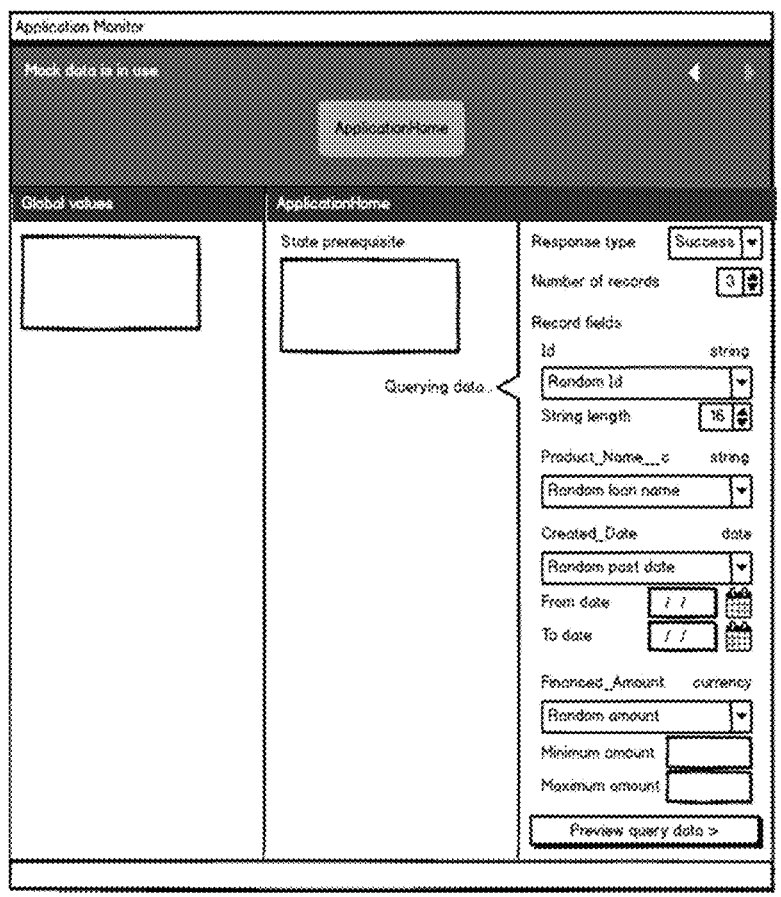
Figure 46:
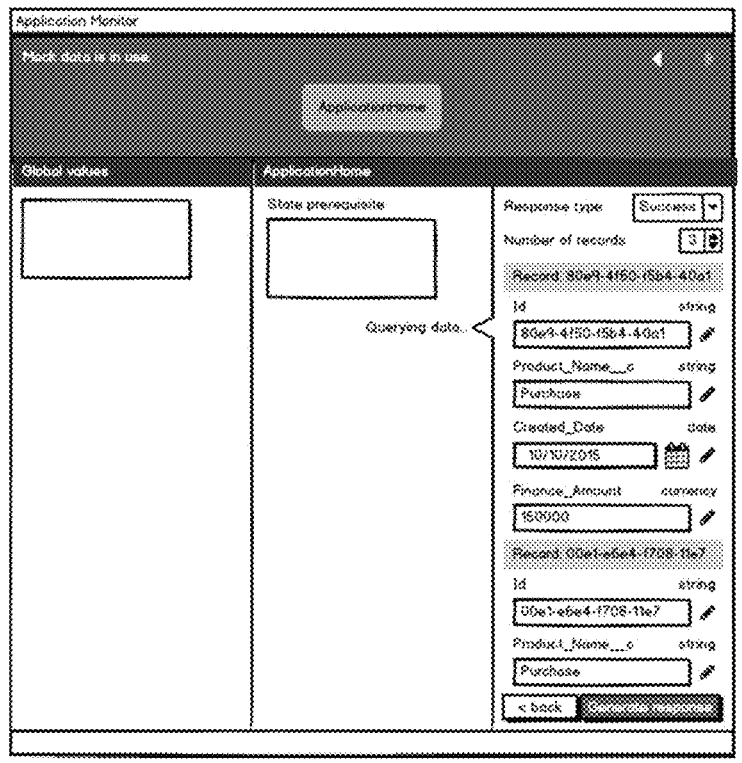
Figure 47:
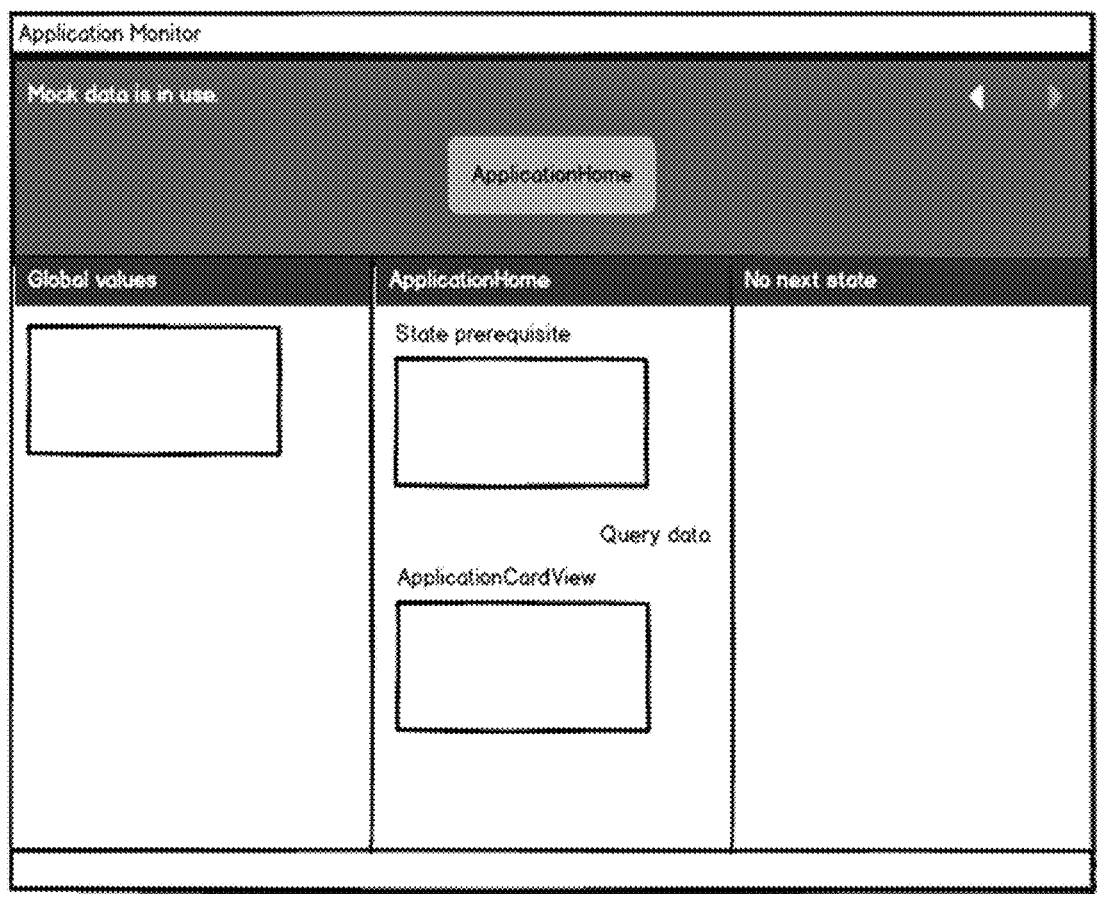
Figure 48:
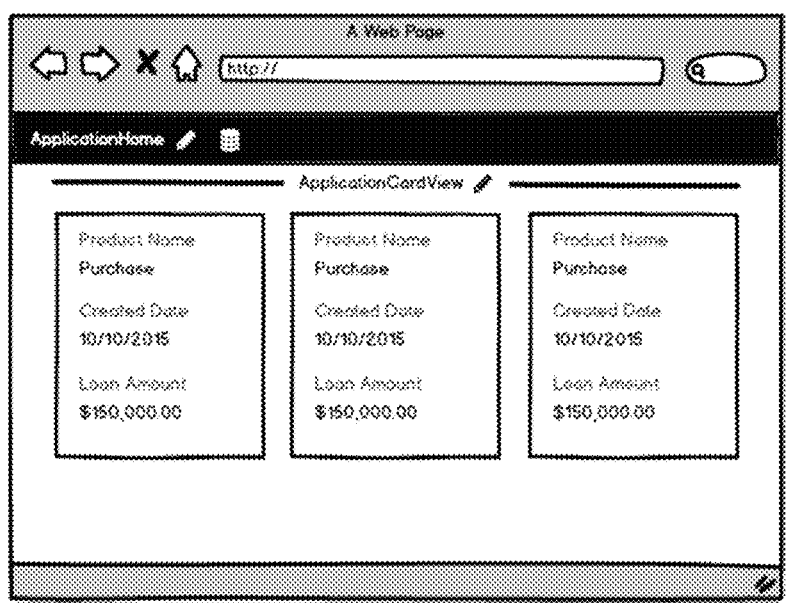

For example, the interaction of between the SPA builder and the application monitor for a query data operation using mock data is shown in FIGS. 42-48. Specifically, as shown in FIG. 42, the user, in the SPA builder defines a card view and, in the SPA builder, defines a data query as shown in FIG. 43. As shown in FIG. 44, the SPA builder displays the data loading message and communicates with the application monitor by passing the query information (database object and its selected fields). In the application monitor as shown in FIG. 45, the user defines the mock response and the mock response is shown in the application monitor as shown in FIGS. 46 and 47. The mock response is also passed from the application monitor to the SPA builder and loaded in the card view as shown in FIG. 48.

2. Save Data Operation

Figure 49:
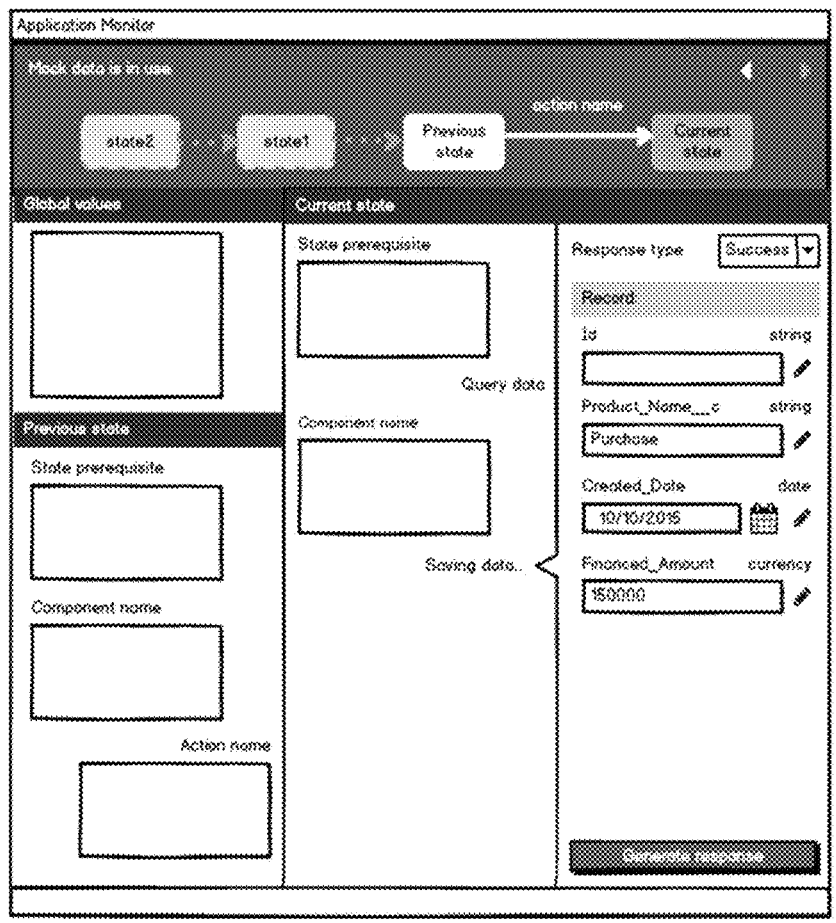
FIG. 49 illustrates the application monitor user interface for a save data operation.
Figure 50:
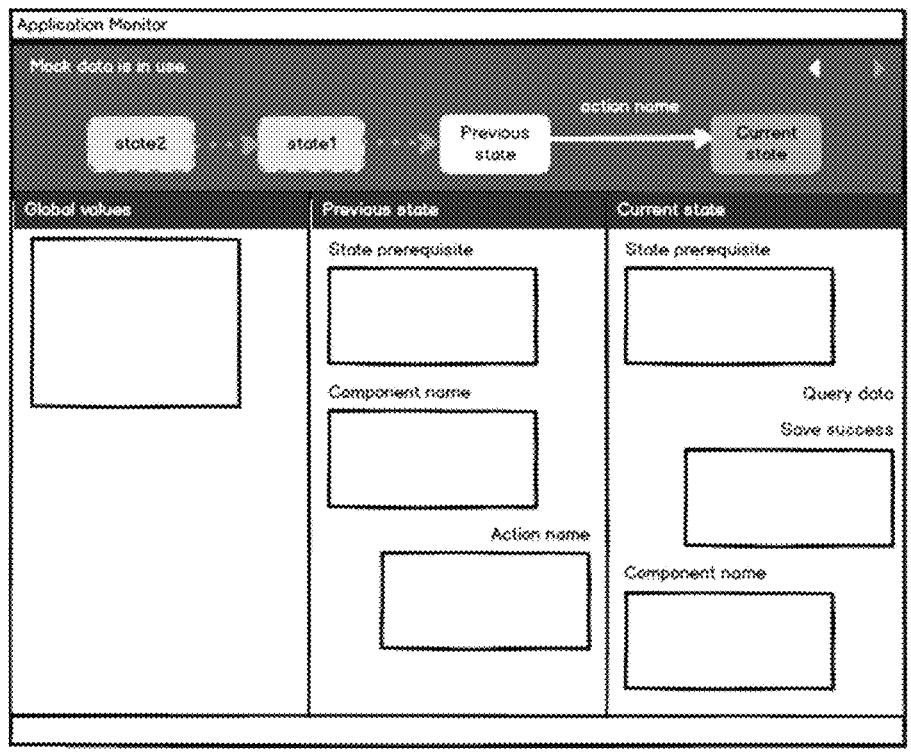
FIG. 50 illustrates the application monitor user interface for a save data operation when a success behavior updates the component data.

The save data operation may also be performed using mock data. The mock response for a save data operation is simpler than query. The SPA builder enforces a requirement to the backend saving API that the success response should include the data that was just successfully saved. Therefore, the form of the save-data response should be pre-populated using the user's input data. The user can tweak the values in the form if necessary. For example, if the saving request is to create a new record, the record Id can be randomly generated as shown in FIG. 49. Once the user generates the mock response, the response data is associated with the save action's success behavior. If the success behavior updates the component data, the component's card is moved to the bottom, as shown in FIG. 50.

3. Call Remote API Operation

Figure 51:
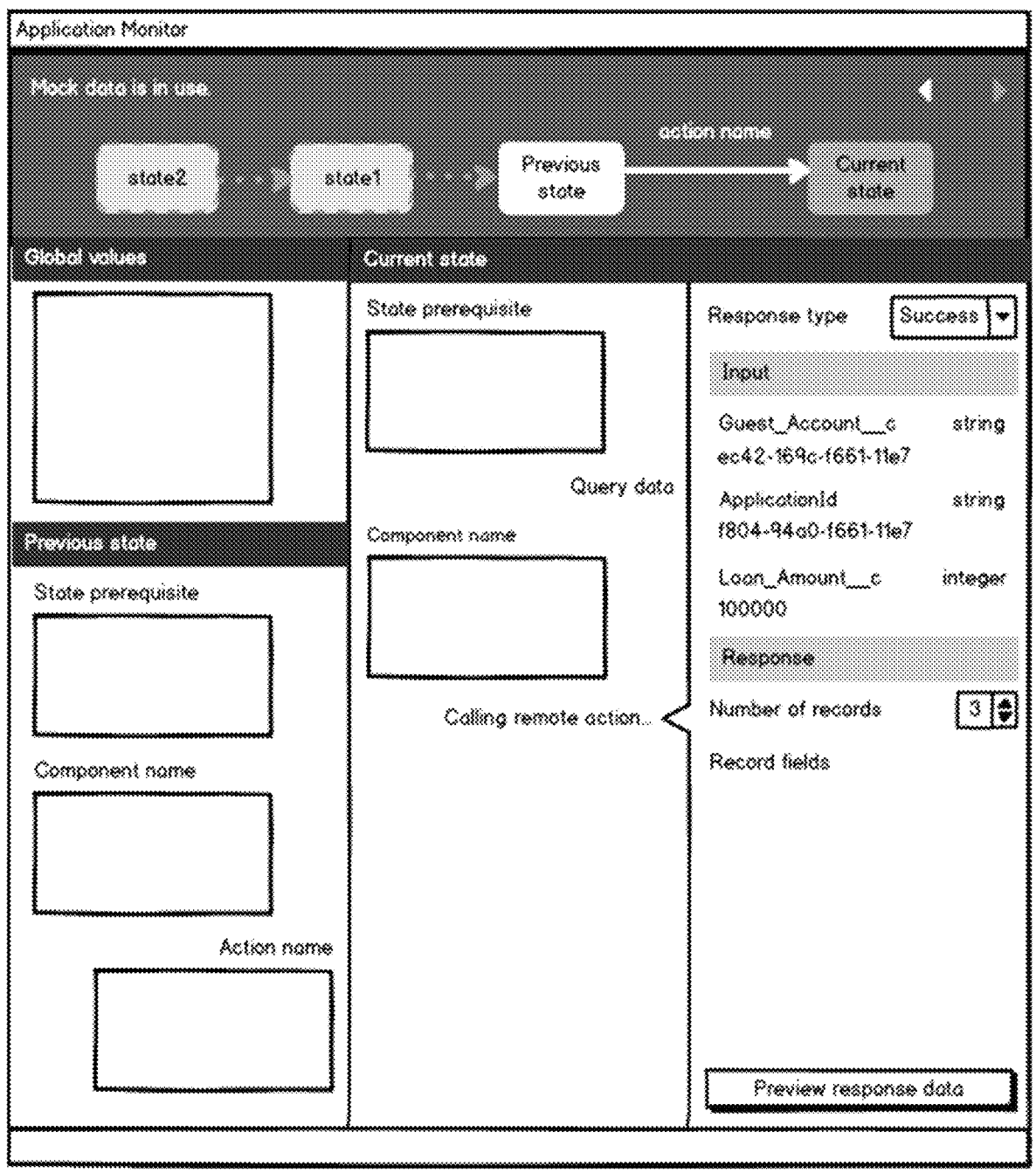
FIG. 51 illustrates the application monitor user interface for a calling remote API.

The call remote API operation may also be performed using mock data. The SPA builder enforces a requirement to the backend remote API that both the success and the failure response should include the input data or the arguments passed to the remote API. The success response is expected to include a record or a list of records. Therefore, the mock response configuration for calling remote API is similar to the one for data query as shown in FIG. 51.

4. Upload Files

With the mock data enabled, a user can choose a file using the browser's file dialog. But the chosen file is not uploaded to the backend. The backend response will be mocked in the similar style as calling remote API.

Mock Data Storage

Figure 52:
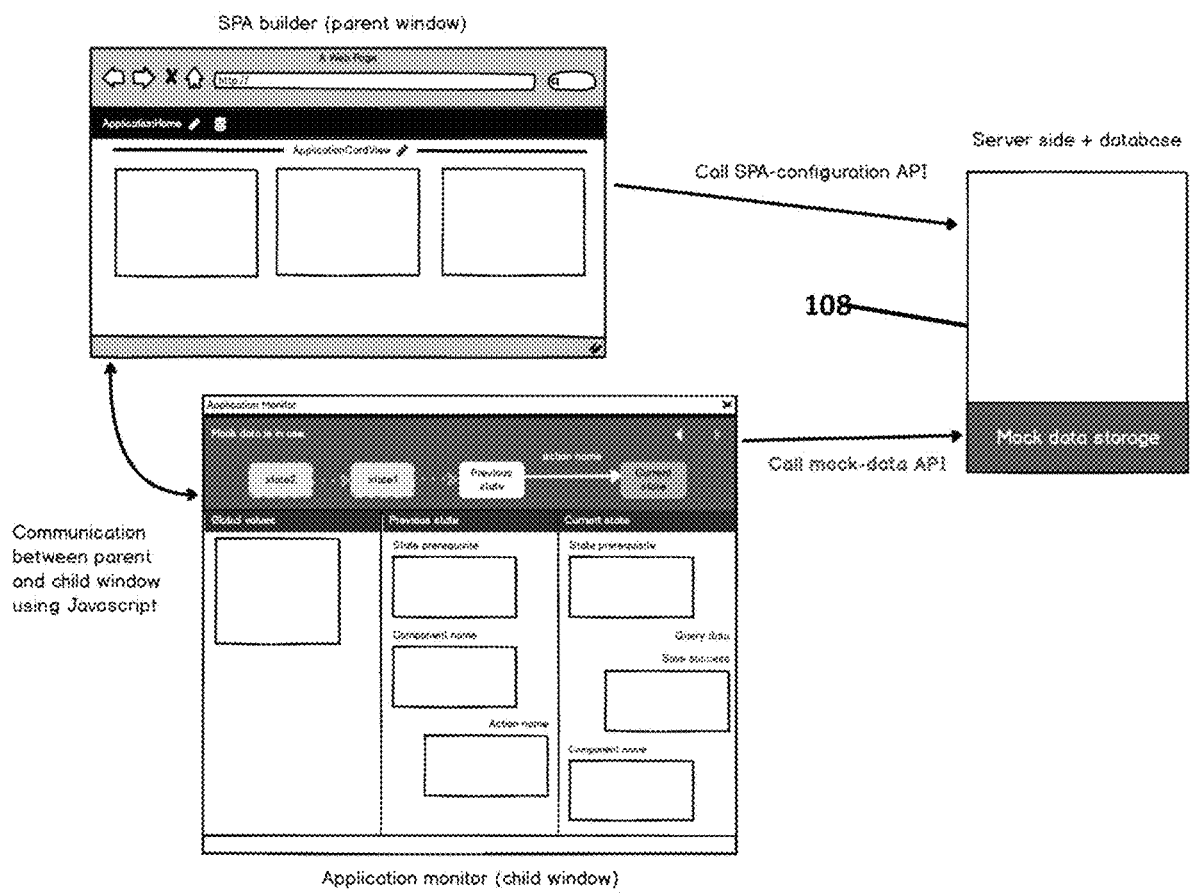
FIG. 52 shows the communication flow along the SPA builder, the application manager and the backend for mock data.
Figure 53:
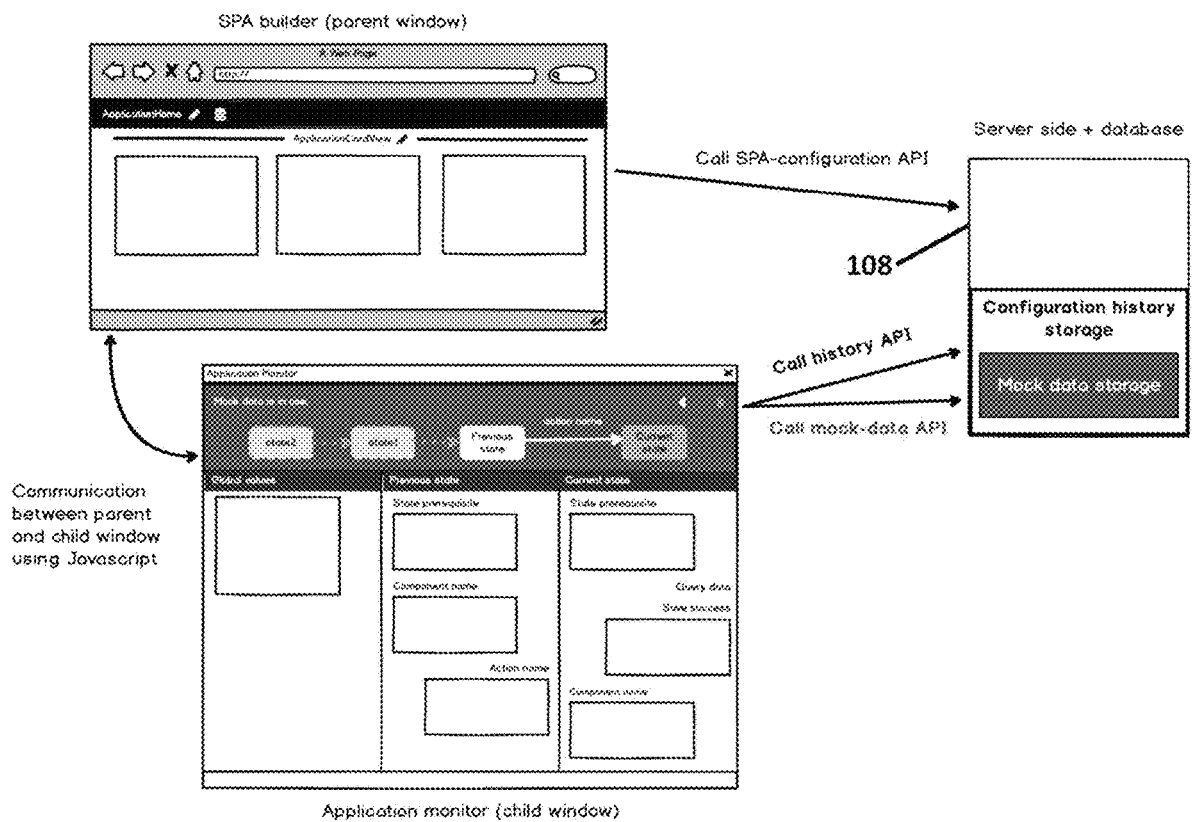
FIG. 53 shows the communication flow along the SPA builder, the application manager and the backend for configuration history.

Once a user enables mock data, he/she cannot turn it off during the current building session, until he/she reloads the SPA builder. The mock responses generated in the application monitor are remembered at the back-end's mock data storage. As a result, the next time when the same component is loaded or the same remote API is called, unless the user explicitly indicates that he wants a new mock response to be generated, the previous generated mock response is returned. Moreover, with the mock data turned on, the real application data in the backend database will not be touched and polluted during the building process. FIG. 52 shows the communication flow along the SPA builder (and its UI shown), the application manager (and its UI shown) and the backend (that stores the mock data store in the storage 108 as shown in FIG. 1.) As shown, the SPA builder calls the SPA-configuration API (to get the data and configuration of the already built SPA) while the application monitor using a mock data API to retrieve the mock data that will continue to be used for the SPA as described above.

History Navigation

Once a user has enabled mock data, the application UI under configuration is completely dependent on the SPA specification generated through the SPA builder, and the data stored in the mock-data storage. Thus, the storage 108 may include a configuration history storage The main purpose of history navigation is to design alternative user interaction flows dependent on the different response types from the backend. For example, a user is building an online loan application flow. Once the applicant's personal data is collected, a remote API is called to decide whether a loan should be offered. Powered by the mock response, the user can build the "positive" flow first by generating a successful response (i.e., the applicant is presented a loan offer.) Once the "positive" flow is finished, the user can navigate back to the same remote API, change the response type to failure, and start building the "negative"

flow (i.e., the application is rejected and the applicant could be presented other loan products to choose from.)

Figure 54:
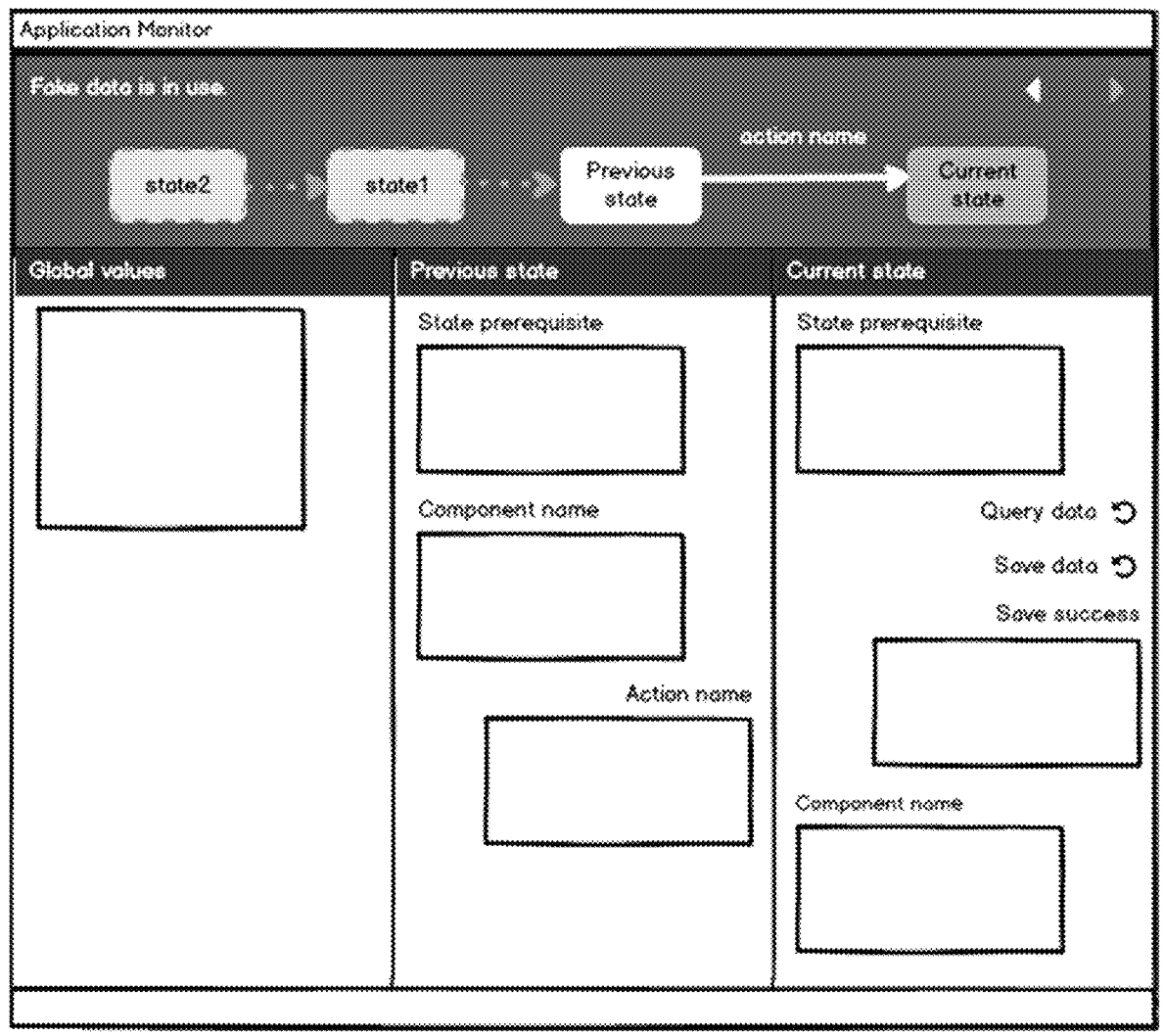
FIG. 54 illustrates the application monitor user interface having a revert icon.

During the history navigation, the SPA specification is kept to the latest version. That is, once the positive flow is configured, its specification/configuration should not be discarded during the history navigation. Only the mock data presented in the application monitor is reverted. Only the four types of communication from the backend can be reverted to, as listed in the section of domain-specific mock data. An action that can be reverted to is associated with a revert icon, as shown in FIG. 54 (with the query data and save data having a revert icon in the example shown). Moreover, a user can use the back and forward icons in the state flow section to navigate through states as shown in the top bar of the applications monitor user interface.

Figures 55, 56:
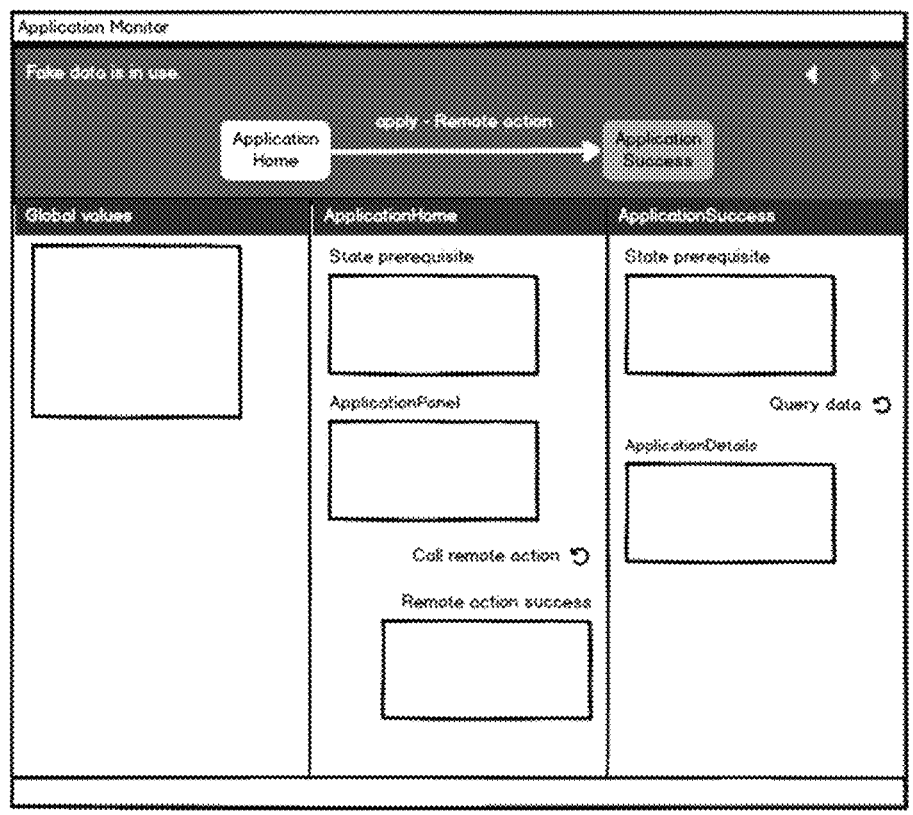
FIG. 55 is a mock-up illustrating how to use history navigation to design an alternative user interaction flow.
FIG. 56 illustrates the application monitor user interface having a revert icon for a call remote action.
Figure 57:
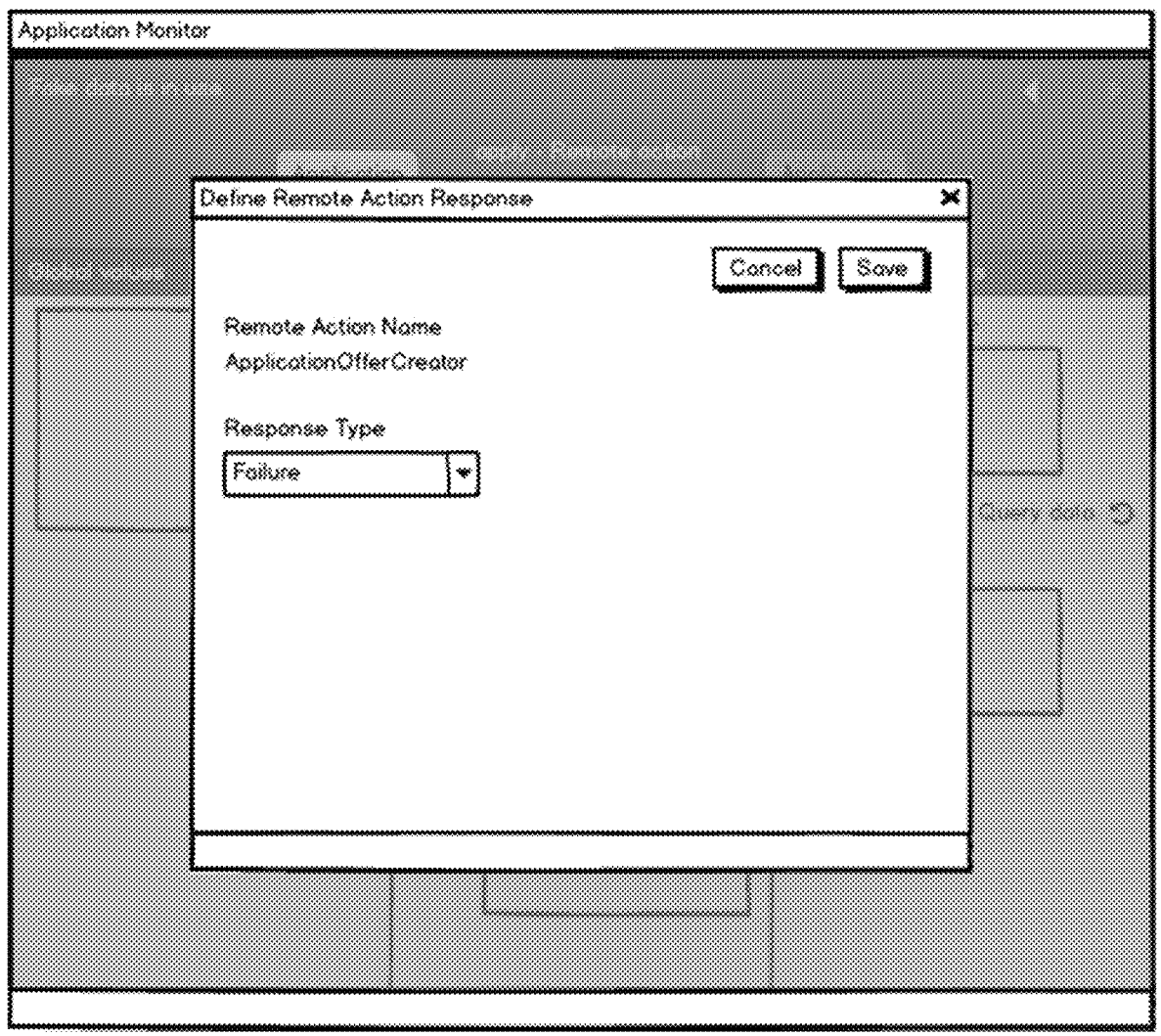
FIG. 57 illustrates a user interface to define a new remote action response.
Figure 58:
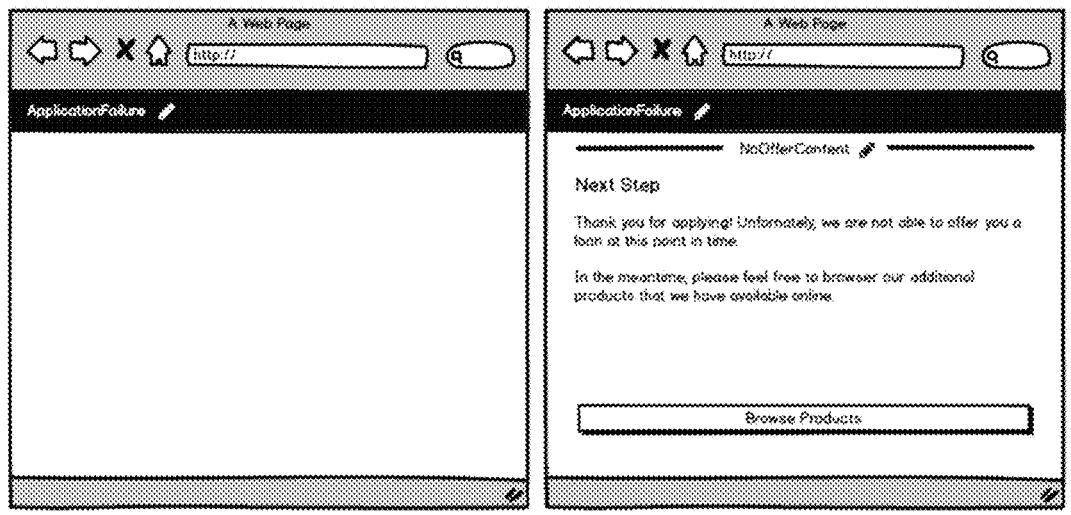
FIG. 58 illustrates an example user interface of a failure flow.
Figure 59:
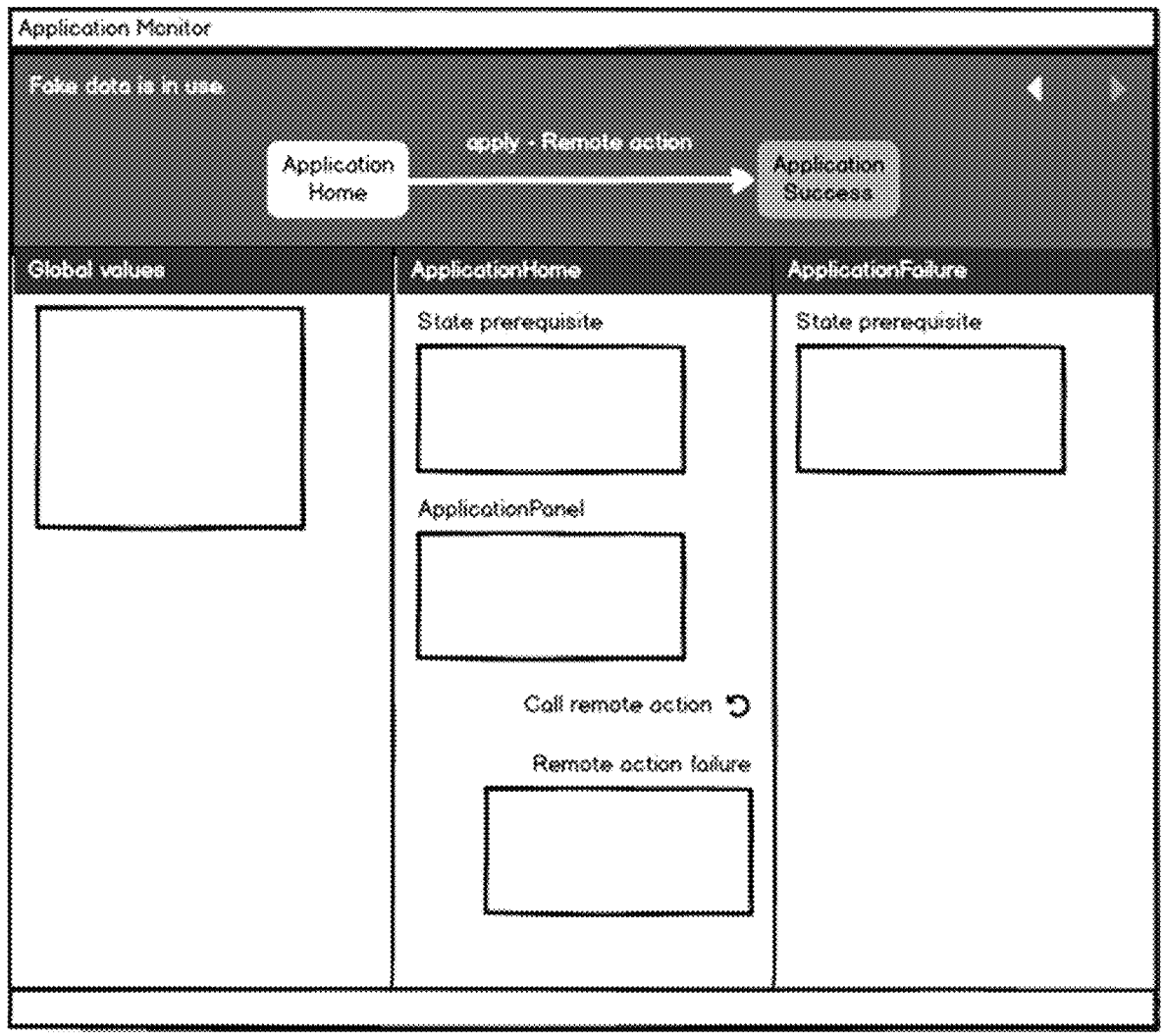
FIG. 59 illustrates a user interface of the application monitor showing the failure flow.

FIG. 55 is a mock-up illustrating how to use history navigation to design an alternative user interaction flow. At first, the success interaction flow has been built. The first state is ApplicationHome, from where an applicant enters his/her information as shown on the left hand side user interface. The applicant then clicks the Apply button, which calls a remote API. The remote API returns a successful response as shown in the right hand side UI in FIG. 55 and the application goes to the next state of ApplicationSuccess. The application monitor displays the success interaction flow as shown in FIG. 56. The user can click the revert icon associated with the Call remote action entry in the ApplicationHome state (the middle column in FIG. 56) and re-define the remote action response using the exemplary user interface shown in FIG. 57. Once the response type is re-defined as failure, the user can then configure the action's failure behavior, say, going to a third state of ApplicationFailure and start building the failure flow from there as shown in FIG. 58. Like the success flow, the application monitor displays the failure interaction flow as shown in FIG. 59. After the user defines both the success and the failure flows, when he/she clicks the revert icon associated with the Call remote action entry again and change the response type back to success, he/she easily reproduce the success flow because the specification/configuration of the success flow is kept and the mock response generated before is remembered.

In summary, by using the mock data during the SPA configuration and building, the SPA builder can cover all the user interaction flows and provide an accurate report on the percentage of the UI coverage in real time. Thus, it provides a technical solution to the technical problem of not being able to track changes in the SPA without recompiling the SPA as is required with known solutions. Moreover by using the mock data in the application monitor, our SPA builder no longer uses the real application data (and thus won't pollute the real application database) during the SPA building process. Thus, when the mock data is not turned on, the SPA builder retrieves its data from a real application data store in the storage 108 and in contrast, uses only the mock data in the mock data store with the mock data turned on in the application builder.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection; however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:
retrieving a finite state model having a set of data dependency rules, the set of data dependency rules including a rule that defines a data dependency between a global value used in a single page web application ("SPA") that is global to each element of the SPA including each state and each user interface component in the SPA and a prerequisite that is a set of variables used in one of the state and the user interface component in the SPA and makes the state or the user interface component fully functional, a rule that defines a data dependency between a prerequisite of the user interface component and a data query in the user interface component and a rule that defines a data dependency between the data query in the user interface component and an action in the user interface component that is the action performed by the user interface component of the SPA and data resulting when the action occurs;

specifying a new state for the SPA;
defining one or more user interface components and one or more actions for the new state based on the retrieved set of data dependency rules;
selecting a user interface element for each user interface component and each action from a set of predefined user interface elements;
building the SPA, by a SPA builder, using the new state, the one or more user interface components and the one or more actions without writing code;
monitoring, using an application monitor separate from the SPA builder, one or more user interaction flows of the SPA, wherein the application monitor intercepts communication from the SPA builder to a backend and generates mock backend response data;
verifying, by the application monitor, the one or more user interaction flows of the SPA using the mock backend response data; and
displaying an application monitor user interface that includes: a first section that displays a state diagram; a second section that displays global values; a third section that displays previous state data; and a fourth section that displays current state data.

2. The method of claim 1, wherein the finite state model further comprises a set of user interface rendering rules that define how a user interface is rendered based on the global value for the SPA and a definition of a state, the one or more user interface components and the one or more actions and a set of action execution flow rules, wherein the set of action execution flow rules include a rule that define an action result affects the data in the same user interface component as the action, a rule that defines an action result in one user interface component affects a prerequisite of a second user interface component, a rule that defines an action result in one state affects a prerequisite of a second state.

3. The method of claim 1, wherein building the SPA further comprises specifying, for the new state of the SPA, a prerequisite for the new state, assigning values to the new state prerequisite from one or more global values and a triggered action that leads to the new state and determining a user interface layout for the new state.

4. The method of claim 3, wherein building the SPA further comprises adding the one or more user interface components to the user interface layout for the new state and defining, for each user interface component, a prerequisite and one or more values for the user interface component prerequisite from the one or more global values, the new state prerequisite and data and a prerequisite for another user interface component of the new state and defining, for each user interface component, a user interface component type, one or more pieces of user interface component data and a user interface rendering based on the user interface component prerequisite and the one or more pieces of user interface component data and an action.

5. The method of claim 1 further comprising storing a SPA specification for the SPA in storage wherein the SPA specification contains the new state for the SPA, the one or more user interface components and the one or more actions for the new state based on the retrieved set of data dependency rules and the user interface element for each user interface component and each action from the set of predefined user interface elements.

6. The method of claim 1, further comprising mocking a query data operation of the SPA, mocking a read data operation of the SPA, and mocking a remote action operation of the SPA.

7. The method of claim 1 further comprising isolating a set of actual data from the SPA being built to prevent corruption of the set of actual data during the building of the SPA.

8. An apparatus, comprising:
a storage that stores a finite state model having a set of data dependency rules, the set of data dependency rules including a rule that defines a data dependency between a global value used in a single page web application ("SPA") that is global to each element of the SPA including each state and each user interface component in the SPA and a prerequisite that is a set of variables used in one of the state and the user interface component in the SPA and makes the state or the user interface component fully functional, a rule that defines a data dependency between a prerequisite of the user interface component and a data query in the user interface component and a rule that defines a data dependency between the data query in the user interface component and an action in the user interface component that is the action performed by the user interface component of the SPA and data resulting when the action occurs;
a computer system, coupled to the storage, having a processor and memory storing a single page web application (SPA) builder comprising a plurality of lines of computer code executed by the processor that is configured to:
specify a new state for the SPA;
define one or more user interface components and one or more actions for the new state based on the set of data dependency rules;
select a user interface element for each user interface component and each action from a set of predefined user interface elements; and
build the SPA using the new state, the one or more user interface components and the one or more actions without writing code; and
an application monitor, executed on the computer system and separate from the SPA builder, comprising a plurality of lines of code that is configured to:
monitor one or more user interaction flows of the SPA, wherein the application monitor intercepts communication from the SPA builder to a backend and generates mock backend response data;
verify one or more user interaction flows of the SPA using the mock backend response data; and
display an application monitor user interface that includes: a first section that displays a state diagram; a second section that displays global values; a third section that displays previous state data; and a fourth section that displays current state data.

9. The apparatus of claim 8, wherein the finite state model further comprises a set of user interface rendering rules that define how a user interface is rendered based on the global value for the SPA and a definition of a state, the one or more user interface components and the one or more actions and a set of action execution flow rules, wherein the set of action execution flow rules include a rule that define an action result effect to the query in the same user interface component as the action, a rule that defines an action result effect in the user interface component to a prerequisite of a second user interface component, a rule that defines an action result effect to a prerequisite of a second state.

10. The apparatus of claim 8, wherein the SPA builder is further configured to specify, for the new state of the SPA, a prerequisite for the new state, assign values to the new state prerequisite from one or more global values and a triggered action that leads to the new state and determine a user interface layout for the new state and further configured to add the one or more user interface components to the user interface layout for the new state and define, for each user interface component, a prerequisite and one or more values for the user interface component prerequisite from the one or more global values, the new state prerequisite and data and a prerequisite for another user interface component of the new state.

11. The apparatus of claim 10, wherein the SPA builder is further configured to define, for each user interface component, a user interface component type, one or more pieces of user interface component data and a user interface rendering based on the user interface component prerequisite and the one or more pieces of user interface component data and an action.

12. The apparatus of claim 10, wherein the storage stores a SPA specification for the SPA in the storage wherein the SPA specification contains the new state for the SPA, the one or more user interface components and the one or more actions for the new state based on the retrieved set of data dependency rules and the user interface element for each user interface component and each action from the set of predefined user interface elements.

13. The apparatus of claim 8, wherein the application monitor is further configured to verify a query data operation of the SPA, verify a read data operation of the SPA and verify a remote action operation of the SPA.

14. The apparatus of claim 8, wherein the application monitor is further configured to isolate a set of actual data from the SPA to prevent corruption of the set of actual data during building of the SPA.

* * * * *